United States Patent
Daniele et al.

(10) Patent No.: US 11,998,001 B2
(45) Date of Patent: Jun. 4, 2024

(54) PERFUSION DEVICE FOR NORMOTHERMIC, EX VIVO PRESERVATION OF A MAMMALIAN BRAIN

(71) Applicant: YALE UNIVERSITY, New Haven, CT (US)

(72) Inventors: Stefano Daniele, New Haven, CT (US); Nenad Sestan, Madison, CT (US); John Silbereis, Hamden, CT (US); Zvonimir Vrselja, New Haven, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 16/967,925

(22) PCT Filed: Feb. 8, 2019

(86) PCT No.: PCT/US2019/017206
§ 371 (c)(1),
(2) Date: Aug. 6, 2020

(87) PCT Pub. No.: WO2019/157277
PCT Pub. Date: Aug. 15, 2019

(65) Prior Publication Data
US 2021/0360913 A1 Nov. 25, 2021

Related U.S. Application Data

(60) Provisional application No. 62/628,621, filed on Feb. 9, 2018.

(51) Int. Cl.
*A01N 1/02* (2006.01)
(52) U.S. Cl.
CPC .................... *A01N 1/021* (2013.01)
(58) Field of Classification Search
CPC .............. A01N 1/021; A01N 1/0247
See application file for complete search history.

(56) References Cited

U.S. PATENT DOCUMENTS

| | | | |
|---|---|---|---|
| 2008/0187901 A1* | 8/2008 | Doorschodt | A01N 1/0226 435/1.1 |
| 2010/0028979 A1 | 2/2010 | Faulkner et al. | |
| 2010/0151435 A1* | 6/2010 | Thatte | A01N 1/0226 435/284.1 |
| 2011/0183310 A1* | 7/2011 | Kravitz | A01N 1/0247 435/284.1 |
| 2016/0160176 A1 | 6/2016 | Brasile | |
| 2017/0252701 A1* | 9/2017 | Nosrati | A61M 1/1601 |
| 2020/0375178 A1* | 12/2020 | Becker | A01N 1/0226 |

FOREIGN PATENT DOCUMENTS

| | | |
|---|---|---|
| EP | 2427483 A1 | 3/2012 |
| WO | 2006042138 A2 | 4/2006 |
| WO | 2014059316 A1 | 4/2014 |

OTHER PUBLICATIONS

Naja, I. Brain Preservation with Selective Cerebral Perfusion, Moderate Hypothermia and Low Flow Rate. J of Saudi Heart Assoc 24(4)285, Oct. 2012. (Year: 2012).*
"Extended European Search Report and Opinion dated Dec. 10, 2021, for European Patent Appl. No. 19751503.4", dated Dec. 10, 2021, 1-18.
Allen, Bradley S., et al., "Conditioned blood reperfusion markedly enhances neurologic recovery after prolonged cerebral ischemia", The Journal of Thoracic & Cardiovascular Surgery, vol. 126(6), Dec. 1, 2003, 1851-1858.
Allen, Bradley S., et al., "Studies of isolated global brain ischaemia: I. A new large animal model of global brain ischaemia and its baseline perfusion studies", European Journal of Cardio-Thoracic Surgery vol. 41(5), May 1, 2012, 1138-1146.
Allen, Bradley S., et al., "Studies of isolated global brain ischaemia: II. Controlled reperfusion provides complete neurologic recovery following 30 min of warm ischaemia—the importance of perfusion pressure", European Journal of Cardio-Thoracic Surgery, vol. 41(5), May 1, 2012, 1147-1154.
Allen, Bradley S., et al., "Studies of isolated global brain ischaemia: III. Influence of pulsatile flow during cerebral perfusion and its link to consistent full neurological recovery with controlled reperfusion following 30 min of global brain ischaemia", European Journal of Cardio-Thoracic Surgery, vol. 41(5), May 1, 2012, 1155-1163.
Chen, Fuxiang, et al., "Necrostatin-I attenuates early brain injury after subarachnoid hemorrhage in rats by inhibiting necroptosis", Neuropsychiatric Disease & Treatment, vol. 13, Jul. 1, 2017, 1171-1782.
Stephenson, Barney T.F., et al., "Development and evaluation of human ex vivo normothermic machine liver perfusion for viability testing and investigation of the role of TWEAK/Fn14 in ischamia reperfusion injury", School of Immunology & Immunotherapy College of Medical and Dental Sciences, Jan. 1, 2018, 1-323.
Taunyane, Itumeleng C., et al., "Taunyane Itumeleng C. et al: Preserved brain morphology after controlled automated reperfusion of the whole body following normothermic", European Journal of Cardio-Thoracic Surgery, vol. 50(6), Dec. 1, 2016, 1025-1034.
Vrselja, Zvonnimir, et al., "Restoration of brain circulation and cellular functions hours post-mortem", Nature, vol. 568(7752), Apr. 1, 2019, 336-343.
Drewes et al., "Glycolysis and the Permeation of Glucose and Lactate in the Isolated, Perfused Dog Brain during Anoxia and Postanoxic Recovery", The Journal of Biological Chemistry, Apr. 10, 1973, vol. 218, No. 7, pp. 2489-2496, XP055630384.

(Continued)

*Primary Examiner* — Aaron J Kosar
(74) *Attorney, Agent, or Firm* — Saul Ewing LLP; Kathryn Doyle; Justin W. Crotty

(57) ABSTRACT

The invention provides a system for normothermic, ex vivo restoration and preservation of an intact mammalian brain, and other organs. In certain aspects, the system is capable of preserving a brain as well as other organs, maintaining cellular integrity and cellular function for hours post mortem or after global ischemia. The invention also provides synthetic brain perfusate formulations, including a novel brain perfusion medium (BPM), which are able to reduce reperfusion injury, stimulate recovery from hypoxia, prevent edema and metabolically support the energy needs of brain function.

23 Claims, 36 Drawing Sheets

(56) References Cited

OTHER PUBLICATIONS

International Search Report issued by the United States Patent and Trademark Office dated Apr. 24, 2019, for International Application No. PCT/US2019/017206.
Regalado Antonio, "Researchers are keeping pig brains alive outside the body", MIT Technology Review, Apr. 25, 2018, URL: https://www.technologyreview.com/s/611007/researchers-are-keeping-pig-brains-alive-outside-the-body, Mar. 30, 2019, XP055630386.
Albers et al. "Thrombectomy for stroke with selection by perfusion imaging." The New England journal of medicine 378.19 (2018): 1849-1850.
Barksdale et al. "Mitochondrial viability in mouse and human postmortem brain." The FASEB Journal 24.9 (2010): 3590-3599.
Budde et al. "Neurite beading is sufficient to decrease the apparent diffusion coefficient after ischemic stroke." Proceedings of the National Academy of Sciences 107.32 (2010): 14472-14477.
Ehrlich et al. "Effect of hypothermia on cerebral blood flow and metabolism in the pig." The Annals of thoracic surgery 73.1 (2002): 191-197.
Farahany et al. "The ethics of experimenting with human brain tissue." (2018): 429-432.
Horn et al. "Delayed neuronal death and delayed neuronal recovery in the human brain following global ischemia." Acta neuropathologica 85.1 (1992): 79-87.
Howells et al. "Different strokes for different folks: the rich diversity of animal models of focal cerebral ischemia." Journal of Cerebral Blood Flow & Metabolism 30.8 (2010): 1412-1431.
Hughes et al. "Full neurological recovery from profound (18.0 C) acute accidental hypothermia: successful resuscitation using active invasive rewarming techniques." Emergency Medicine Journal 24.7 (2007): 511-512.
Keep et al. "Brain water content: a misunderstood measurement?." Translational stroke research 3.2 (2012): 263-265.
Keyrouz et al. "Clinical review: Prevention and therapy of vasospasm in subarachnoid hemorrhage." Critical care 11.4 (2007): 1-10.
Kumar et al. "Mitochondrial dynamics following global cerebral ischemia." Molecular and Cellular Neuroscience 76 (2016): 68-75.
Lam et al. "Intracellular pH reduction prevents excitotoxic and ischemic neuronal death by inhibiting NADPH oxidase." Proceedings of the National Academy of Sciences 110.46 (2013): E4362-E4368.
Lee et al. "The changing landscape of ischaemic brain injury mechanisms." Nature 399.6738 (1999): A7-A14.
Lee, Jin-Moo, et al. "Brain tissue responses to ischemia." The Journal of clinical investigation 106.6 (2000): 723-731.
Lind et al. "The use of pigs in neuroscience: modeling brain disorders." Neuroscience & Biobehavioral Reviews 31.5 (2007): 728-751.
Marshall et al. "Regional citrate anticoagulation during simulated treatments of sustained low efficiency diafiltration." Nephrology 8.6 (2003): 302-310.
Offiah, et al. "Post-mortem CT and MRI: appropriate post-mortem imaging appearances and changes related to cardiopulmonary resuscitation." The British journal of radiology 89.1058 (2016): 20150851.
Park et al. "Interleukin-10 endogenously expressed in microglia prevents lipopolysaccharide-induced neurodegeneration in the rat cerebral cortex in vivo." Experimental & molecular medicine 39.6 (2007): 812-819.
Ransom et al. "Axons get excited to death." Annals of neurology 65.2 (2009): 120.
Sharma "Cardiac arrest-induced regional blood-brain barrier breakdown, edema formation & brain pathology: a light and electron microscopic study on a new model for neurodegeneration & neuroprotection in porcine brain." J Neural Transm 118.1 (2011): 87-114.
Shin et al. "Microglia expressing interleukin-13 undergo cell death and contribute to neuronal survival in vivo." Glia 46.2 (2004): 142-152.
Solenski et al. "Ultrastructural changes of neuronal mitochondria after transient and permanent cerebral ischemia." Stroke 33.3 (2002): 816-824.
Sousa et al. "Molecular and cellular reorganization of neural circuits in the human lineage." Science 358.6366 (2017): 1027-1032.
Stacy et al. "Multimodality imaging approach for serial assessment of regional changes in lower extremity arteriogenesis and tissue perfusion in a porcine model of peripheral arterial disease." Circulation: Cardiovascular Imaging 7.1 (2014): 92-99.
Verwer et al. "Cells in human postmortem brain tissue slices remain alive for several weeks in culture." The FASEB Journal 16.1 (2002): 54-60.
Zhang et al. "A universal scaling law between gray matter and white matter of cerebral cortex." Proceedings of the National Academy of Sciences 97.10 (2000): 5621-5626.
Greer et al., "Mechanisms of injury in hypoxic-ischemic encephalopathy: implications to therapy", Greer "Mechanisms of injury in hypoxic-ischemic encephalopathy: implications to therapy." In Seminars in neurology, vol. 26, No. 04, p. 373-379. Copyright © 2006 by Thieme Medical Publishers, Inc., 333 Seventh Avenue, New York, NY 10001, USA., 2006.
Borjigin et al., "Surge of neurophysiological coherence and connectivity in the dying brain", Borjigin et al. "Surge of neurophysiological coherence and connectivity in the dying brain." Proceedings of the National Academy of Sciences 110.35 (2013): 14432-14437.
Jung et al. "Reperfusion and neurovascular dysfunction in stroke: from basic mechanisms to potential strategies for neuroprotection." Molecular neurobiology 41.2 (2010): 172-179.
Moskowitz et al., "The science of stroke: mechanisms in search of treatments", Moskowitz et al. "The science of stroke: mechanisms in search of treatments." Neuron 67.2 (2010): 181-198.

\* cited by examiner

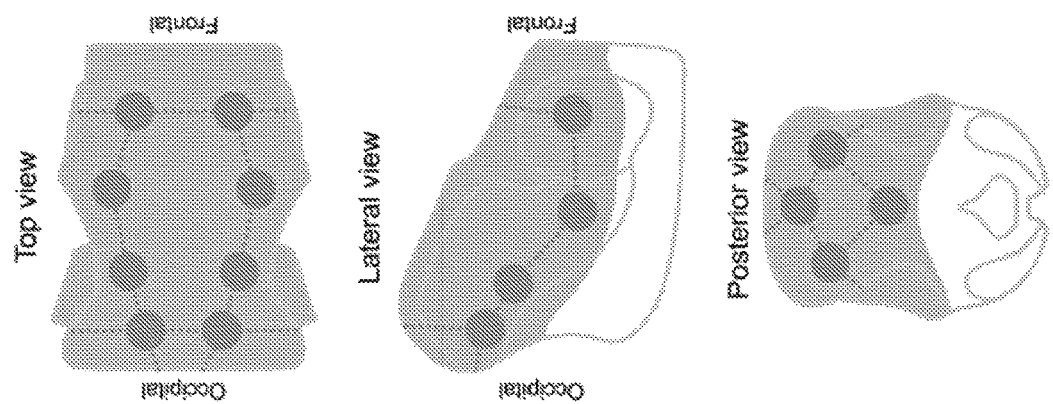
FIG. 2C Neurocranial opening and reduction

PERFUSION DEVICE FOR NORMOTHERMIC, EX VIVO PRESERVATION OF A MAMMALIAN BRAIN

CROSS-REFERENCE TO RELATED APPLICATIONS

This application is a 35 U.S.C. § 371 national phase application from, and claims priority to, International Application No. PCT/US2019/017206, filed Feb. 8, 2019, and published under PCT Article 21(2) in English, which claims the benefit of priority under 35 U.S.C. § 119(e) to U.S. Provisional Patent Application No. 62/628,621, filed Feb. 9, 2018, each of which is incorporated herein by reference in its entirety.

STATEMENT REGARDING FEDERALLY SPONSORED RESEARCH OR DEVELOPMENT

This invention was made with government support under MH105973 awarded by the National Institutes of Health. The government has certain rights in the invention.

BACKGROUND OF THE INVENTION

Cardiac arrest is a leading cause of death in the developed world, owing mostly to the profound sensitivity of the brain and other organs to prolonged global ischemia. Upon loss of cerebral perfusion, the brain's $O_2$ and ATP stores are depleted within seconds, resulting in the concomitant loss of electrical activity and consciousness. Failure to restore cerebral circulation within five minutes is considered to result in widespread neuronal cell loss, leading to brain death or severe and permanent neurological damage.

The brain's sensitivity to hypoxia is a consequence of its enormous energy demands. In mammals, the brain requires 20% of the body's oxygen and glucose, despite accounting for 2% of body mass. Absence of metabolic support leads to failure of membrane repolarization, ionic imbalances, and extracellular accumulation of glutamate, which cause cytotoxic edema and excitotoxicity. Further cell death results from hypoxia-induced inflammation, and various forms of edema that are a consequence of cerebral hypoperfusion. Convergence of these factors is proposed to rapidly initiate a widespread, and largely irreversible, cascade of apoptosis, necrosis, and axonal damage.

However, several observations have questioned the inevitability of catastrophic neural cell death minutes after cessation of cerebral perfusion. Firstly, high-quality proteins and nucleic acids, as well as tissue specimens with sufficient viability for cell and organotypic slice cultures can be harvested hours post-mortem from human brains; secondly, mitochondria remain functional up to 10 hours post mortem in human neural cells; and thirdly, full neurological recovery from prolonged asystole occurs in cases of hypothermia. Together these data suggest that in the context of global brain ischemia, the initiation and duration of cell death may span a longer temporal interval than is currently appreciated. Moreover, these findings suggest that cell viability of the intact brain and likely other organs may be restored and preserved after prolonged anoxia in the appropriate experimental paradigm and with the right technological advancement.

There is thus a need in the art for methods and systems which allow for ex vivo, normothermic preservation cellular structure and function in the intact mammalian brain. Additionally, there remains a need in the art for compounds and compositions which maintain cell viability in said brains after global ischemia.

SUMMARY OF THE INVENTION

The present invention relates to a perfusate composition that includes a culture medium having glucose, one or more amino acids, one or more water soluble salts and one more vitamins; one or more artificial oxygen carrier compounds; and one or more compounds selected from the group consisting of anti-cytotoxic compounds, antioxidants, anti-necrotic compounds, antiexcitotoxic compounds, anti-inflammatory compounds, antiepileptic compounds, anti-apoptotic compounds, antibiotics, cell death inhibitors, neuroprotectants and oxidative/nitrosative stress inhibitors.

In some embodiments the perfusate composition of the present invention includes culture medium having one or more amino acids selected from the group consisting of glycine, L-alanyl-glutamine, L-arginine, L-cysteine, L-histidine, L-isoleucine, L-leucine, L-lysine, L-methionine, L-phenylalanine, L-serine, L-threonine, L-tryptophan, L-tyrosine, L-valine and salts and solvates thereof.

In some embodiments, the culture medium includes one or more vitamins selected from the group consisting of choline, D-calcium pantothenate, folic acid, niacinamide, pyridoxine, riboflavin, thiamine, ascorbic acid, i-inositol and salts and solvates thereof. In some embodiments, the culture medium is Dulbecco's modified Eagle's medium.

In some embodiments the one or more artificial oxygen carrier compounds of the perfusate composition includes one or more of isolated cell-free hemoglobin, cross-linked hemoglobin, polymerized hemoglobin, encapsulated hemoglobin, and perfluorocarbon oxygen carriers. In some embodiments, the one or more artificial oxygen carrier compounds are cross-linked hemoglobin.

In some embodiments, the composition includes Dulbecco's modified Eagle's medium, cross-linked hemoglobin, 2-Iminobiotin, Necrostatin-1, Ceftriaxone, Glutathione, Minocycline, Lamotrigine, QVD-Oph, NXY-059 (disufenton sodium), Methylene Blue, and sodium 3-hydroxybutyrate, or any salts, solvates, tautomers, and prodrugs thereof. In some embodiments, the composition includes Dulbecco's modified Eagle's medium, polymerized hemoglobin, 2-Iminobiotin, glutathione monoethyl ester, minocycline, lamotrigine, methylene blue, NXY-059, and sodium 3-hydroxybutryate or any salts, solvates, tautomers, and prodrugs thereof. In some embodiments, the composition further comprises an ultrasound contrast agent. In some embodiments, the ultrasound contrast agent is a composition comprising micrometer-sized air-filled polymeric particles. In some embodiments, the ultrasound contrast agent is PolySon™ L.

In some embodiments, the culture medium is selected from the group consisting of VIASPAN® (University of Wisconsin solution), Bretschneider's Solution (Histidine-Tryptophane-Ketoglutarate [HTK] Solution), CELSIOR™ Solution, Kyoto University Solution, IGL-1 Solution, Collins' Solution, Citrate-Phosphate-Dextrose Solution, HIBERNATE®-A Medium, HIBERNATE®-E Medium, BRAINPHYS™ Medium, NEUROBASAL™ Medium, and STEMDIFF™ Medium.

In certain aspects, the invention relates to a system for the normothermic, ex vivo preservation of a mammalian brain, where the system includes a perfusion device for the perfusion of a mammalian brain, the perfusion device comprising: a perfusion loop; and a controller programmed to regulate at least a perfusate temperature within the perfusion loop to maintain normothermic conditions; and the perfusate composition as described above.

In some embodiments, the perfusion loop further includes at least one pulse generator programmed to generate a pressure pulse within the perfusate within the perfusion loop. In some embodiments, the perfusion device includes a brain enclosure unit adapted and configured to receive and house a mammalian brain; a perfusion loop adapted and configured to oxygenate/carboxygenate a perfusate and circulate the perfusate through a brain contained within the brain enclosure unit; and a heat exchange unit adapted and configured to regulate the temperature of the brain enclosure unit and the perfusion loop. In some embodiments the perfusion loop includes a venous loop, a filtration loop and an arterial loop, wherein: the venous loop comprises at least one perfusion pump; the filtration loop comprises at least one perfusion pump, and at least one hemodiafiltration unit adapted and configured to remove metabolic toxins from and add nutrients to the perfusate; the arterial loop comprises at least one gas exchange source and at least one gas mixer adapted and configured to supply oxygen and carbon dioxide to the perfusate; wherein the brain enclosure unit, venous loop, filtration loop and arterial loop are in fluidic communication such that the perfusate can be carried from the brain enclosure unit, through the venous loop, through the filtration loop, through the arterial loop and back to the brain enclosure unit. In some embodiments, one or more components selected from the group consisting of the venous loop, the filtration loop and the arterial loop further comprise a reservoir containing excess perfusate. In some embodiments, one or more components selected from the group consisting of the brain enclosure unit, the venous loop, the filtration loop and the arterial loop further comprise one or more elements selected from the group consisting of: one or more valves adapted and configured to regulate the flow of the perfusate; one or more filters adapted and configured to filter the perfusate; and one or more sensors for measuring one or more properties of the perfusate selected from the group consisting of pH, dissolved oxygen concentration, dissolved carbon dioxide concentration, dissolved metabolite concentration, temperature, pressure, and flow rate. In some embodiments, the one or more sensors measure the concentration of at least one dissolved metabolite selected from the group consisting of nitric oxide, lactate, bicarbonate, oxygen, carbon dioxide, total hemoglobin, methemoglobin, oxyhemoglobin, carboxyhemoglobin, sodium, potassium, chloride, calcium, glucose, urea, ammonia, and creatinine. In some embodiments, the brain perfusion apparatus comprises one or more sensors for measuring one or more properties of the perfusate selected from the group consisting of pressure and flow rate. In some embodiments, one or more components selected from the group consisting of the brain enclosure unit, the venous loop, the filtration loop and the arterial loop comprise one or more heat exchange units comprising: one or more heat exchangers; one or more temperature regulation units; one or more temperature regulating pumps; a thermoregulation fluid; and one or more pipes configured and adapted to transport the thermoregulation fluid, wherein the one or more pipes are in fluidic communication with the one or more heat exchangers, the one or more temperature regulation units and the one or more temperature regulating pumps.

In some embodiments, the one or more components selected from the group consisting of the brain enclosure unit, the venous loop, the filtration loop and the arterial loop comprise one or more sensors adapted and configured to measure the temperature within the perfusion device. In some embodiments, the one or more sensors adapted and configured to measure the temperature within the perfusion device, the one or more temperature regulation units and the one or more temperature regulating pumps are in electronic communication with a computer programmed to regulate the temperature of the thermoregulation fluid and the specified flow rate of the one or more temperature regulating pumps to maintain a specified temperature within the perfusion device.

In some embodiments, the hemodiafiltration unit is adapted and configured to remove one or more metabolic toxins from the perfusate selected from the group consisting of water, lactate, dissolved gases, ammonia, atrial natriuretic peptide, β2-microglobulin, β-endorphin, cholecystokinin, Clara cell protein, creatinine complement factor D, cystatin C, degranulation inhibitor protein, delta sleep-inducing peptide, endothelin, glutamate, hyaluronic acid, IL-1α, IL-6, κ-Ig light chain, λ-Ig light chain, neuropeptide Y, retinol-binding protein, tumor necrosis factor-α, uric acid, urea, IFN-γ, IL-1β, IL-18, and glutamate. In some embodiments, the hemodiafiltration unit is adapted and configured to supply one or more nutrients to the perfusate, selected from the group consisting of Glycine, L-Alanyl-Glutamine, L-Arginine hydrochloride, L-Cystine, L-Histidine hydrochloride-H2O, L-Isoleucine, L-Leucine, L-Lysine hydrochloride, L-Methionine, L-Phenylalanine, L-Serine, L-Threonine, L-Tryptophan, L-Tyrosine, L-Valine, Vitamins, Choline chloride, D-Calcium pantothenate, Folic Acid, Niacinamide, Pyridoxine hydrochloride, Riboflavin, Thiamine hydrochloride, i-Inositol, Inorganic Salts, Calcium Chloride ($CaCl_2$-$2H_2O$), Ferric Nitrate ($Fe(NO_3)_3$ $9H_2O$), Magnesium Sulfate ($MgSO_4$-$7H_2O$), Potassium Chloride (KCl), Sodium Bicarbonate ($NaHCO_3$), Sodium Chloride (NaCl), Sodium Phosphate monobasic ($NaH_2PO_4$-$2H_2O$), Other Components, D-Glucose (Dextrose), Phenol Red, Sodium Pyruvate, free fatty acids, cholesterol and nucleic acid constitutes.

In some embodiments, the mammalian brain is a brain from a source selected from the group consisting of murine, canine, ovine, porcine, bovine and primate sources. In some embodiments, the mammalian brain is a human brain. In some embodiments, the mammalian brain is maintained ex cranio.

In some embodiments, the system as described herein is mounted on a movable housing. In some embodiments, the system as described herein perfuses the brain with the perfusate at a cardiac pulsatile pressure of about 20 mmHg to about 140 mmHg. In some embodiments, the system as described herein perfuses the brain with the perfusate through the pulse generator at a rate of about 40 to about 180 beats per minute.

In some embodiments, the system as described herein further includes a computer in electronic communication with one or more elements of the system.

In certain aspects, the present invention provides a preserved, ex vivo mammalian brain perfused with the perfusate composition described above, wherein the brain maintains morphofunctional integrity under normothermic conditions. In some embodiments, the brain is the brain of a deceased mammal. In some embodiments, the mammal has been deceased for greater than 1 hour. In some embodiments, the mammal has been deceased for greater than 4 hours. In some embodiments, the brain is suffering from brain ischemia or cerebral hypoxia. In some embodiments, the ex vivo perfused brain maintains one or more properties selected from the group consisting of an in vivo rate of cerebral metabolism, in vivo level of neural cell function and viability, and an in vivo level of neural morphology longer than an ex vivo brain which has not been perfused. In some embodiments, the mammalian brain is a brain from a source selected from the group consisting of murine, feline, canine, ovine, porcine, bovine and primate sources. In some embodiments, the mammalian brain is a human brain.

In certain aspects, the present invention provides a method for preparing an intact mammalian brain under normothermic, ex vivo conditions, where the method includes: isolating and cannulating the bilateral common carotid arteries; flushing the brain with a heparinized saline solution through the arteries to remove blood; optionally storing the brain on ice for a period of time; isolating the bilateral external carotid arteries, internal carotid arteries, occipital arteries, ophthalmic, vertebral, basilar, along with other smaller branches serving the brain; ligating all arteries except for the internal carotid artery to prevent vascular shunting and to selectively perfuse the brain; surgically removing the excess tissue from the skull while rendering the arteries undamaged; surgically removing the cranium from the brain to render the brain ex cranio for experimental manipulation; connecting the free-end arteries to the perfusion device as described herein. In some embodiments, the method further includes administering to the brain a composition comprising one or more vasoactive compounds. In some embodiments, the one or more vasoactive compounds are selected from the group consisting of nimodipine, irsadipine, nifedipine, nitrendipine, amlodipine, flunarizine, bepidril, fluspirilene, fendiline, carbon dioxide, nitric oxide, nicorandil, isosorbide dinitrate, isosorbide mononitrate, sumatriptan, zolmitriptan, naratriptan, rizatriptan, alotriptan, eletriptan, frovatriptan, α1-adrenergic receptor ligands, α1-adrenergic receptor agonists, α1-adrenergic receptor antagonists, α2-adrenergic receptor ligands, α2-adrenergic receptor agonists, α2-adrenergic receptor antagonists, β-adrenergic receptor ligands, β-adrenergic receptor agonists, β-adrenergic receptor antagonists, sitaxentan, ambrisentan, atrasentan, BQ-123, zibotentan, bosentan, macitentan, tezosentan, magnesium sulfate, papaverine, nafronyl, and hexobendine. In some embodiments, the method further includes circulating a perfusate through the brain of the invention

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

FIGS. 2A-2E are schematic representations of brain isolation procedure and connection to a system of the invention. FIG. 2A is a diagram depicting the surgical procedure for initially reducing the porcine skull after decapitation at the C3 vertebra. Dotted orange lines represent cuts through the naso-frontal suture, extending ventrally through the mandible (1); through the zygomatic process of the temporal bone and malar bone (2, 3); and, through the supraorbital process (4). Dotted maroon lines represent the planes of disarticulation of the temporomandibular and atlanto-occipital joints. FIG. 2B is a diagram showing arterial dissection, ligation, and removal of soft cranial soft tissue. To prevent vascular shunting, the VAs, BA, OAs, ECAs, and OphAs were ligated with sutures (asterisks), while the ICAs were left patent. Basilar Artery (BA); Vertebral Artery (VA); Occipital Artery (OA); Common Carotid Artery (CCA); External Carotid Artery (ECA); Internal Carotid Artery (ICA); Rete Mirabile (RM); Ophthalmic Artery (OphA). Smaller vessels such as the ramus anastomoticus, arteria anastomotica, and variable branches originating from the ascending pharyngeal artery are also ligated/cauterized (not depicted).

FIG. 2C is a diagram showing neurocranial opening and reduction. Dark dots represent burr holes that are connected with dashed lines; shaded area represents area of the skull that is entirely removed at the end of the procedure. FIG. 2D is a diagram showing a largely ex cranio whole brain connected to the system of the invention. FIG. 2E is a schematic representation of the components necessary for the connection of the porcine brain to the arterial ends of the system of the invention.

FIG. 3A is a cranial ultrasound with midsagittal view of porcine brain demonstrating perfusion of large cerebral arteries ICA, PcoA, ACA, and PA. FIGS. 3B-3C are ultrasounds showing coronal view depicting robust perfusion through MCA, PCA, and BA. FIG. 3D is a power waveform analysis of the PA revealing low downstream vascular resistance (Resistance Index [RI]: 0.55). FIG. 3E is a set of images of gross anatomical inspection of the central cortical vein revealing that the vessel is filled with the synthetic perfusate (arrow), and the fine network of cerebral vessels (asterisk) are visible (precompression). After compression of the central cortical vein (arrow), the vein is observed to progressively refill (arrow heads), indicating that capillaries are patent and arteriovenous flow is restored and maintained. FIGS. 3F-3H are three-dimensional renderings of high-resolution computed tomography angiography in perfusion brains injected with bismuth nanoparticle contrast agent depicting patent precapillary arterioles. FIG. 3I is a color Doppler analysis shows flow increase in PA after 0.3 mg nimodipine (nimo) intervention after 6-hour LOP. FIG. 3J is a graph showing quantification of relative percentage flow change pre- and post-nimo administration.

FIG. 3L is a three dimensional rendering of high-resolution specimen-CTA of the hippocampus of BEx-perfused brain revealing extensive vascular network (left). Scale: 1 mm. Enlarged area (right) of the red box with three examples (numbered red lines) of pre-capillary arterioles of varying size. Scale: 50 Relative scale of microcirculatory vessels with the corresponding vessel diameters measured in the far-right. 25 µm represents the technical limit of the high-resolution specimen-CTA. FIG. 3M shows intravascular hemoglobin fluorescent in the CA1 field across all experimental conditions. In comparison to 1 hour PMI and control perfusate conditions, fluorescent signal is found in precapillary arterioles (arrowhead) and capillaries (arrow) of both 10-hour PMI controls and BEx perfusate, indicating that the BEx perfusate reperfuses cerebral microcirculation. FIG. 3N is a representative capillary EM microphotograph from the hippocampal CA1 zone after BEx perfusion. Blood vessel lumen (BL) is filled with electron-dense material (*), which represents the hemoglobin-based BEx perfusate. Pericytes and endothelial cells (highlighted semitransparent green and blue, respectively) demonstrate normal ultrastructure and contain cell nuclei (N), mitochondria (m), and cisterns of rough endoplasmic reticulum (rer). Adherence junctions between endothelial cells (aj) are visible. Scale bar: 1 µm.

FIG. 3O is the quantification of examined capillaries that are either filled or unfilled with the BEx perfusate evidences that the vast majority of capillaries are patent and perfused. Two-tailed unpaired t-test (t=16.7, df=4); P<0.001; n=3 animals. ***P<0.001. All data are means±SEM. FIG. 3P depicts intravascular hemoglobin fluorescent signal in the prefrontal neocortex across all conditions. In comparison to 1-hour PMI and control perfusate conditions, the fluorescent signal is found in precapillary arterioles (arrowhead) and capillaries (arrow) of both 10-hour PMI controls and BEx perfusate. FIG. 3Q Representative capillary EM microphotographs from the prefrontal neocortex after BEx perfusion. Blood vessel lumen (BL) is filled with electron-dense material, which represents the hemoglobin-based BEx perfusate. FIG. 3R depicts quantification of the number of examined prefrontal neocortical capillaries filled or unfilled with BEx perfusate. FIG. 3S depicts micro-CT Angiography demonstrates patency of major arterial vessels as well as arterioles in both the occipital lobe as well as cerebellum. OL, occipital lobe; V, vermis; LC, lateral cortex; CP, choroid plexus; L, left; R, right. FIG. 3T-3U depict intravascular hemoglobin fluorescent signal in the occipital neocortex and cerebellar cortex, respectively demonstrating perfused precapillary arterioles (arrowhead) and capillaries (arrow) in both 10-hour PMI controls and BEx perfusion.

FIG. 4A depicts representative traces of power waveform analysis of the waveform cycle (systole and diastole) from each of the 4 phases observed under control perfusate conditions. Each phase occurs in chronological order during the experimental timeline, revealing a progressive deterioration of the low-resistance pressure waveform structure. In each phase, there is a corresponding decrease in the relative mean flow velocity (MFV), culminating in negligible net forward flow (reverberated pattern) in Phase 4 (6-hour LOP). Phase 1 is defined by a normal, low-resistance waveform; phase 2 displayed an increase in PSV, narrowed systole, and decreased EDV; phase 3 demonstrates decreased PSV and loss of EDV; phase 4 exhibits a reverberated "no-flow" phenomenon. Intervening in Phase 3 with an increase in mean arterial pressure resulted in a transient increase in flow (red trace vs pink trace) that reverted back to negligible forward flow soon after in Phase 4 (red and blue trace vs pink and sky blue). PSV: Peak Systolic Velocity; EDV: End Diastolic Velocity. FIG. 4B-4C are power waveform analysis from a representative control perfusate brain during Phase 3 with corresponding trace (right) evidencing a MFV of 3 cm/s (B). Additionally, power waveform analysis from a representative control perfusate brain at 6-hour LOP demonstrates Phase 4 dynamics with corresponding trace (right) depicting MFV of 0 cm/s. Contrastingly, power waveform analysis from a representative BrainEx perfusate brain taken at 6-hour LOP demonstrates that at this time point BEx perfusion exhibits Phase 1 dynamics (C). FIG. 4D-4E are plots of resistance index (RI) during the course of experimentation in control and BEx perfusate conditions. RI was calculated via Doppler ultrasound measurement and utilizing the formula RI=(PSV−EDV)/PSV. Intervention period is included above control perfusate curve to delineate the time period in which mean arterial pressures were increased during control perfusate conditions. FIG. 4E Quantification of the RI at normothermia under control-perfusion and BEx perfusate conditions. Two-tailed unpaired t-test (t=5.638, df=28); ***P<0.001; n=3 animals per group, n=6 measurements per time point. All data are means±SEM.

FIG. 5A shows representative T1-weighted magnetic resonance imaging (Mill) scans of perfused and unperfused porcine brains. Ten-hour PMI exhibited collapsed lateral ventricles (LV; green trace), and reduced anterior-posterior diameter (APD) and length of corpus callosum (LCC), indicative of overall brain constriction and decrease in water content. Axial and sagittal planes reveal dropout signals indicative of gas accumulation (arrowheads) as well as a deterioration of gray-white matter contrast (inset). Control perfusate resulted in robust decrease in global signal intensity, diffuse tissue irregularities, and expansion of lateral ventricles (green trace) as revealed by an upward bowing of the corpus callosum and an increased LCC and APD. Control perfusate condition also demonstrated an increase in cortical gray-white matter contrast, depicting the presence of cortical edema. In contrast, BEx perfusate demonstrated preserved neuroanatomical structure as evidenced by clear distinctions among anatomical landmarks (inset), normal lateral ventricles size (green trace), and typical gray-white matter contrast. APD and LCC further revealed normal ventricular integrity. Ca, caudate; Ctx, cerebral cortex; EC, external capsule; IC, internal capsule; Pu, putamen. Scale: 1 cm. FIG. 5B, depicts a schematic representing the location of tissue sampling. FIG. 5C, depicts the measurement of tissue water content evidences no significant difference between BEx perfusate and 1-hour PMI controls, with a concurrent decrease and increase in water content in 10-hour PMI and control perfusate, respectively. One-way ANOVA (P=0.0013) with post-hoc Dunnett's adjustment; (*P<0.01). Data are means±SEM.

FIG. 7A illustrates Hippocampal Nissl stains from all four experimental conditions depicting preservation of regional cytoarchitectural integrity in BEx-perfused brains. Insets display an example of a vascular vessel filled with hemoglobin-based perfusate, as compared to control perfusate conditions. FIG. 7B depicts representative fields of view (left), with a higher magnification field (right) corresponding to the boxed area of the CA1 and dentate gyrus regions demonstrating preserved neuronal structure and cytoarchitecture in BEx perfused brains. FIGS. 7C-7D depict the quantification of neuronal cell density in both the CA1 and dentate gyrus reveals that only BEx perfusate maintains neuronal cell numbers compared to 1-hour PMI controls. FIG. 7E depicts quantification of the percentage of cells that exhibit swollen, or ellipsoid, morphology in the CA1 region. FIG. 7F is a set of representative confocal max intensity projections of immunohistochemical stains for the neuronal marker NeuN (NeuN; green) with DAPI counterstain (Blue) as well as the activated form of the apoptotic execution protein, Caspase-3 (actCASP3; green) in the CA1 and Dentate. For actCASP3 images, the right image depicts a digital zoom of the boxed area (left). Scale bar: 50 μm (NeuN/DAPI), 50 μm (actCASP3/DAPI; left), 10 μm (actCASP3/DAPI; right). FIGS. 7G-7H are normalized graphs quantifying the percentage of actCASP3 positive nuclei in the CA1 and dentate gyrus demonstrate a reduction in nuclear actCASP under BEx perfusion conditions. CA1: One-way ANOVA ($P<0.001$) with post-hoc Dunnett's adjustment (*$P<0.05$, ***$P<0.001$). n=6 animals per condition. Dentate gyms: One-way ANOVA ($P<0.001$) with post-hoc Dunnett's adjustment (*$P<0.05$, ***$P<0.001$); n=6 animals per condition. All data are means±SEM.

FIG. 9A depicts representative Nissl stains (top) with higher magnification of boxed area (below) of the prefrontal neocortex demonstrating preserved neuronal structure and anatomical cytoarchitecture in BEx perfused brains. Clearly defined pyramid-shape cells bodies as well as apical and basal dendrites are present only in BEx perfused brains. Scale bar: 350 μm (top), 100 μm (bottom). FIG. 9B depicts representative Nissl stains of the primary motor cortex reveal preserved Betz cell (arrows) structure under BEx perfusion conditions, despite these cells having been axotomized following decapitation. FIG. 9C depicts representative confocal tile scans of immunohistochemical stains for the pan-neuronal marker RBFOX3 (NeuN; green) in the prefrontal neocortex. Scale: 50 μm. FIG. 9D depicts maximum intensity confocal projections of NeuN staining. Note that neurons exhibit a swollen morphology in 1-hour PMI, and significant cellular destruction in 10-hour PMI and control perfusate conditions (arrowheads), while neurons in the BEx perfusion condition display typical elongated morphology (arrows). Scale: 50 μm. FIG. 9E depicts maximum intensity projections of excitatory neuronal cell marker, Neurogranin (NRGN; green), show a preservation of typical morphology of cortical pyramidal neurons under BEx perfusion (arrows), with swollen morphology under 1-hour PMI conditions (arrow). There is evidence of clear cell destruction and the presence of enlarged vacuoles under 10-hour PMI and control perfusate conditions (arrowheads). Scale: 50 μm. FIG. 9F depicts maximum intensity projections of the inhibitory interneuron cell marker, GAD1 (red). In 10-hour PMI and control perfusate specimens, GAD1 staining reveals contracted cell bodies with a loss of GAD1-positive somal contacts as compared to 1-hour PMI (arrows) and BEx perfusion (arrows). Scale: 50 μm. FIG. 9G depicts the quantification of the number of neuronal cells present in the prefrontal neocortex. Data is computed from Nissl stains. One-way ANOVA ($P<0.001$) with post-hoc Dunnett's adjustment. (*$P<0.001$); n=6 animals per condition; NS, not significant. FIG. 9H depicts quantification of the percentage of cells that exhibit a swollen, or ellipsoid morphology. Data is analyzed from Nissl stains. One-way ANOVA ($P<0.001$) with post-hoc Dunnett's adjustment; ($P<0.01$, ***$P<0.001$); n=6 animals per group. All data are means±SEM.

FIGS. 9I-9J depict quantification of the total number of NRGN- and GAD1-positive cells, respectively, in the neocortex. One-way ANOVA (NRGN+: $P=0.002$; GAD1+: $P<0.001$) with post-hoc Dunnett's adjustment. (*$P<0.05$, $P<0.01$, *$P<0.001$); n=6 animals per group. All data are means±SEM.

FIG. 10A depicts immunohistochemical staining for myelin basic protein (MBP) in the prefrontal neocortex (top) with high-magnification images depicting fiber orientation and bundles (bottom). Scale Bar: 100 μm (top), 50 μm (bottom). FIG. 10B is an analysis of individual axonal angles in relation to the pial surface across all experimental conditions. BEx and 10-hour PMI conditions demonstrate an increase in number of axons orthogonally oriented to the pial surface, while 1-hour PMI and control perfusate specimens exhibit an increase in axons oriented in more acute angles. Pairwise comparisons by two-tailed Chi-square analysis with Yates correction with df=1 and n=786 axons were analyzed per pairwise comparison; χ2 range (4.312-18.096). (*$P<0.05$,

P<0.01, *P<0.001); NS, not significant. FIG. 10C is a quantification of the density of myelinated fiber bundles across experimental conditions. One-way ANOVA (P<0.001) with post-hoc Dunnett's adjustment; (***P<0.001); n=3 animals per group. All data are means±SEM.

FIG. 11A are representative Nissl stains (top) with higher magnification of boxed area (below) of the occipital neocortex demonstrating preserved regional cytoarchitectonics as well as neuronal structure in BEx perfused brains. Pyramidal-shaped cell bodies as well as apical and basal dendrites are present in both 1-hour PMI and BEx perfused brains. An inverted pyramidal neuron structure is also appreciable under BEx perfusion (arrow). Scale: 350 μm (top), 100 μm (bottom). FIG. 11B are representative Nissl stains of the cerebellar cortex reveal preserved Purkinje cell structure in 1-hour PMI and BEx perfusion brains, when compared to 10-hour PMI and control perfusate conditions (arrows).

FIG. 12A depicts representative confocal max intensity projection of immunohistological staining for the cleaved, activated form of the apoptotic execution protein, caspase-3 (actCASP3; green). (Bottom) Enlargement of the boxed area above. Scale: 50 μm (top); 10 μm (bottom). FIG. 12B depicts quantification of normalized actCASP3-positive nuclei. One-way ANOVA (P<0.001) with post-hoc Dunnett's adjustment. (*P<0.05, P<0.01, *P<0.001); n=6 animals per condition. All data are means±SEM. FIG. 12C depicts time-course analysis of activated caspase-3 localization in the unperfused brain at various post-mortem intervals in the CA1 field, dentate gyrus, and prefrontal neocortex. At 1-hour PMI there is robust nuclear localization of cleaved caspase-3 across all brain regions; however, this signal decreases with increased post-mortem intervals.

FIG. 13A is a set of representative confocal tile scans of immunohistochemical stains for astrocytes (GFAP; red) and microglia (IBA1; green) in the PFC evidences a robust preservation of glial cell structure under synthetic perfusion conditions. Scale bar 200 μm. FIG. 13B is a set of representative high magnification confocal max intensity projections of GFAP- and IBA1-positive cells. Scale bar 50 μm. FIGS. 13C-13D is the quantification of IBA1+ and GFAP+ cell density, respectively. One-way ANOVA (IBA1+; P<0.001, F[3,20]=38.77; GFAP+; P<0.001, F[3,2]=28.09) with post-hoc Dunnett's adjustment. (***P<0.001); n=6 animals per group. FIG. 13E is a schematic representing the location of intracortical LPS injection. FIG. 13F demonstrates multiplex inflammatory cyto/chemokine profile analysis in the prefrontal neocortex following intracranial LPS injection which shows a significant increase in IL-1α, IL-1β, IL-6, and IL-8 levels only under BEx perfusion conditions, indicating preserved glial reactivity to an immunogenic stimulus. One-way ANOVA (IL-8 P=0.016, F[2,6]=8.793; IL-6 P=0.013, F[2,6]=9.709; IL-1β P=0.0145, F[2,6]=9.312) with post-hoc Dunnett's adjustment. Kruskal-Wallis (IL-1α P=0.0357; KW=6.563) with post-hoc two-stage step-up method of Benjamin, Krieger, and Yekutieli (*P<0.05); n=3 animals per group; each sample was analyzed in technical duplicate; ND, non-detectable. All data are means±SEM.

FIGS. 14A-14B show representative confocal max intensity projections of immunohistochemical stains for astrocytes (GFAP; red) and microglia (IBA-1; green) in the CA1 and Dentate regions of the hippocampus evidences a robust preservation of glial cell structure under synthetic perfusion conditions.

FIG. 15A is a set of representative electron microscopy microphotographs of synapses of the CA1 region of the hippocampus. FIG. 15B is a graph quantifying the number of synaptic vesicles present in presynaptic bouton depicts significantly greater number of vesicles under synthetic perfusate conditions as compared to 10-hour PMI and saline brains. All data are means±SEM. *P<0.05, one-way ANOVA comparing synth perf to all other conditions; n=6-8 synapses from biological triplicates for each condition. NS, not significant. FIGS. 15C-15E show electrophysiological properties of CA3 pyramidal neurons following 6 hours of perfusion with synthetic perfusate. FIG. 15C is a set of representative sub- and supra-threshold voltage traces in response to hyperpolarizing and depolarizing rectangular pulses of current from a resting potential of −70 mV. Stimulus size is indicated on the left. FIG. 15D is a family of inward and outward currents mediated by voltage-dependent sodium and potassium channels.

FIG. 15E is a set of representative traces of spontaneous excitatory postsynaptic currents (sEPSCs) recorded at a holding potential of −70 mV. FIG. 15F is a representative electrocorticograph of synthetic-perfusate perfused brain.

DETAILED DESCRIPTION OF THE INVENTION

Figure 1A:
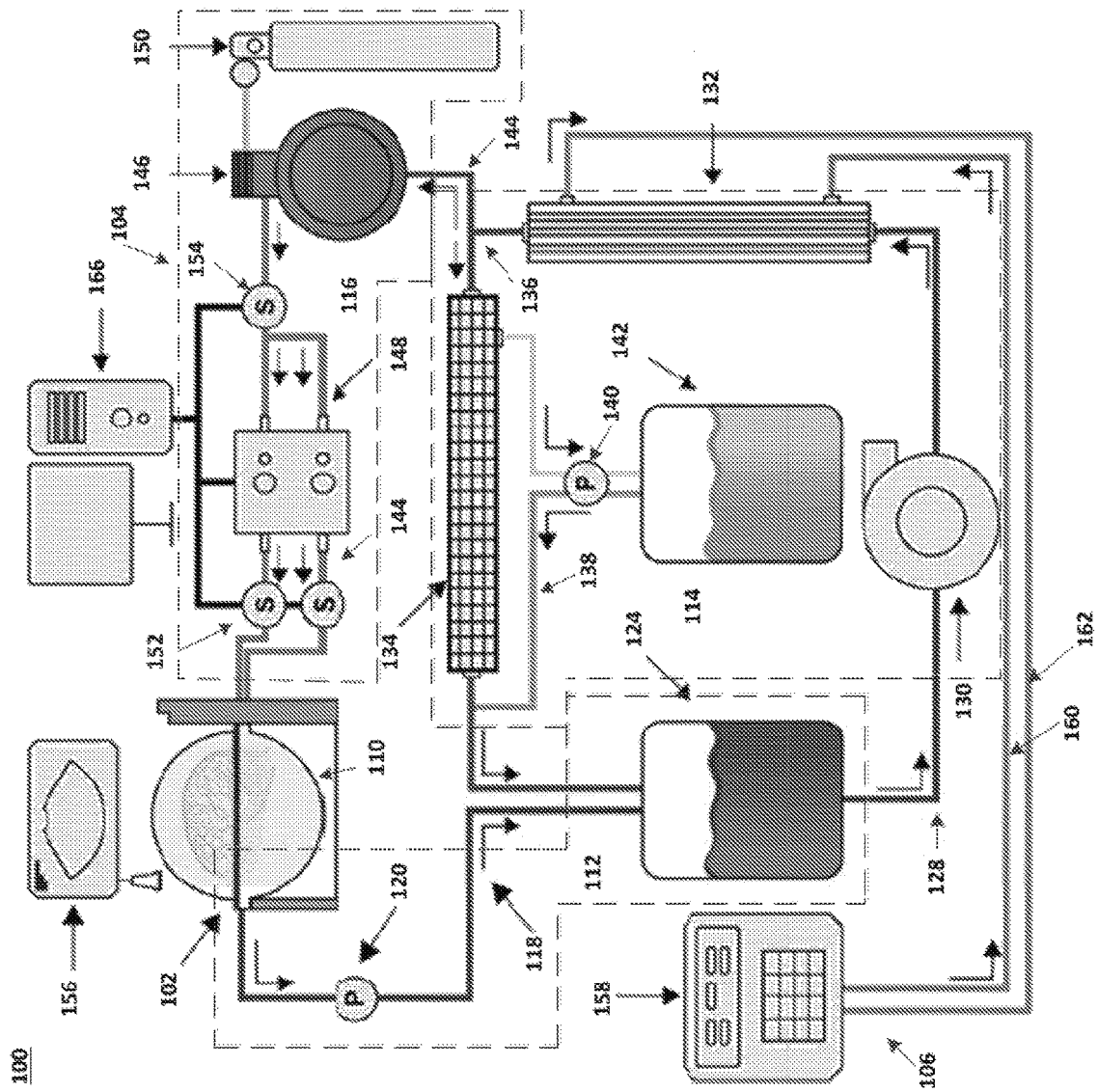
FIG. 1A is a schematic representation of an ex vivo brain preservation system according to an embodiment of the invention. The diagram illustrates the closed-loop perfusion circuitry of the system with arterial and venous circulation.

The invention provides a novel system for normothermic, ex vivo restoration and preservation of an intact mammalian brain. In certain aspects, the system is capable of preserving a brain and restoring and maintaining cellular integrity and cellular function for hours post mortem or after global ischemia. The invention also provides novel synthetic brain perfusate formulations, including a novel brain perfusion medium (BPM), which are able to reduce reperfusion injury, stimulate recovery from hypoxia, prevent edema and metabolically support the energy needs of brain function. Additionally, the invention includes the surgical method/procedures developed to isolate the vasculature of the brain, remove extracranial tissues and bone, while also rendering the brain ex cranio. In combination, the system, perfusate, and surgical method attenuate cell death, preserve anatomical and cellular integrity and restore cellular function as indicated by neurovascular and glial responsiveness to pharmacological and immunogenic interventions, active metabolism and electrical activity. The invention further provides methods of using device and perfusion medium, comprising the use of vasodilators, to prevent the collapse of brain vasculature and to allow for better perfusion of the brain.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described. As used herein, each of the following terms has the meaning associated with it in this section.

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "hypoxic" refers to a concentration of dissolved oxygen less than about 13%, corresponding to a partial pressure of about 100 mmHg, the physiologic partial pressure of oxygen in the alveoli of the lung.

As used herein, the term "cellular hypoxia" refers to a cellular response to exposure to a hypoxic environment, often resulting in apoptosis, or cellular death.

As used herein, the term "anaerobic metabolism" refers to the cellular consumption of glucose to produce two molecules of lactate, with the lactate remaining in dissolved in solution. The ratio of lactate produced to glucose consumed will be 2:1.

As used herein, the term "aerobic metabolism" refers to the cellular consumption of glucose to produce two molecules of lactate, both of which will be consumed through the Krebs cycle in the presence of sufficient levels of oxygen. The ratio of lactate produced to glucose consumed will be 0:1.

As used herein, the term "normothermic" refers to a body temperature within normal bounds. Normothermic preservation of an organ is preservation of the organ without using cryogenic temperatures. For example, "normothermic" temperatures include, but are not limited to, temperatures between about 25° C. and about 42° C., temperatures between about 30° C. and about 38° C., temperatures between about 37° C. and about 37.5° C., and the like. As used herein, the term "salt" embraces addition salts of free acids or free bases that are compounds useful within the invention. Suitable acid addition salts may be prepared from an inorganic acid or from an organic acid. Examples of inorganic acids include hydrochloric, hydrobromic, hydriodic, nitric, carbonic, sulfuric, phosphoric acids, perchloric and tetrafluoroboronic acids. Appropriate organic acids may be selected from aliphatic, cycloaliphatic, aromatic, araliphatic, heterocyclic, carboxylic and sulfonic classes of organic acids, examples of which include formic, acetic, propionic, succinic, glycolic, gluconic, lactic, malic, tartaric, citric, ascorbic, glucuronic, maleic, fumaric, pyruvic, aspartic, glutamic, benzoic, anthranilic, 4-hydroxybenzoic, phenylacetic, mandelic, embonic (pamoic), methanesulfonic, ethanesulfonic, benzenesulfonic, pantothenic, trifluoromethanesulfonic, 2-hydroxyethanesulfonic, p-toluenesulfonic, sulfanilic, cyclohexylaminosulfonic, stearic, alginic, b-hydroxybutyric, salicylic, galactaric and galacturonic acid. Suitable base addition salts of compounds useful within the invention include, for example, metallic salts including alkali metal, alkaline earth metal and transition metal salts such as, for example, lithium, calcium, magnesium, potassium, sodium and zinc salts. Acceptable base addition salts also include organic salts made from basic amines such as, for example, N,N'-dibenzylethylenediamine, chloroprocaine, choline, diethanolamine, ethylenediamine, meglumine (N-methyl-glucamine) and procaine. All of these salts may be prepared by conventional means from the corresponding free base compound by reacting, for example, the appropriate acid or base with the corresponding free base.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

The following abbreviations are used herein:
ACA anterior cerebral artery
BA basilar artery
BIS Bispectral Index system
BSA Bovine serum albumin
BEX brain extraction
BPM brain perfusion medium of the invention, alternatively denoted as "synthetic perfusate" herein
CCA common carotid artery
CDU color Doppler ultrasonography
CT computerized tomography
DAPI 4',6-diamidino-2-phenylindole
DMEM Dulbecco's Modified Eagle Medium
DNA deoxyribonucleic acid
DO Dissolved Oxygen
ECA external carotid artery
EDV end diastolic velocity
EEG electroencephalogram
ELISA Enzyme-linked immunosorbent assay
FACS Fluorescence-activated cell sorting
FBS Fetal Bovine Serum
GFAP Glial fibrillary acidic protein
HBSS Hanks' Balanced Salt Solution
HEPES 4-(2-hydroxyethyl)-1-piperazineethanesulfonic acid
IBA-1 microglia
ICA internal carotid artery
IL-1B interleukin 1 beta
Lac lactate
LOP length of perfusion
LPP length prior to perfusion
LPS liposaccharide
MCA middle cerebral artery
MRI magnetic resonance imaging
MRS magnetic resonance spectroscopy
NAA N-acetylaspartate
OA Occipital Artery
OphA Ophthalmic Artery
PBS Phosphate buffered saline
PC perical losal artery
PCA posterior cerebral artery PcoA posterior communicating artery
PFC prefrontal cortex
PFM Perfusion flow monitoring
PI propidium iodide
PMI post-mortem intervals
PPP post-perfusion period
PS perfusate sample
PSV peak systolic velocity
PWF power waveform
RI resistance index
RM Rete Mirabile
ROI region of interest
RT room temperature
RWP rate of warming per hour
sEPSCs spontaneous excitatory postsynaptic currents
SSS superior sagittal sinus
TP tissue processing
TUNEL Terminal deoxynucleotidyl transferase dUTP Nick End Labeling
VA Vertebral Artery Perfusion Medium The invention includes a novel perfusion composition for the normothermic ex vivo preservation of a living brain. In certain embodiments, the perfusion composition can be used to preserve an intact living brain. In certain embodiments, the perfusion composition can be applied to normothermic ex vivo preservation of other living organs, including for example liver, lung, heart, pancreas, kidney, and the like.

In certain embodiments, the perfusion composition is a brain perfusion medium (BPM) comprising a solution comprising glucose, one or more amino acids, one or more water soluble salts and one more vitamins, one or more artificial oxygen carrier compounds and one or more compounds selected from the group consisting of anti-cytotoxic compounds, antioxidants, anti-inflammatory compounds, anti-epileptic compounds, anti-apoptotic compounds, antibiotics, cell death inhibitors, neuroprotectants and oxidative/nitrosative stress inhibitors.

In certain embodiments, the perfusion composition comprises a cell culture medium solution which is capable of supporting cells in a tissue culture. In certain embodiments, the cell culture medium is any cell culture medium or solution known in the art for the purpose of culturing cells. In other embodiments, the cell culture medium solution is Eagle's minimal essential medium or a variant thereof, including Dulbecco's modified Eagle's medium (DMEM). In yet other embodiments, the cell culture medium solution is DMEM, wherein DMEM comprises: glucose; sodium pyruvate; one or more amino acids selected from the group consisting of glycine, L-alanyl-glutamine, L-arginine, L-cysteine, L-histidine, L-isoleucine, L-leucine, L-lysine, L-methionine, L-phenylalanine, L-serine, L-threonine, L-tryptophan, L-tyrosine, L-valine and salts and solvates thereof one or more vitamins selected from the group consisting of choline, D-calcium pantothenate, folic acid, niacinamide, pyridoxine, riboflavin, thiamine, i-inositol and salts and solvates thereof; and one or more inorganic salts selected from the group consisting of calcium chloride, ferric nitrate, magnesium sulfate, potassium chloride, sodium bicarbonate, sodium chloride, sodium phosphate and salts and solvates thereof. In other embodiments, the DMEM formulation is a low glucose DMEM formulation. In yet other embodiments, the cell culture medium solution is DMEM with a formulation according to Table 1.

TABLE 1

| Components | Molecular Weight | Concentration (mg/L) | mM |
|---|---|---|---|
| Amino Acids | | | |
| Glycine | 75 | 30 | 0.4 |
| L-Alanyl-Glutamine | 217 | 862 | 3.9723501 |
| L-Arginine hydrochloride | 211 | 84 | 0.39810428 |
| L-Cystine | 313 | 48 | 0.15335463 |
| L-Histidine hydrochloride-H$_2$O | 210 | 42 | 0.2 |
| L-Isoleucine | 131 | 105 | 0.8015267 |
| L-Leucine | 131 | 105 | 0.8015267 |
| L-Lysine hydrochloride | 183 | 146 | 0.7978142 |
| L-Methionine | 149 | 30 | 0.20134228 |
| L-Phenylalanine | 165 | 66 | 0.4 |
| L-Serine | 105 | 42 | 0.4 |
| L-Threonine | 119 | 95 | 0.79831934 |
| L-Tryptophan | 204 | 16 | 0.07843138 |
| L-Tyrosine | 181 | 72 | 0.39779004 |
| L-Valine | 117 | 94 | 0.8034188 |
| Vitamins | | | |
| Choline chloride | 140 | 4 | 0.02857143 |
| D-Calcium pantothenate | 477 | 4 | 0.00838574 |
| Folic Acid | 441 | 4 | 0.0090703 |
| Niacinamide | 122 | 4 | 0.03278688 |
| Pyridoxine hydrochloride | 206 | 4 | 0.01941748 |
| Riboflavin | 376 | 0.4 | 0.00106383 |
| Thiamine hydrochloride | 337 | 4 | 0.01186944 |
| i-Inositol | 180 | 7.2 | 0.04 |
| Inorganic Salts | | | |
| Calcium Chloride (CaCl$_2$—2H$_2$O) | 147 | 264 | 1.7959183 |
| Ferric Nitrate (Fe(NO$_3$)$_3$·9H$_2$O) | 404 | 0.1 | 2.48E−04 |
| Magnesium Sulfate (MgSO$_4$—7H$_2$O) | 246 | 200 | 0.8130081 |
| Potassium Chloride (KCl) | 75 | 400 | 5.3333335 |
| Sodium Bicarbonate (NaHCO$_3$) | 84 | 3700 | 44.04762 |
| Sodium Chloride (NaCl) | 58 | 6400 | 110.344826 |
| Sodium Phosphate monobasic (NaH$_2$PO$_4$—2H$_2$O) | 156 | 141 | 0.90384614 |
| Other Components | | | |
| D-Glucose (Dextrose) | 180 | 1000 | 5.5555553 |
| Phenol Red | 376.4 | 15 | 0.03985122 |
| Sodium Pyruvate | 110 | 110 | 1 |

In alternative embodiments, the cell culture medium comprises one or more composition selected from the group consisting of VIASPAN® (University of Wisconsin solution), Bretschneider's Solution (Histidine-Tryptophane-Ketoglutarate [HTK] Solution), CELSIOR' Solution, Kyoto University Solution, IGL-1 Solution, Collins' Solution, Citrate-Phosphate-Dextrose Solution, HIBERNATE®-A Medium, HIBERNATE®-E Medium, BRAINPHYS™ Medium, NEUROBASAL™ Medium, and STEMDIFF™ Medium.

In certain embodiments, the perfusion composition comprises one or more artificial oxygen carrier compounds. In certain embodiments, the one or more artificial oxygen carrier compounds are hemoglobin derivatives. The hemoglobin derivatives can be one or more compounds selected from the group consisting of isolated, cell-free hemoglobin, cross-linked hemoglobin, polymerized hemoglobin, encapsulated hemoglobin and functionalized hemoglobin. In certain embodiments, the artificial oxygen carrier compound can be HEMOPURE®, a cross-linked hemoglobin tetramer comprising two alpha hemoglobin and two beta hemoglobin subunits cross-linked by a carbon linker. In other embodiments, the one or more artificial oxygen carrier compounds can be artificial red blood cell substitutes, such as ERYTHROMER™, PolyHeme, Oxyglobin, PolyHb-SOD-CAT-CA, PolyHb-Fibrinogen, Hemspan or MP4. In other embodiments, the artificial oxygen carrier compound can be any blood substitute compound known in the art.

In certain embodiments, the perfusion composition comprises one or more compounds selected from the group consisting of anti-cytotoxic compounds, antioxidants, anti-inflammatory compounds, antiepileptic compounds, anti-apoptotic compounds, antibiotics, cell death inhibitors, neuroprotectants and nitrive stress inhibitors. In certain embodiments, the perfusion composition comprises at least one imaging contrast agent. In other embodiments, the perfusion composition further comprises one or more ultrasound contrast agents, that also can be used under certain ultrasound settings as clot disintegrator and blood-brain barrier opener. In some embodiments, the one or more ultrasound contrast agents can be micrometer-sized air-filled polymeric particles. In yet other embodiments, the perfusion composition comprises at least one MRI contrast agent or CT contrast agent. In other embodiments, the perfusion composition comprises one or more compounds selected from the group consisting of the compounds of Table 2, or salts, solvates, tautomers, and prodrugs thereof.

TABLE 2

| Compound | Function |
| --- | --- |
| Hexahydro-2-imino-1H-thieno[3,4-d]imidazole-4-pentanoic acid (2-Iminobiotin) | neuroprotectant; nitrosative stress inhibition |
| 5-(1H-Indol-3-ylmethyl)-3-methyl-2-thioxo-4-Imidazolidinone (Necrostatin-1) | necrotic cell death inhibitor |
| Ceftriaxone | broad spectrum antibiotic |
| Disufenton sodium (NXY-059) | neuroprotectant; spin trap |
| 3-hydroxybutyric acid | anticonvulsant; histone deacetylase inhibitor; brain-derived neurotrophic factor promoter |
| Glutathione | antioxidant |
| Minocycline | anti-inflammatory; broad spectrum antibiotic |
| Lamotrigine | anti-epileptic; prevents excitotoxicity |
| 5-(2,6-Difluorophenoxy)-3-[[3-methyl-1-oxo-2-[(2-quinolinylcarbonyl)amino]butyl]amino]-4-oxo-pentanoic acid hydrate (QVD-Oph) | anti-apoptotic |
| Methylene Blue | anti-oxidant; promotion of ATP formation |
| PolySon ™ L | ultrasound contrast agent |

In certain embodiments, the perfusion composition comprises Dulbecco's modified Eagle's medium, cross-linked hemoglobin, 2-Iminobiotin, Necrostatin-1, Ceftriaxone, N-Acetyl-L-cysteine, Glutathione, Minocycline, Lamotrigine, QVD-Oph and Methylene Blue.

In certain embodiments, the perfusion composition comprises polymerized hemoglobin, 2-Iminobiotin, glutathione monoethyl ester, minocycline, lamotrigine, methylene blue, NXY-059, sodium 3-hydroxybutryate and PolySon L.

Perfusion System

The invention provides a novel system for ex vivo normothermic preservation of an intact mammalian brain.

In certain embodiments, the invention provides a system for the normothermic, ex vivo preservation of a mammalian brain, the system comprising: a perfusion device for the perfusion of a mammalian brain, and/or other organs (e.g., liver, lung, heart, pancreas, kidney, etc.), comprising a means for regulating the temperature, flow, pressure, dissolved gases, and concentration of metabolites in the system; and the perfusate composition of the invention. In certain embodiments, the means for regulating the temperature of the system comprises a controller programmed to regulate at least a perfusate temperature within the system to maintain normothermic conditions. In certain embodiments, the means for regulating the flow, pressure, dissolved gases, and metabolite concentrations in the system comprises a controller programmed to regulate these parameters within the system to maintain constant or alterable levels/concentrations.

In certain embodiments, the system comprises a brain housing unit adapted and configured to receive and house a mammalian brain, a perfusion unit adapted and configured to introduce oxygen to a perfusate of the invention and circulate the perfusate through a brain contained within the brain enclosure unit and a means for regulating the temperature of the brain housing unit and the perfusion unit. In certain embodiments, the perfusion unit is adapted and configured to introduce oxygen and carbon dioxide to the perfusate. In other embodiments, the perfusion unit is adapted and configured to filter the perfusate, removing metabolic toxins.

Referring now to FIG. 1A, one embodiment of the invention provides a normothermic preservation device 100. The normothermic preservation device 100 includes a brain housing unit 102, a perfusion unit 104, and at least one heat exchange apparatus 106.

In certain embodiments, the brain housing unit 102 includes a brain chamber 110. In certain embodiments, the brain chamber 110 is adapted and configured to receive a living brain. In certain embodiments, the brain housing unit 102 is adapted and configured to maintain a normothermic temperature around the living brain. In certain embodiments, the brain housing unit 102 is adapted and configured to receive a brain and maintain the brain in a normothermic environment. For example, the brain housing unit 102 and/or brain chamber 110 can include a material with low thermal conductivity such as insulation, a polymer, a vacuum, and the like to reduce heat transfer.

In certain embodiments, the perfusion unit 104 is adapted and configured to oxygenate, carboxygenate, filter and circulate a perfusate through a brain housed within the brain chamber 110. In some embodiments, the perfusate is a perfusate of the invention as described elsewhere herein.

In certain embodiments, the perfusion unit 104 comprises a venous loop 112, a filtration loop 114 and an arterial loop 116. In other embodiments, the perfusion unit 104 is adapted and configured to carry perfusate from the brain housing unit 102 to the venous loop 112, to the filtration loop 114, to the arterial loop 116 and back to the brain housing unit 102. In certain embodiments, the venous loop 112 is in fluidic communication with the filtration loop 114, which is in turn in fluidic communication with the arterial loop 116.

In certain embodiments, the venous loop 112 comprises a venous return line 118 in fluidic communication with each of the brain housing unit 102, brain chamber 110, brain chamber holder 107, at least one venous circulation pump 120 adapted and configured to pump perfusate through the venous loop 112, and at least one perfusate reservoir 124. The venous return line 118 can be a tubing or piping system capable of carrying a fluid perfusate from the brain chamber 110, through a venous circulation pump 120, and into a perfusate reservoir 124.

In certain embodiments, the venous circulation pump 120 is a roller pump (also known as a peristaltic or tube pump); however, the venous circulation pump 120 can be essentially any pump known in the art.

In certain embodiments, the perfusate reservoir 124 comprises excess perfusate to replenish and replace any perfusate consumed or leaked from the perfusion unit 104.

In certain embodiments, the filtration loop 114 comprises a filtration line 128 in fluidic communication with the at least one perfusate reservoir 124, at least one filtration circulation pump 130, at least one heat exchanger 132, and at least one hemodiafiltration unit 134. In other embodiments, the filtration loop 114 is adapted and configured to carry perfusate from the at least one perfusate reservoir 124, through the filtration line 128, through the at least one filtration circulation pump 130, through the at least one heat exchanger 132 and to a junction 136, wherein a portion of the perfusate is carried to the at least one hemodiafiltration unit 134 via hemodiafiltration input line 137 and a portion of the perfusate is carried on to the arterial loop 116 via arterial line 144. In certain embodiments, the portion of the perfusate carried to the at least one hemodiafiltration unit 134 is then carried back to the perfusate reservoir 124 via dialysis output line 139.

In certain embodiments, the filtration loop 114 further comprises an exchange solution line 138, an exchange pump 140 and an exchange solution reservoir 142 such that the exchange solution line 138 is in fluidic communication with the exchange pump 140 the hemodiafiltration unit 134 and the exchange solution reservoir 142 and is adapted and configured to carry an exchange solution from the hemodiafiltration unit 134, to the exchange pump 140, into the exchange solution reservoir 142 and back to the hemodiafiltration unit 134.

In certain embodiments, the exchange solution is an aqueous solution comprising one or more compounds selected from the group consisting of DMEM, sodium chloride, potassium chloride, sodium bicarbonate, and glucose. In other embodiments, the exchange solution is the same as the perfusate.

In certain embodiments, the hemodiafiltration unit 134 is any hemodiafiltration filtering apparatus known in the art. In other embodiments, the hemodiafiltration unit 134 comprises at least one filtration membrane. In other embodiments, the hemodiafiltration unit 134 is a capillary dialyzer. In other embodiments, the hemodiafiltration unit 134 is a high-flux polysulfone 15 capillary dialyzer. In yet other embodiments, the hemodiafiltration unit 134 is adapted and configured to remove metabolic waste products from the perfusate. In yet other embodiments, the hemodiafiltration unit 134 is adapted and configured to remove from the perfusate metabolic waste molecules smaller than about 75 kDa or smaller than about 66 kDa. In yet other embodiments, the one or more toxic metabolic byproducts removed from the perfusate, include, for example, water, lactate, dissolved gases, ammonia, atrial natriuretic peptide, β2-microglobulin, β-endorphin, cholecystokinin, Clara cell protein, creatinine complement factor D, cystatin C, degranulation inhibitor protein, delta sleep-inducing peptide, endothelin, glutamate, hyaluronic acid, interleukin-1α, interleukin-6, κ-Ig light chain, λ-Ig light chain, neuropeptide Y, retinol-binding protein, tumor necrosis factor-α, uric acid, urea, pro-inflammatory cytokines (e.g. IFN-γ, IL-1β, IL-18, IL1, IL6, and TNF-α) and glutamate.

In yet other embodiments, the hemodiafiltration unit 134 is adapted and configured to supply one or more nutrients essential for proper cellular function to the perfusate, including for example, but not limited to, any compounds listed in Table 1 and Table 2.

Figure 1B:
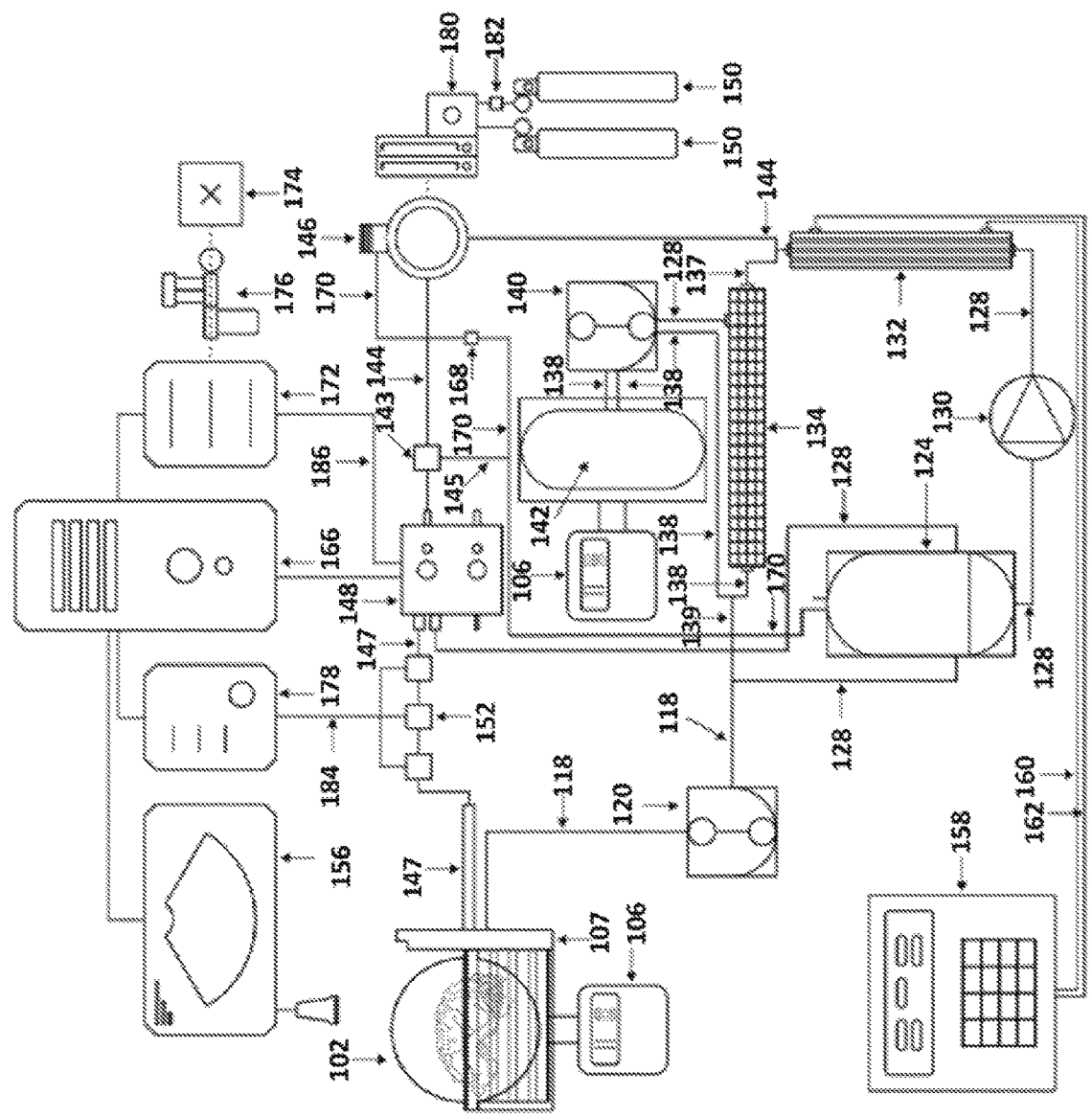
FIG. 1B is a schematic representation of an ex vivo brain preservation system in greater detail, according to an alternative embodiment of the invention.

According to an embodiment, as depicted in FIGS. 1A and 1B, the output end of the exchange solution line 138 is in fluidic communication with the filtration line 128, such that perfusate solution filtrate exits the hemodiafiltration unit 134 through the exchange solution line 138, enters the exchange solution reservoir 142 where it is in contact and mixes with the exchange solution contained in the exchange solution reservoir 142. Exchange solution from the exchange solution reservoir 142 is then pumped into the filtration line 128. In this way, the perfusate filtrate is diluted by the exchange solution in the exchange solution reservoir 142. In certain embodiments, the flow rate of filtrate into the exchange solution reservoir 142 is equal to the flow rate of exchange solution out of the exchange solution reservoir 142 and into the filtration line 128. In other embodiments, the volume of exchange solution in the exchange solution reservoir 142 is sufficiently larger than the total circulating perfusate that the exchange solution does not build up an appreciable concentration of metabolic waste products. In one embodiment, the volume of exchange solution is more than about 5 times greater than the volume of circulating perfusate. In another embodiment, the volume of exchange solution in the exchange solution reservoir 142 is sufficient to allow for at least 6 hours of operation of the normothermic preservation system 100 without the exchange solution depleting nutrients or accumulating toxins to a sufficient degree to harm the brain, or other organs as described herein, being perfused. In other embodiments, the exchange solution in the exchange solution reservoir 142 can be replaced or replenished over time to prevent the depletion of nutrients or the accumulation of toxins.

According to an alternative embodiment, one end of the exchange solution line 138 can dispose of perfusate filtrate coming from the hemodiafiltration unit 134, instead of carrying it to the exchange solution reservoir 142, and the exchange solution in the exchange solution reservoir 142 can be carried by a different exchange solution line 138 to the filtration line 128. In this way, the perfusate filtrate coming from the hemodiafiltration unit 134 does not mix with the exchange solution in the exchange solution reservoir 142.

According to an alternative embodiment, the exchange solution line 138 is not in fluidic communication with the filtration line 128. In certain embodiments, the exchange solution line 138 and the hemodiafiltration unit 134 are arranged in a dialysis configuration such that the exchange solution does not contact and mix with the perfusate.

In certain embodiments, the filtration circulation pump 130 is a centrifugal pump. In other embodiments, the exchange pump 140 is a roller pump. In other embodiments, the filtration circulation pump 130 and the exchange pump 140 can each independently be any pump known in the art.

In certain embodiments, the filtration loop 114 further comprises a dialysis apparatus in fluidic communication with the exchange solution reservoir 142, capable of regenerating the exchange solution.

In certain embodiments, the arterial loop 116 is in fluidic communication with the filtration loop 114 at junction 136. In certain embodiments, the arterial loop 116 comprises at least one arterial line 144/147 in fluidic communication with at least one arterial oxygenator 146, and at least one pulse generator 148. In other embodiments, the arterial loop 144/147 is in fluidic communication with the filtration line 128 at junction 136. In certain embodiments, the arterial line 144/147 is adapted and configured to carry perfusate from junction 136, through at least one arterial oxygenator 146, through at least one pulse generator 148 and to the brain housing unit 102 wherein the perfusate is then perfused into a brain housed in the brain chamber 110. In certain embodiments, after the perfusate is perfused into the brain housed in the brain chamber 110, the perfusate leaves the brain and enters the venous loop 112, whereby it is recycled as discussed elsewhere herein.

In certain embodiments, the arterial oxygenator 146 is in communication with a gas source 150 adapted and configured to supply gas to the arterial oxygenator 146. In other embodiments, the gas source 150 is at least one pressurized gas tank. In yet other embodiments, the gas source 150 supplies air to the arterial oxygenator 146.

In certain embodiments, the arterial line 144 splits into at least two lines before entering at least one pulse generator 148.

In certain embodiments, at least one of the brain housing unit 102, the venous loop 112, the exchange loop 114 and the arterial loop 116 further comprises one or more sensors 152, 154. In other embodiments, the one or more sensors 152, 154 can detect and report one or more qualities of the perfusate including but not limited to temperature, flow rate, pulse rate, pressure, pH, dissolved oxygen concentration and $CO_2$ concentration. In yet other embodiments, the one or more sensors 152, 154 can detect the presence of metabolic byproduct compounds dissolved within the perfusate, including but not limited to nitric oxide, lactate, bicarbonate, oxygen, carbon dioxide, total hemoglobin, methemoglobin, oxyhemoglobin, carboxyhemoglobin, sodium, potassium, chloride, calcium, glucose, urea, ammonia, and creatinine. In yet other embodiments, at least one of the one or more sensors 152, 154 are thermometers, optical sensors, glass electrodes, or standard electrode sensors. In certain embodiments, the brain housing unit 102 comprises one or more temperature sensors.

In certain embodiments, the normothermic preservation device 100 further comprises an ultrasound system 156. In other embodiments, the ultrasound system is adapted and configured to image a brain housed within the brain chamber 110.

In certain embodiments, the at least one heat exchange apparatus 106 comprises at least one heat exchanger 132, at least one temperature regulation unit 158, at least one thermoregulation fluid outflow pipe 160 and at least one thermoregulation fluid return pipe 162. In other embodiments, the at least one heat exchange apparatus 106 further comprises at least one heat exchange pump 164. In certain embodiments, the at least one heat exchange apparatus 106 is adapted and configured to transport a thermoregulation fluid from the at least one temperature regulation unit 158, through the thermoregulation fluid outflow pipe 160, to the at least one heat exchanger 132, through the thermoregulation fluid return pipe 162 and back to the temperature regulation unit 158, whereby the thermoregulation fluid is allowed to absorb heat from and/or radiate heat to the perfusate at the heat exchanger 132. In certain embodiments, the normothermic preservation device 100 comprises a single heat exchange apparatus 106, having a heat exchanger 132 as part of the filtration loop 114. In other embodiments, the normothermic preservation device 100 further comprises at least one heat exchange apparatus 106 as part of at least one element selected from the brain housing unit 102, the perfusate reservoir 124 and the exchange solution reservoir 142.

In certain embodiments, the temperature regulation unit 158 is a chiller. In other embodiments, the thermoregulation fluid comprises distilled water. In yet other embodiments, the thermoregulation fluid can be any thermoregulation fluid common in the art.

In certain embodiments, the normothermic preservation device 100 further comprises a computer 166. In other embodiments, the computer 166 is a hardware and/or software device in electronic communication with at least one element of the normothermic preservation device 100 selected from the group consisting of the venous pump 120, the filtration circulation pump 130, the exchange pump 140, the at least one hemodiafiltration unit 134, the at least one arterial oxygenator 146, the at least one gas blender 180, the at least one temperature regulation unit 158, the at least one pulse generator 148, the at least one heat exchange pump 164, the ultrasound system 156 and the one or more sensors 152, 154. In certain embodiments, the computer 166 regulates and controls the rate of flow of perfusate through the normothermic preservation device 100. In other embodiments, the computer 166 regulates and controls the temperature of the perfusate in the normothermic preservation device 100. In yet other embodiments, the computer 166 regulates and controls the temperature of the brain chamber 110. In yet other embodiments, the computer 166 regulates temperature by modifying the temperature of the at least one temperature regulation unit 158 and/or the flow rate of the at least one heat exchange pump 164. In yet other embodiments, the computer 166 regulates and controls dissolved oxygen level, and dissolved carbon dioxide level in the perfusate by altering the gas flow and mixture through the gas blender 180 to the at least one arterial oxygenator 146. In yet other embodiments, the computer 166 regulates and controls pulse rate of the pulse generator 148. In yet other embodiments, the normothermic preservation device 100 further comprises at least one fluid valve adapted and configured to limit the flow of the perfusate in at least one of the at least one venous return line 118, the at least one filtration line 128 and the at least one arterial line 144. In yet other embodiments, the computer 166 is in electronic communication with the at least one fluid valve.

In certain embodiments, the computer 166 can be programmed to maintain essentially any desired pump rate, temperature and dissolved oxygen and carbon dioxide levels chosen by a user. In other embodiments, the computer 166 is able to maintain any desired set of conditions by modifying one or more elements of the normothermic preservation device 100 based on feedback received from the one or more sensors 152, 154. In certain embodiments, the appropriate flow rate of the perfusate through the normothermic preservation device 100 is determined by applying the Hagen-Poiseuille equation (1) whereby appropriate flow rate is determined as a function of the pressure and peripheral resistance of the system.

$$\Delta P = \frac{8\mu L Q}{\pi R^4} \tag{1}$$

where:
ΔP is the pressure difference between the two ends of a pipe,
L is the length of the pipe,
μ is the dynamic viscosity of the fluid,
Q is the volumetric flow rate, and
R is the pipe radius.

In certain embodiments, the normothermic preservation device 100 perfuses the brain at a cardiac pulsatile pressure of about 20 mmHg to about 140 mmHg. In other embodiments, the normothermic preservation device 100 perfuses the brain at a rate of about 40 to about 180 beats per minute.

In yet other embodiments, the computer 166 is programmed to apply a pressure waveform to the perfusate flow, through manipulation of the pulse generator 148. In other embodiments, one or more parameters of the pressure waveform can be altered including but not limited to amplitude and duration of systolic and diastolic fronts.

In certain embodiments, the at least one venous return line 118, the at least one filtration line 128 and the at least one arterial line 144 are tubes or pipes. In certain embodiments, the at least one venous return line 118, the at least one filtration line 128 and the at least one arterial line 144 comprise peristaltic tubing materials common in the art. In other embodiments, the lines 118, 128 and 144 can comprise one or more materials selected from the group consisting of silicone, and polytetrafluoroethylene. In other embodiments, the lines 118, 128 and 144 can include commercially available tubing such as, but not limited to ISMAPRENE®, NORPRENE® and TYGON® tubing.

In certain embodiments, the normothermic preservation device 100 further comprises at least one filter in fluidic communication with one or more of the at least one venous return line 118, the at least one filtration line 128 and the at least one arterial line 144, including, for example, arterial line filter 143. In other embodiments, the at least one filter is a cardiopulmonary bypass arterial filter.

In certain embodiments, the brain chamber 110 is adapted and configured to receive a brain. In other embodiments, the brain is a mammalian brain. In yet other embodiments, the brain rests on an artificial membrane or dura ("pseudodura") within the brain chamber 110. In other embodiments, the artificial membrane or dura is made of nylon mesh. In yet another embodiment, the organ connected to the system is a peripheral mammalian organ.

In certain embodiments, the normothermic preservation device 100 further comprises one or more display screens.

In certain embodiments, the normothermic preservation device 100 is mounted in a movable housing. In certain embodiments, the movable housing is a wheeled cart that is MRI compatible. In other embodiments, the movable housing further comprises a built-in computer.

In certain embodiments, the perfusate is the synthetic brain perfusion medium (BPM) of the invention.

Referring now to FIG. 1B, in certain embodiments, the arterial loop 116 further comprises one or more sample ports 168 adapted and configured to allow for perfusate samples to be collected during system operation.

In certain embodiments, the arterial loop 116 further comprises one or more arterial purge lines 170 in fluidic communication with the one or more arterial lines 144 and the perfusate reservoir 124, adapted and configured to transport excess perfusate in the arterial line 144 back to the perfusate reservoir 124.

In certain embodiments, the computer 166 is in electronic communication with the pulse generator 148 through a pulse generator controller 172. In certain embodiments, the pulse generator 148 is in communication with the pulse generator controller 172 via one or more pressure lines 186. In certain embodiments the pulse generator controller 172 is a programmable logic controller. In other embodiments, the pulse generator controller 172 is in fluidic communication with an air source 174 and a pressure regulator 176.

In certain embodiments, the pulse generator 148 is a waveform generator adapted and configured to impress a selected pressure waveform on the perfusate before it is delivered to the brain chamber 110. In other embodiments, the pulse generator 148 is a waveform generator as described in U.S. Patent Application Publication 2010/0028979 A1.

In certain embodiments, the computer 166 is in electronic communication with the at least one sensor 152 through a sensor controller 178, which in certain embodiments are connected via one or more optical and/or electrical cables 184 with at least one sensor 152. In certain embodiments, the sensor controller 178 is an optical sensor controller. In other embodiments, the sensor controller 178 is a programmable logic controller.

In certain embodiments, the at least one gas source 150 are at least two gas sources. The at least two gas sources 150 may include at least one oxygen source (e.g., 50% oxygen) and/or at least one carbon dioxide ($CO_2$) source. In certain embodiments, the arterial oxygenator 146 is in fluidic communication with the at least two gas sources 150 through a gas blender 180 adapted and configured to be able to deliver a controlled variable ratio of gases from the at least two gas sources 150. In certain embodiments, at least one of the at least two gases may be filtered through one or more air filters 182 in fluidic communication with at least one gas source 150 and gas blender 180.

Perfused Brain and Other Organs

The invention further provides an ex vivo mammalian brain preserved with the brain perfusion medium of the invention. In certain embodiments, the mammalian brain has been perfused with the BPM. In other embodiments, the mammalian brain maintains morphofunctional integrity under normothermic conditions.

In certain embodiments, the mammalian brain is the brain of a deceased mammal. In other embodiments, the brain is a brain that is more than 1 hour post-mortem. In yet other embodiments, the brain is a brain that is more than 4 hours post-mortem.

In certain embodiments, the mammalian brain is suffering from brain ischemia or cerebral hypoxia.

In certain embodiments, the brain is perfused while still within the skull of the deceased mammal. In other embodiments, the brain is perfused after excision from the skull of the deceased mammal.

In certain embodiments, the organ is a peripheral organ, such as the liver or kidney, etc. In another embodiment, the organ is more than 1 hour post-mortem. In other embodiments, the organ is more than 4 hours post-mortem. In some embodiments, the organs are suffering from hypoxia/ischemia.

In certain embodiments, the BPM helps maintain an in vivo rate of cerebral metabolism and preserves functional responses of neurons and glia. The BPM perfused brain can maintain neural cell morphology and cellular viability for a longer period of time than a non-perfused brain.

In certain embodiments, the perfused brain can belong to any mammal. Non-human mammals include, for example, livestock and pets, such as ovine, bovine, porcine, canine, feline and murine mammals. Mammals can also include primates, including humans. In certain embodiments, the perfused mammalian brain of the invention can be a human brain.

Methods

The invention also provides means and methods for normothermic, ex vivo preservation of an intact mammalian brain. In certain embodiments, the methods comprise methods for preparing an intact, mammalian brain post mortem for perfusion with the BPM of the invention. In certain embodiments, the means and methods of the present invention comprise means and methods for preparing and preserving other organs including, for example liver, lung, heart, pancreas, kidney and the like.

In certain embodiments, the methods of preparing an intact, mammalian brain post mortem for perfusion comprise isolating and cannulating the bilateral common carotid arteries, and flushing the brain with a heparinized saline solution to remove residual blood. The brain is then stored on ice for a period of time, but in certain embodiments, ice storage may not be applicable. To selectively perfuse the brain and prevent vascular shunting, the external carotid, occipital, ophthalmic, vertebral, and basilar (at the medullary level) arteries, along with the ramus anastomoticus, arteria anastomotica, and smaller branches originating from the ascending pharyngeal artery, are dissected and ligated and/or cauterized, leaving the internal carotid patent. The arterial lines are of the normothermic preservation device of the invention.

In certain embodiments, the vasculature of different species may be distinct, yet the theory of selectively perfusing the brain holds since all extracranial vasculature is ligated, leaving only the vessels that directly supply the brain patent.

In certain embodiments, the brain is prepared for perfusion by administering one or more compositions comprising one or more vasodilators or vasoactive compounds. Without being limited to any one theory, the vasodilators help dilate the vasculature of the brain, and therefore can increase the ability of the BPM to penetrate and perfuse throughout the brain and simultaneously prevent collapse of the vasculature of the brain. In certain embodiments, the dilation of the brain vasculature can be monitored and the amount of vasodilator administered to the brain can be modified as needed. In other embodiments, the dilation of the brain vasculature can be monitored by ultrasonography. In certain embodiments, the one or more compositions comprising one or more vasodilators is administered before perfusing the mammalian brain with the BPM of the invention. In certain embodiments, the brain is prepared for perfusion by administering one or more vasodilators or vasoactive compounds selected from the group consisting of dihydropyridine calcium channel blockers (e.g. nimodipine, irsadipine, nifedipine, nitrendipine, and amlodipine), other calcium channel blockers (e.g. flunarizine, bepidril, fluspirilene, and fendiline) carbon dioxide, nitrovasodilatators (e.g. nitric oxide, nicorandil, isosorbide dinitrate, and isosorbide mononitrate), triptans (e.g. sumatriptan, zolmitriptan, naratriptan, rizatriptan, alotriptan, eletriptan, and frovatriptan), adrenergic drugs (e.g. α1-adrenergic receptor ligands, agonists and antagonists, α2-adrenergic receptor ligands, agonists and antagonists, β-adrenergic receptor ligands, agonist, and antagonists), endothelin receptor modulators (e.g. sitaxentan, ambrisentan, atrasentan, BQ-123, zibotentan, bosentan, macitentan, and tezosentan), magnesium sulfate, papaverine, nafronyl, hexobendine, and other cerebral vasodilators or vasoactive compounds known in the art.

All references throughout this application (for example, patent documents including issued or granted patents or equivalents; patent application publications; and non-patent literature documents or other source material) are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application. Further examples include application of this system to other intact mammalian organs, e.g. liver, lung, heart, pancreas, kidney, etc. In general, the terms and phrases used herein have their art-recognized meaning, which can be found by reference to standard texts, journal references and contexts known to those skilled in the art. Any preceding definitions are provided to clarify their specific use in the context of the invention.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.
Materials and Methods
BEx Technology.

Overview of the perfusion system. The closed-circuit perfusion system is comprised of a main perfusion circuit and parallel afferent and efferent homeostatic circuits, including hemodiafiltration and gas-infusion mixers, the details of which are described in FIG. 1B. The main perfusion circuit is driven by a centrifugal pump which produces a continuous, high-flow rate stream of perfusate that supplies a custom-built pulse generator (BioMedical Innovations, LLC; Denver, NC). Through mechanical force, the pulse-generator transforms the flow to a pulsatile flow, supplying the brain, which is housed in a uniquely-designed spherical chamber that opens into two hemispherical components. When securely closed, the chamber is temperature-controlled and maintains a humidity level ~95% to prevent the surface of the brain from drying, since the brain is not bathed in fluid. The pulse generator is connected to a power logic controller that is fully integrated with a user-friendly computer interface that allows the investigator to fully customize the pulsatile flow to mimic any cardiac waveform ranging from 20-140 mmHg and 40-180 beats per minute. The parallel afferent homeostatic circuits are made out of optical, potentiometric and ultrasound sensors for analysis of electrolytes, metabolites, pH, gases and flow rate. The efferent circuit is comprised of hemodiafiltration, temperature control, gaseous, and electronic controller circuit all of which maintain homeostatic parameters in specified range.

BEx perfusate formulation. 750 mL of Hemopure® (HbO2 Therapeutics, LLC). In order to make the perfusate echogenic, micrometer-sized polymeric particles were incorporated (0.1 mL; Polyson-L; Miltenyi Biotec; Germany; 130-095).

Control perfusate formulation. 750 mL of isotonic solution. In order to make the control perfusate echogenic, the micrometer-sized polymeric particles were also incorporated as described above.

Hemodiafiltration system and exchange solution composition. The pressure-driven hemodiafiltration system is incorporated into the main arterial circuit as described in FIG. 1B. Briefly, the arterial perfusate is subjected to hemodiafiltration through a high-flux polysulfone 15 capillary dialyzer (Braun; Melsungen, Germany; Cat #: 7204102) against a custom dialysis exchange solution with a 1:1 (vol:vol) exchange ratio at a rate of 50 mL/min. The exchange solution is composed of 4.5 L of solution. Before connecting the brain to the BEx system, this perfusate and exchange solution are subjected to hemodiafiltration and allowed to equilibrate for 15 mins at 25° C. Equilibrated values of the BEx perfusate are listed in Supplementary Table 2. The exchange solution is maintained under temperature-controlled condition and rewarmed at the same rate as perfusate (6° C./hour).

Preparation and perfusion of the porcine brain. The brain tissues used were retrieved from animals slaughtered for food production. Researchers had no role in the slaughter, or in determining the means of slaughter. For all experimental groups, domestic pigs (Sus scrofa domesticus; 6-8 months of age [~50-75 kg]) raised for food production were stunned by electrical shock and subsequently sacrificed by exsanguination according to USDA regulations. The animals were then decapitated postmortem at the C3 vertebrae, and the skin was removed from the remainder of the skull in keeping with USDA guidelines. For 1-hour PMI, control perfusate, and BEx perfusate conditions, the common carotid arteries were isolated, connected and secured with male luer-locks. The head was flushed of residual blood utilizing a 3-staged clearance protocol. In total, 8-liters of a heparinized (2800 UI in total), isotonic phosphate-buffered saline solution (20° C.) were used. The 3-stages consisted of a (1) 2-liter gravity flush at ~100 mmHg (5 mins); (2) 4-liter closed-loop flow-driven flush at 600 mL/min (20 mins); and, (3) 2-liter gravity flush at ~100 mmHg (5 minutes). For 1-hour PMI conditions, the snout was then removed and the remainder of the head (dorsal side down) was stored in a plastic biological hazard bag and transportation (10-15 minutes) on ice until performing the brain extraction (5 minutes) with subsequent tissue processing (10 minutes) as described below. For control and BEx perfusate conditions, the head was processed, stored, and transported on ice as described for 1-hour PMI controls. Upon arrival to the laboratory's surgical suite, the head remained on ice during the surgical procedure, except for conducting the craniectomy, which was performed at room temperature (30 minutes). For 10-hour PMI controls brains, the skin and snout were removed from the head as described above. A craniectomy was then performed as described below; however, the head was not flushed with the heparinized solution, and was stored at room temperature for the remainder of the experiment. For perfusion control or BEx perfusate conditions, to selectively perfuse the brain and prevent vascular shunting, the external carotids, occipital, ophthalmic, vertebral, and basilar (at the medullary level) arteries, along with ramus anastomoticus, arteria anastomotica, and smaller branches originating from the ascending pharyngeal artery, were dissected and ligated and/or cauterized, leaving the internal carotid patent. The mandible was removed, and the remaining soft tissues on the lateral and ventral sides of the head were carefully dissected and removed. Subsequently, the complete dorsal, partial frontal (until olfactory bulbs), partial lateral (until superior gyms of temporal lobes), and partial occipital (until tentorium) portions of the cranium were removed utilizing neurosurgical power system (Microspeed uni control unit; Aesculap; Center Valley, PA; Cat #: GD670) equipped with a uni XS motor (Cat #: GD675), disposable Codman perforator (DePuy Synthes, Inc.; West Chester, PA) and Hi-Line XS dura guard drill holder (Aesculap; Cat #: GB741R). Briefly, burr holes in the dorsal, frontal, lateral, and occipital skull were made utilizing a Codman disposable perforator; the holes were subsequently connected using bore drill with dura guard and/or a surgical bone crusher, and the bone flap was carefully removed using a Penfield dissector #3 to expose the dura. Only a portion of the ventral cranium was left intact. After the final surgical preparation, the cranial nerves were transected and dorsal root ganglia were removed to preclude transmission noxious stimuli to the brain. The epidural temperature following the craniectomy ranged from 12-15° C. Each carotid artery was then connected to the perfusion system at the commencement of the perfusion protocol (4 hours following death). Control- and BEx-perfused brains were allowed to rewarm from 25° C. to 37° C. at a rate of 6° C. per hour, utilizing a range of pressure parameters (50/35-80/65 mmHg, 72 beats per minute). In all experiments, the cerebral perfusate flow was monitored and arterial pressure adjusted appropriately to maintain relatively constant cerebral flow.

Ultrasonography. Brain circulation was monitored via Triplex Ultrasonography (Spectral Doppler, Color Doppler, and B-mode) utilizing the LOGIQ e portable ultrasound system (General Electric; Milwaukee, WI) and an 8L-RS linear array probe (General Electric). Power waveform analysis was done utilizing mechanical index of 0.4-0.5, thermal index of 0.2-0.3, steer 0°, angle 0°. For reproducibility and comparisons all measurements were conducted on pericallosal artery anterior to the genu of corpus callosum.

Computed Tomography (CT) Cerebral Angiogram.

Micro-computed tomography (microCT) cerebral angiogram. Approximately 100 mL of 10% bismuth nanoparticle (Sigma-Aldrich) in 10% gelatin was injected into the brain following BEx perfusion. This contrast agent was delivered bilaterally via common carotid arteries by a pressurized injection apparatus. Following, the brain was immediately immersed into ice water for at least 30 minutes, and then post-fixed in 10% formalin for 72-hours. The residual ventral bone was removed and the whole brain was scanned using a U-SPECT-II/CT scanner (MlLabs; Utrecht, The Netherlands). Volumetric Micro-CT data were acquired with an x-ray source of 55 kVp tube voltage, 370 µA tube current, 11×11 detector binning model, 40 ms exposure per projection for contrast-enhanced CT acquisitions. A single frame of 720 projections for 5:03 minutes of continuous x-ray exposure was used. Volumetric micro-CT images were post-processed using PMOD software, version 3.8 (PMOD Technologies; Zurich, Switzerland).

After, the hippocampus was extracted, and high-resolution micro-CT scan was performed using a specimen microCT scanner (Trifoil Imaging; Chatsworth, CA). Images were acquired with 2960 ms exposure time per view, at 60 kV, 100 mA, 360°, 1200 views, and 1×1 binning. The raw micro CT images with a vff format was initially reconstructed with Microview software, with calibrated attenuation values for air, water, and bone. The reconstructed images were saved in DICOM format and further post-processed using RadiAnt DICOM Viewer software (Medixant; Poznan, Poland) to extract maximum intensity projection images.

Magnetic resonance imaging (MRI). High-resolution anatomical scans were performed on 10-hour PMI brains and on brains perfused with control- and BEx-perfusate immediately following perfusion termination. Scans were acquired using Siemens Prisma Fit 3T scanner and 64 channel head/neck coil with MP-RAGE, a three-dimensional, T1-weighted, gradient-echo sequence: FOV=257×257, resolution 0.8×0.8×0.8 mm, TR=2400 ms, TE=1.35 ms, IT=1000, flip angle=8, averages=2, number of slices=112.

Measurement of tissue water content. A stereotyped piece of cerebrum was microdissected from the same region the brain following the termination of each experimental protocol (n=3 animals per condition). The mass of the wet tissue was immediately measured and recorded, and the tissue was placed in a non-humidified incubator (37° C.) for 24 hours. Following, the dry mass was measured and recorded. Percent water content was determined by the following equation: 100*(wet mass−dry mass)/wet mass.

Tissue Processing and Histology.

Tissue preparation. Following the termination of each experimental protocol, the whole brain was extracted from the remaining portion of the ventral cranium and processed according to the methods described below.

Tissue processing and cresyl violet staining. After extraction, whole brain samples were sectioned into ~0.5 cm-thick slabs and immersion-fixed in a solution containing 4% (w/v) paraformaldehyde for approximately one hour, after which fixative was removed and fresh fixative was added. Tissue was allowed to fix for 72-hours at 4° C. with gentle shaking. Tissue was then washed in 0.1 M PBS (1×) and dropped stepwise into 15% sucrose followed by 30% sucrose supplemented with 0.05% sodium azide. Regions of interest were microdissected from the tissue slabs and sectioned into 40 micron sections under PBS utilizing a vibratome (Leica Biosystems; Buffalo Grove, IL; model: VT1000S). Sections were mounted on TruBond 380 adhesive slides and allowed to dry overnight at room temperature. Tissue was rehydrated in ddH2O; serially dehydrated through 70%, 95%, and 100% ethyl alcohol; and cleared in histoclear II (National Diagnostics; Cat #: HS-202) for 3 minutes in each step. Sections were then rehydrated through ddH2O for 3 minutes in each solution and stained in 0.1% cresyl violet solution for 5 minutes. Sections were quickly rinsed in ddH2O and then differentiated in 70%, 95%, and 100% ethyl alcohol and cleared in histoclear II. Sections were coverslipped with EcoMount (Biocar medical; Cat #: EM897L). Slides were scanned using the Aperio CS2 Pathology Slide Scanner (Leica) at a magnification of 40×. Images were viewed and processed with the Aperio Imagescope Software (Leica).

Immunohistochemistry. Coronal tissue sections from the appropriate regions of the pig brain were processed as described above. For all staining procedures except for intravascular hemoglobin fluorescence detection, tissue sections from each experimental group were co-stained on the same slide. After mounting, tissue sections (except for those utilized for MBP staining) were subjected to antigen retrieval for 2 hours utilizing the Retriever System (Electron Microscopy Sciences [EMS]; Hatfield, PA; Cat #: 62700-10) and R-Buffer A (EMS; 62706-10; 1×) or R-Buffer AG (EMS; 62707-10; 1×). For DAB staining, sections were incubated in 1% hydrogen peroxide/PBS to quench endogenous peroxidase activity. Afterwards, tissue was blocked and permeabilized in PBS containing 5% (v/v) donkey serum, 3% (w/v) bovine albumin serum, 0.1% (w/v) glycine, and 0.1% (w/v) lysine with 0.2% (v/v) Triton X-100 for one hour at room temperature with gentle rotation. Tissues were then incubated overnight at 4° C. with gentle rotation with the primary antibodies directed against the following antigens: IBA1 (rabbit anti-ibal; 1:1000; Wako; 019-19741), GFAP (mouse anti-GFAP; 1:500; Sigma; G3893); RBFOX3/NeuN (rabbit anti-NeuN; 1:2000; Abcam; ab177487); cleaved Caspase-3 (rabbit anti-actCASP3; 1:200; CST; 9661S); MBP (rat anti-MBP; 1:200; BioRad; MCA409S); neurogranin (NRGN) (sheep anti-NRGN; 1:50; R&D systems; AF7947); and GAD1 (goat anti-GAD1; 1:50; R&D systems; AF2086). Unbound primary antibodies were removed by washing with PBS containing 0.3% (v/v) Triton X-100 (3×10 minutes); washing jar was rinsed clean with ddH2O in between washes. Antibody/antigen complexes were visualized after incubation with Alexa Fluor 594 or 488-conjugated donkey or biotinylated secondary antibody anti-rabbit, mouse, sheep, rat, or goat immunoglobulin G secondary antibody (1:500) in blocking solution. Unbound secondary antibodies were removed by washing with PBS containing 0.3% (v/v) Triton X-100 (3×5 min); washing jar was again rinsed clean with ddH2O in between washes. Except for in the cleaved Caspase-3 time-course analysis, background signal was quenched utilizing the autofluorescence eliminator reagent (Cat #: 2160; Millipore) per the manufacturer's instructions. Tissue sections were then simultaneously coverslipped and counterstained with Fluoromount-G containing DAPI (Southern Biotech; Birmingham, AL; Cat #: 0100-01) for immunofluorescence imaging. Alternatively, for DAB staining, sections were incubated with avidin-biotin-peroxidase complex (Vectastain® ABC Elite kit; Vector Laboratories) for 1 hour at room temperature. Finally, sections were washed in PBS (3×15 minutes) and signals were developed using a DAB peroxidase substrate kit according to the manufacturer's protocol (Vector Laboratories). Coverslips were mounted with VectaShield® (Vector Laboratories; Burlingame, CA; Cat #: H-1400) or Permount™ (Fisher Scientific) and sealed with nail polish, unless counterstained with Fluoromount-G.

Intravascular hemoglobin fluorescence. Sections from regions of interest from each experimental group were blocked and permeabilized in PBS containing 5% (v/v) donkey serum, 3% (w/v) bovine albumin serum, 0.1% (w/v) glycine, and 0.1% (w/v) lysine with 0.3% (v/v) Triton X-100 for one hour at room temperature with gentle rotation. Subsequently, sections were incubated with Alexa Fluor 488-conjugated donkey anti-rabbit antibody (1:500) for one hour at room temperature with gentle rotation. Unbound secondary antibodies were removed by washing with PBS containing 0.3% (v/v) Triton X-100 (3×5 minutes). Tissue sections were simultaneously coverslipped and counterstained with Fluoromount-G containing DAPI (Southern Biotech; Birmingham, AL; Cat #: 0100-01) for immunofluorescence imaging.

Microscopy and image processing. Tissue sections were imaged utilizing an LSM880 confocal microscope (Zeiss; Jena, Germany) equipped with a motorized stage using 10× (0.3 NA) or 20× (0.8 NA) objective lenses with identical settings across all experimental conditions. Lasers utilized: Argon 458, 488, and 514; Diode 405; and DPSS 561-10. The DPSS 561-10 laser intensity was increased during imaging of the control perfusate samples for the intravascular hemoglobin fluorescence study in order to obtain a background signal comparable to other groups. Images were acquired at either 1024×1024 or 2048×2048 pixel resolution. Images are either representative confocal tile scans, high-magnification maximum intensity Z-stack projections (approximately 7-9 micron stacks; ~1 micron per z-step), or high-magnification confocal images. Alternatively, histological images were acquired with an Aperio CS2 Pathology Slide Scanner (Leica; Wetzlar, Germany) as described above. Image adjustments were uniformly applied to all experimental conditions in Zeiss Zen. Digitized images were assembled in Zeiss Zen, ImageScope™, and Adobe Illustrator®.

Histological Data Analysis and Quantification.

Immunofluorescence (cell analysis and quantification). Confocal tile scans (10× or 20×) of tissue sections stained for GFAP, IBA1, NRGN, and GAD1 were normalized to identical image surface area, randomized, and subsequently analyzed by a blinded observer for the objects of interest. For all cell marker stains, cells were excluded if below a minimum intensity level, exhibiting cellular vacuoles greater than the size of the nucleus, or demonstrating clear cellular destruction.

Nuclear localization of activated caspase-3 (actCASP3). Multiple confocal images (10×) were taken per region of interest and processed as described above. A blinded observer manually counted DAPI+ objects and actCASP3+ objects utilizing the cell counter function in ImageJ software (NIH). DAPI+ and actCASP3+ objects were initially normalized to image surface area, and subsequently actCASP3+ objects were normalized to number of DAPI+ objects per image surface area.

Cresyl violet staining (cell counts and morphology). A blinded observer processed the images as described above and manually counted objects of interest and morphology utilizing the cell counter function in ImageJ software (NIH). Cells were again excluded if below a minimum intensity level, exhibiting cellular vacuoles greater than the size of the nucleus, or demonstrating clear cellular destruction.

Measurement of myelinated fibers. Measurements of myelinated fiber orientation were made from (4×) brightfield images of MBP staining using the measure angle function in ImageJ. Representative images were accumulated from each biological replicate from all experimental groups and randomized. Measurements were made by a blinded observer from the white matter boundary to layer 1, which could be clearly delineated by the presence of dense horizontal fibers. The counting region analyzed was selected because fibers can be clearly identified, and are organized into a stereotyped rectilinear lattice amenable to systematic analysis. Angles corresponding to axon orientation were then measured relative to a straight line corresponding to the gray-white matter boundary, which runs roughly parallel to the pial surface in the region sampled. Polar histograms, binning, and frequency analysis of fiber angle were processed utilizing MATLAB' software suite (Mathworks, Inc.). For quantifying fiber bundle density, three representative (8×) brightfield images were taken from each biological replicate and randomized. A blinded observer counted the number of fiber bundles present per image. Fiber bundles were defined as a fasciculations of fibers oriented radially to the pial surface and traveling from cortical layer 2/3 to the underlying white matter. Bundle number was normalized by unit area of tissue.

Electron microscopy (EM). Tissue samples sizing approximately 5×5×5 mm, and including predominately the ependymal layer, alveus, and stratum oriens of the CA1 hippocampus, were dissected and immersed in a fixative containing 4% paraformaldehyde and 1% glutaraldehyde in PBS pH 7.4 for 7 days at 4° C. Coronal sections of 100 μm thickness were cut with a vibratome. The sections were post-fixed with 1% $OsO_4$, dehydrated in ethanol, in-block-stained with saturated uranil acetate during dehydration process, and then embedded in durcupan epoxy resin (Fluka, Buchs, Switzerland) on microscope slides and coverslipped. The durcupan-embedded sections were analyzed with a Zeiss Axioplan 2 microscope, and small pieces (~0.5×0.5 mm) containing region of interest were dissected and re-embedded into durcupan blocks for electron microscopic investigation. The samples were cut with a Reichert ultra-microtome into 70-nm-thick sections. Ultrathin sections were then stained with lead citrate, and evaluated and photographed in a JEM 1010 electron microscope (JEOL, Japan) equipped with a Multiscan 792 digital camera (Gatan, Pleasanton, CA, USA). Synapses in the hippocampal CA1 stratum oriens were imaged by a blind operator and 8 randomly chosen synapses per animal per condition (approximately 24 synapses/condition) were subjected to analysis by another blind observer. Number of vesicles within each synapse was averaged and statistically compared across groups.

Lipopolysaccharide (LPS) experiment.

LPS injections. After the 4-hour LPP, 10-hour PMI, control-perfused, and BEx-perfused brains were injected in the dorsal prefrontal neocortex with 2.5 μL of a 1.0 μg/μL PBS solution of lipopolysaccharide (LPS; Sigma-Aldrich; Cat #L3024) at a rate of 0.5 μL/min with a 26-gauge Hamilton syringe attached to a micromanipulator and allowed to incubate for the duration of the 6-hour perfusion protocol. After the termination of the 6-hours, the injected regions were microdissected and flash-frozen in liquid nitrogen for subsequent processing for inflammatory molecules via Multiplex chemo/cytokine analysis as described below.

Multiplex chemo/cytokine analysis. Microdissected samples of the dorsomedial prefrontal neocortex (~30 mg) from LPS-injected brains were allowed to thaw on ice in a Petri dish. Subsequently, the tissue was initially minced with a scalpel blade and homogenized in 0.5 mL of PBS (1×) using a Dounce homogenizer. Homogenates were microcentrifuged at 17,300×g for 30 minutes at 4° C. Cleared supernatants were collected, and protein concentrations for each sample were quantified via a DC protein quantification kit according to manufacturer's instructions (BioRad). Approximately 28 μs of protein were loaded onto the multiplex plate for each well, and the plate was processed and gated according to manufacturer's instructions (Milliplex MAP Kit; Millipore; Cat #: PCYTMG-23K).

Electrophysiology. Electrophysiological experiments were performed on acute hippocampal slice preparations from control and BEx perfused brains. The hippocampus was surgically isolated and the tissue was submerged in cold (<4° C.), carboxygenated (95% $O_2$:5% $CO_2$) cutting solution (70 mM sucrose, 80 mM NaCl, 2.5 mM KCl, 26 mM $NaHCO_3$, 15 mM glucose, 7 mM $MgCl_2$, 1 mM $CaCl_2$, 1.25 mM $NaH_2PO_4$). Coronal 300-μm-thick slices were obtained through vibratome (Leica VT1200S; Buffalo Grove, IL) sectioning and allowed to equilibrate for at least 1 hour at room temperature in an incubation chamber filled with carboxygenated aCSF medium (125 mM NaCl, 2.5 mM KCl, 26 mM $NaHCO_3$, 15 mM glucose, 1.3 mM $MgCl_2$, 2.3 mM $CaCl_2$, 1.25 mM $NaH_2PO_4$). All recordings were performed at 21-23° C. on submerged slices perfused at 0.6 mL/min with aCSF. The recording chamber was mounted on an Axioskop FS2 microscope equipped with a 5× scanning objective and a 40× water-immersion objective (Zeiss), and connected to a CCD camera. Data were derived from hippocampal (CA3) pyramidal neurons using the whole-cell patch-clamp technique. Pipettes were produced from borosilicate glass capillary tubes (Sutter Instruments) by means of a horizontal puller (P-2000, Sutter instruments) and filled with the following intracellular solution: 130 mM K-gluconate, 4 mM NaCl, 2 mM $MgCl_2$, 1 mM EGTA, 5 mM creatine phosphate, 2 mM $Na_2ATP$, 0.3 mM $Na_3GTP$, 10 mM HEPES (pH 7.3 with KOH). Membrane voltage was corrected off-line for a calculated liquid junction potential of −10 mV. Series resistance was always compensated by 70-80% and monitored throughout the experiment. Recordings were made with a MultiClamp 700B amplifier (Molecular Devices) and digitized with a Digidata 1322 computer interface (Molecular Devices). Data were acquired using the software Clampex 9.2 (Molecular Device), sampled at 20 kHz, and filtered at 10 kHz. Cell capacitance (Cm) was calculated by integrating the capacitive current evoked by a −10 mV pulse. Neuronal input resistance (Rin) was calculated in the linear portion of the I-V relationship during depolarizing voltage responses near the resting potential. Active properties were assessed by recording the voltage responses to a series of hyperpolarizing and depolarizing current steps starting from a potential of −70 mV. The spontaneous excitatory (sEPSCs) post-synaptic currents recordings were carried out at the holding potentials of −70 mV. The mean amplitude of the events for each cell was computed using a log-normal function, while the mean frequency was obtained from the monoexponential fit of the inter-event intervals distribution. Data were analyzed with the software Clampfit 10.2 (Molecular Devices) and OriginPro 8 (Microcal).

Measurement of global electrical activity. Electrical activity of the brain was monitored while the brain was at room temperature and no activity was observed. While increasing the temperature of the brain, and throughout the perfusion protocol, electrical activity was also examined via two independent methods to confirm that the brain does not display activity consistent with remnant awareness. Specifically, the electrical activity during the BEx perfusion experiments were examined by a commercially available BIS™ brain monitoring system (Medtronic) and 5×4 platinum-iridium electrode-grid (AD-Tech; Racine, Wisconsin; Cat #: FG20C-SP10X-000) with an exposed surface of 2.8 mm and a 10 mm contact spacing covering the frontal-parieto-occipital convexity. Recordings were taken using Neurolink Natus amplifiers with sampling frequency of range of 1024-2000 Hz. ECoG signal was reviewed with various filter settings including the conventional low frequency filter of 1 Hz and the high frequency filter up to 1000 Hz. In addition, to analyze infra-slow and high frequency oscillations, 0.05 Hz and 80 Hz low frequency filters were used, respectively. Even though no positive global electrical activity was detected, if a positive signal were to arise during the course of experimentation, anesthetic agents (i.e., ketamine and xylazine) were readily available to administer in order to reduce the signal to non-detectable levels, precluding the possibility of remnant awareness in the brain.

Measurement of global cerebral metabolism. Initial and hourly arterial and venous samples were collected from the arterial inlet line to the brain and the posterior sagittal sinus, respectively. 100 μL of each sample were immediately analyzed utilizing the i-STAT® clinical blood analyzer system (Abbott; Princeton, NJ) with CG4+ and EC8+ test cartridges. For CMRO calculations, the instantaneous arterial flow rate (AFR) was measured utilizing an in-line liquid flow meter (SLQ-QT500; Sensirion AG; Stafa, Switzerland) and adjusted to the average mass of the porcine brain (120 g) to yield the cerebral flow rate (CFR). The CMRO was then computed according to the following equation: $CMRO = CFR*(A_{O2} - V_{O2})$. The data was processed utilizing MATLAB.

Statistical analyses. Statistical analysis, data plotting, and figure assembly. All data are reported as means±SEM. Data analysis was conducted using two-tailed paired and unpaired t-test, one-way ANOVA with either Dunnett's post hoc or Kruskal-Wallis with post hoc two-stage step-up method of Benjamini, Krieger, and Yekutieli. Multiple comparisons were conducted in reference to the BEx perfusion group. Pairwise comparisons were performed utilizing two-tailed Chi-square analysis with Yates correction to compare ratios of fiber orientations across experimental groups. The number of animals per experimental group and appropriate statistical analyses are specified in each figure legend. All statistical analyses and data plotting were performed using GraphPad™ 7 (GraphPad Software, Inc.) or MATLAB'. All figures were assembled and created using Adobe Illustrator® CC (Adobe Systems, Inc.). Significance was set at $P<0.05$.

Example 1: Brain Perfusion Apparatus and Perfusion Protocol

Figure 1C:
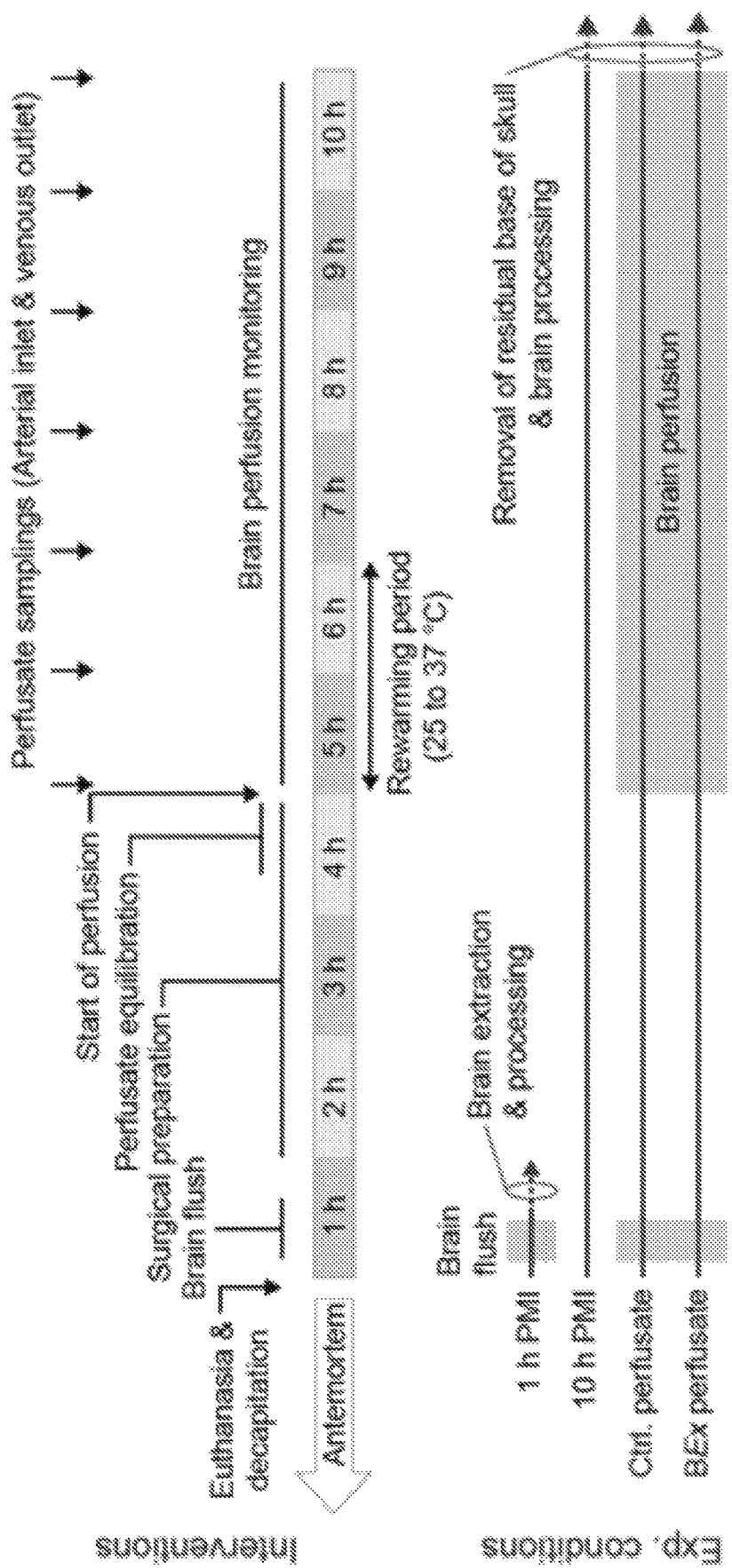
FIG. 1C is a schematic depicting the experimental workflow and conditions. Briefly, porcine craniums are flushed with a hypothermic, heparinized solution. After approximately 1 hour, the surgical procedure is commenced, consisting of vascular isolation, removal of extracranial tissues, and craniectomy. Brain perfusion starts at hour 4 and last for 6 hours. At hour 10, the brain is extracted and processed. The four experimental conditions comprised: 1-hour PMI, unperfused (10-hour PMI), control perfusate-perfused, and synthetic perfusate.
Figure 1D:
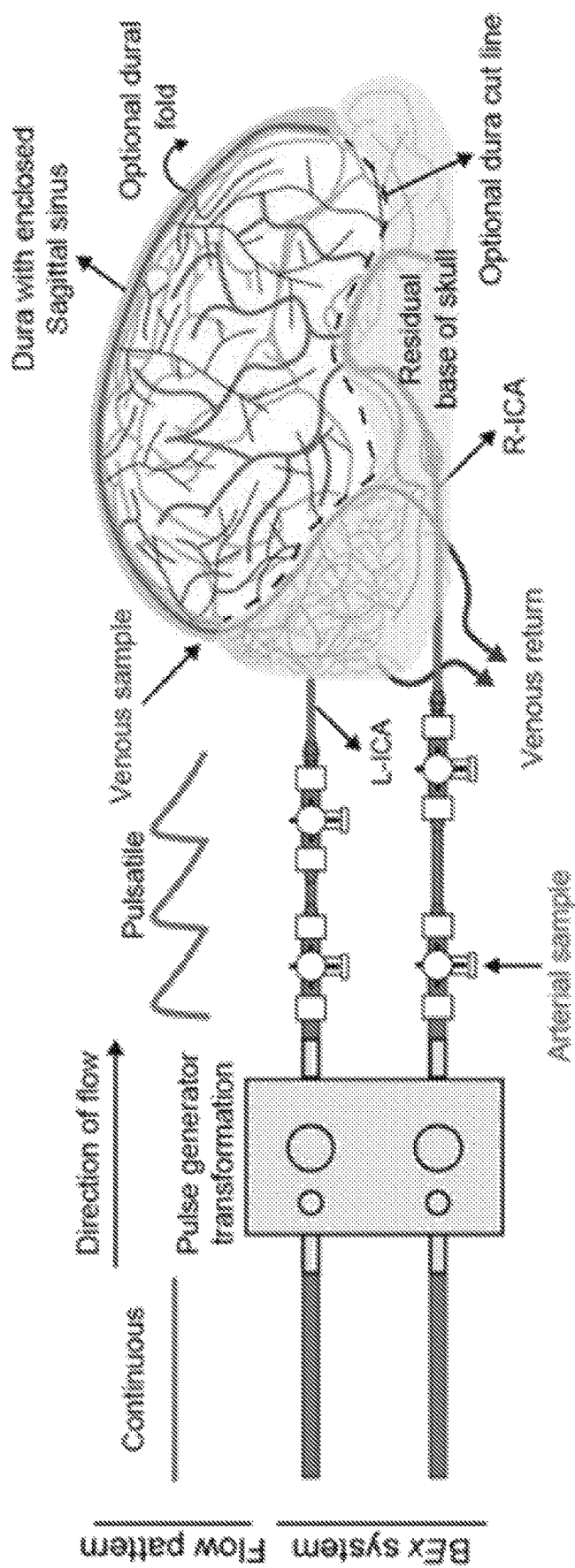
FIG. 1D is a schematic of the connection of the porcine brain to the perfusion system of the invention via the arterial lines. The pulse generator transforms continuous flow to pulsatile perfusion. Ports for arteriovenous sampling are delineated.
Figure 16B:
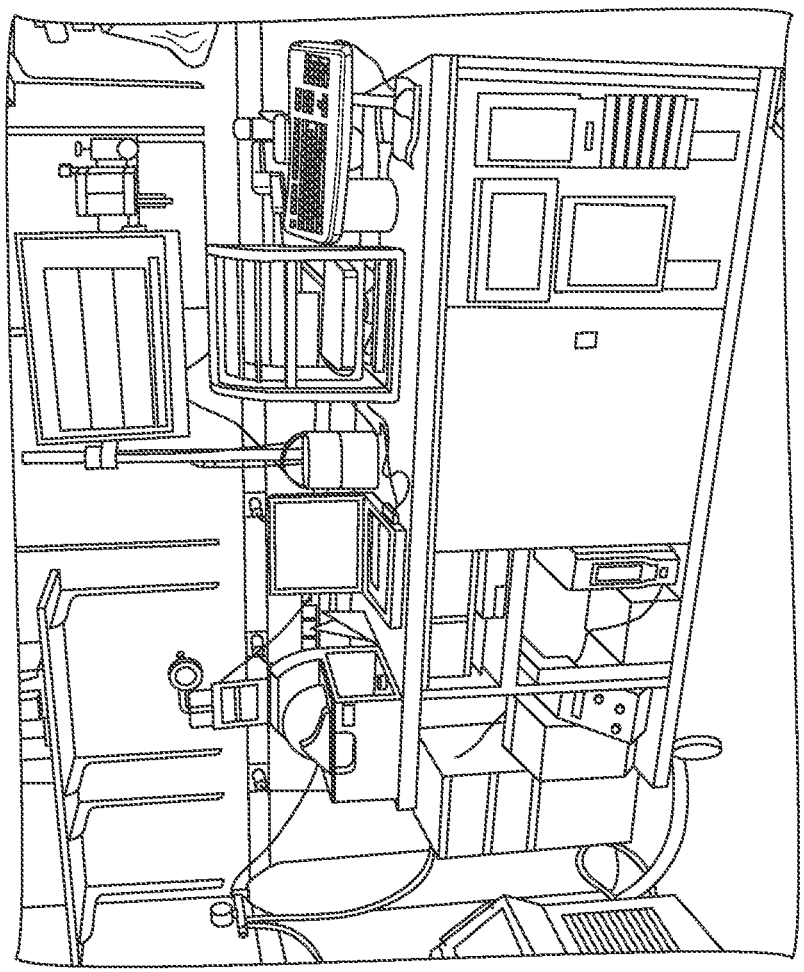
FIGS. 16A-16B are images of the assembled hardware of the preservation system of the invention, housed on a portable cart.
Figure 16A:
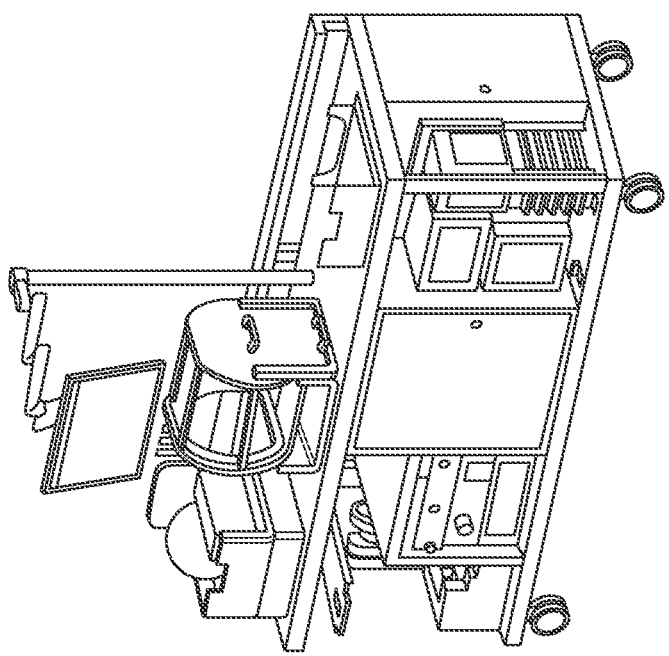
Figure 16C:
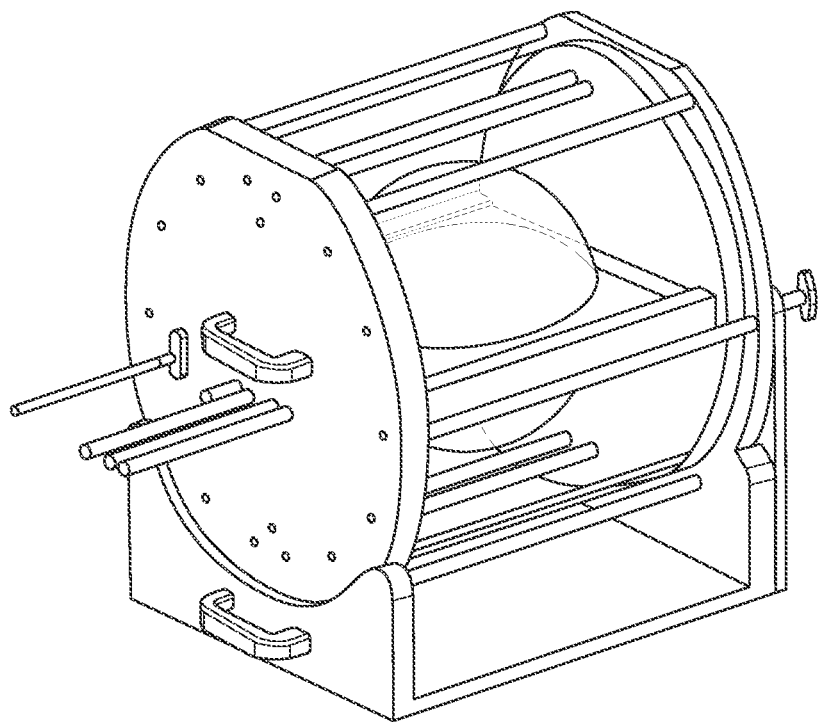
FIG. 16C is an image of the isolation chamber which holds the organ, complete with pseudodura and inlet valves for vascular and interventional access.

To test the hypothesis that cellular viability of an intact mammalian brain can be preserved after prolonged post-mortem intervals (PMI), a custom pulsatile-perfusion system was engineered with a uniquely-formulated synthetic brain preservation medium (BPM). The mechanical components of the system comprise a closed-loop circuit, extracorporeal perfusion platform that circulates a synthetic acellular, hemoglobin-based perfusate under physiological cardiac waveforms. The platform is amendable to any user-designed waveform within 20-140 mmHg and 40-180 beats per minute, as well as temperature setting, ranging from 3-42° C. The system is capable of maintaining organ homeostasis through the use of hemodiafiltration and gas infusion mechanisms, simulating renal and respiratory systems, respectively (FIG. 1A). Additionally, the system comprises a brain isolation chamber with infusion, vascular access ports, and a gas scrubbing apparatus (FIG. 1D). The entire system was housed within a transportable cart complete with a built-in computer and monitoring station (FIG. 16A-16C).

Figure 2A:
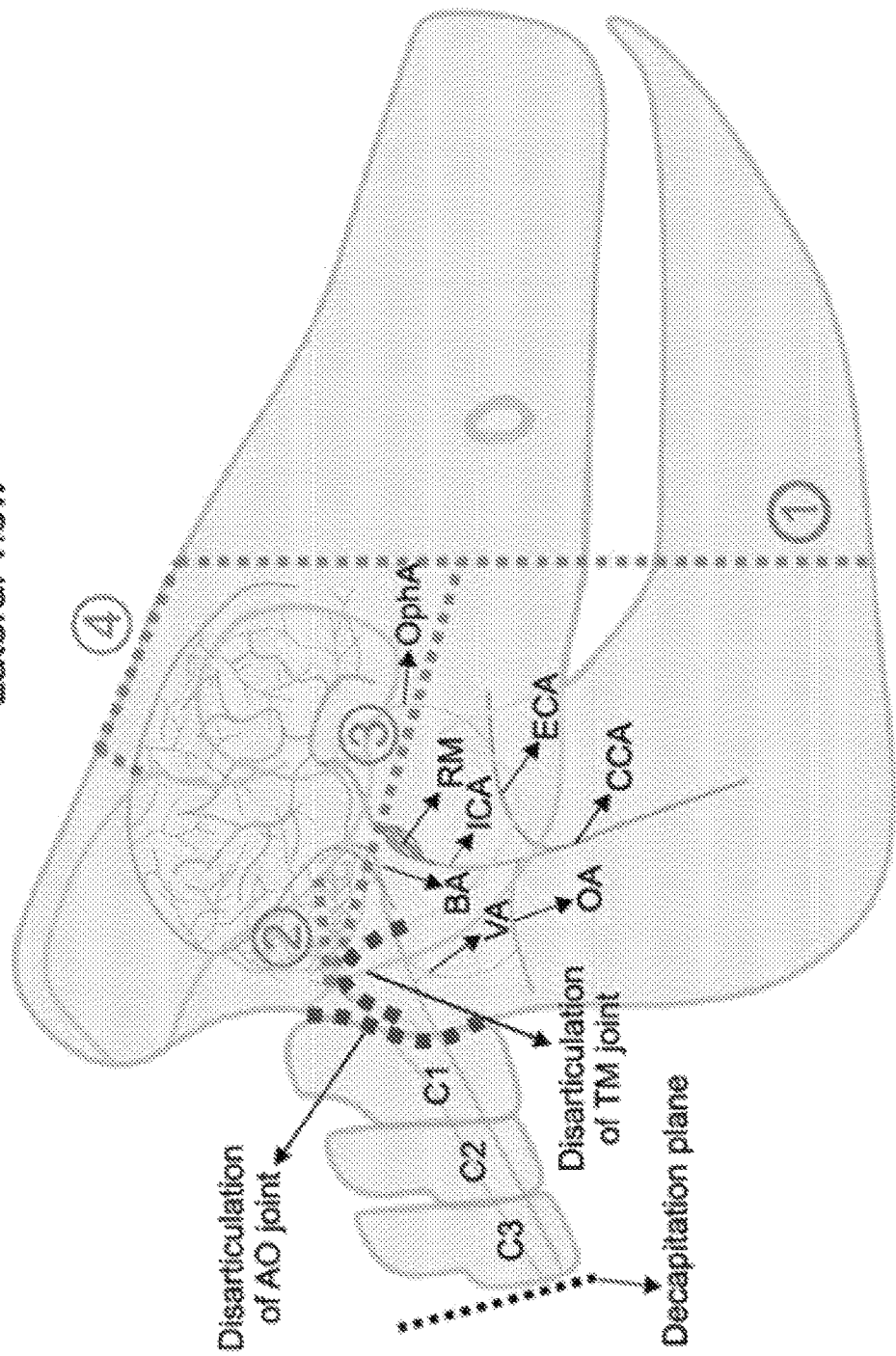
Figure 2B:
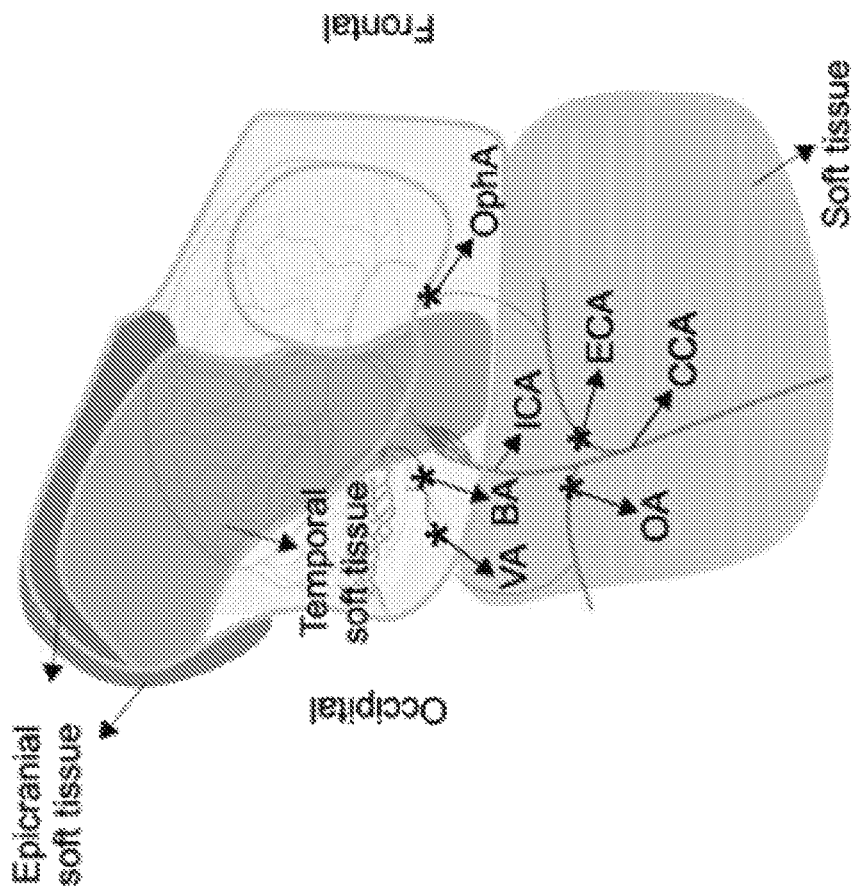
Figure 2D:
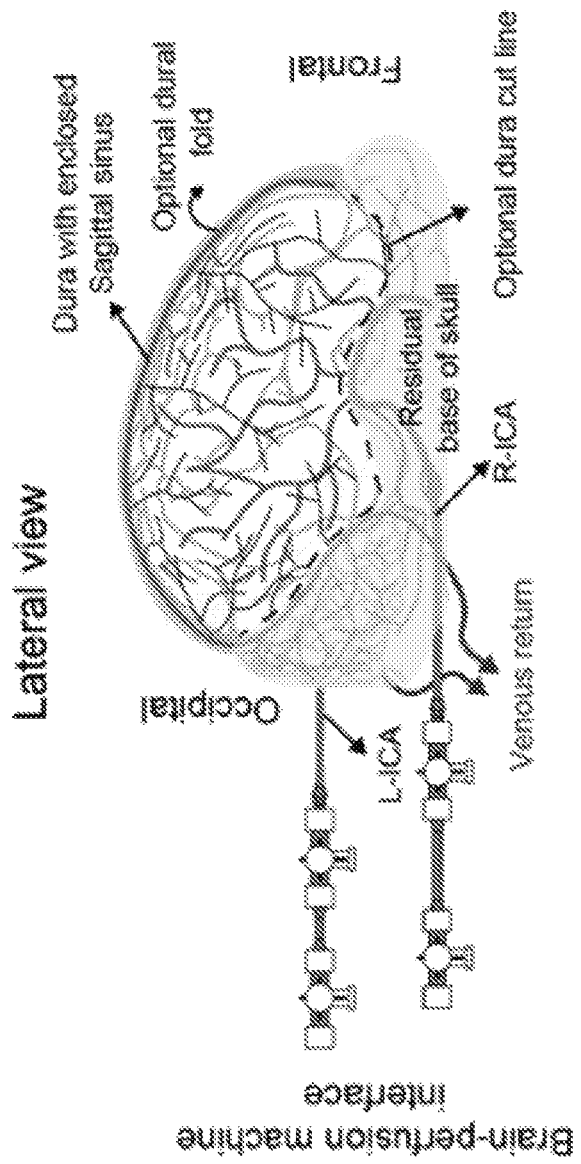
Figure 2E:
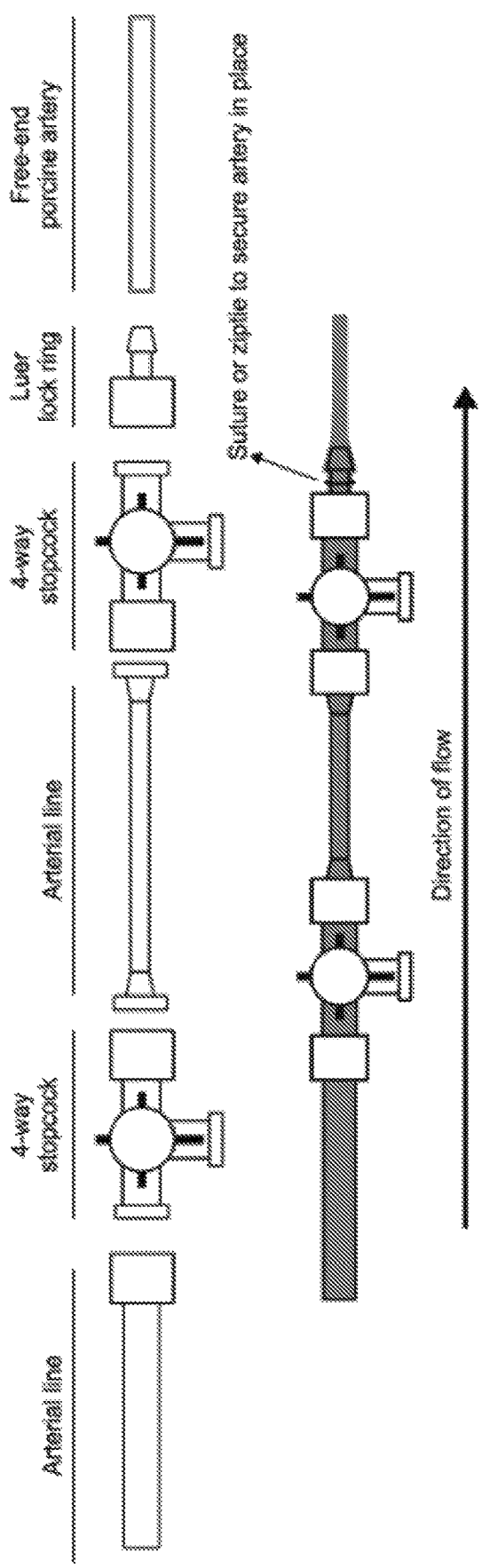

A procedure was developed for isolating an intact porcine brain. First, the maxilla and anterior portion of the mandible were removed by performing a coronal cut through the naso-frontal suture (FIG. 2A); the zygomatic process of the temporal bone and malar bone were removed (FIG. 2A), as well as the supraorbital process (FIG. 2A), in order to have full access to the orbit. Following, the remaining portion of the mandible and the vertebral column (C3-C1) were excised via disarticulation at the temporomandibular and atalanto-occipital joints, respectively (FIG. 2B). The remaining soft tissues of the oral gastrointestinal tract as well as the temporal and occipital soft tissues were carefully excised (FIG. 2B). To selectively perfuse the brain and prevent vascular shunting, the external carotid, occipital, ophthalmic, vertebral, and basilar (at the medullary level) arteries, along with the ramus anastomoticus, arteria anastomotica, and smaller branches originating from the ascending pharyngeal artery, were dissected and ligated and/or cauterized, leaving the internal carotid patent (FIGS. 2C-2E). The dorsal, lateral, and posterior portions of the skull were removed utilizing a neurosurgical power system with Codman perforators and a Hi-Line XS dura guard drill holder (FIG. 2D). After four hours post-mortem, here known as length prior to perfusion (LPP), the common carotids were connected to the perfusion system of the invention (FIG. 1D; FIG. 2E). Perfusion with either synthetic perfusate or saline solution began immediately following blood vessel connection for a total length of perfusion (LOP) of 6 hours; two additional control groups consisting of 10-hour PMI (maintained at room temperature; 10-hour PMI) and 1-hour PMI (1-hour PMI) were included for subsequent analysis (FIG. 1C).

Figures 3A, 3B, 3C, 3D, 3E, 3F, 3G, 3H, 3I, 3J:
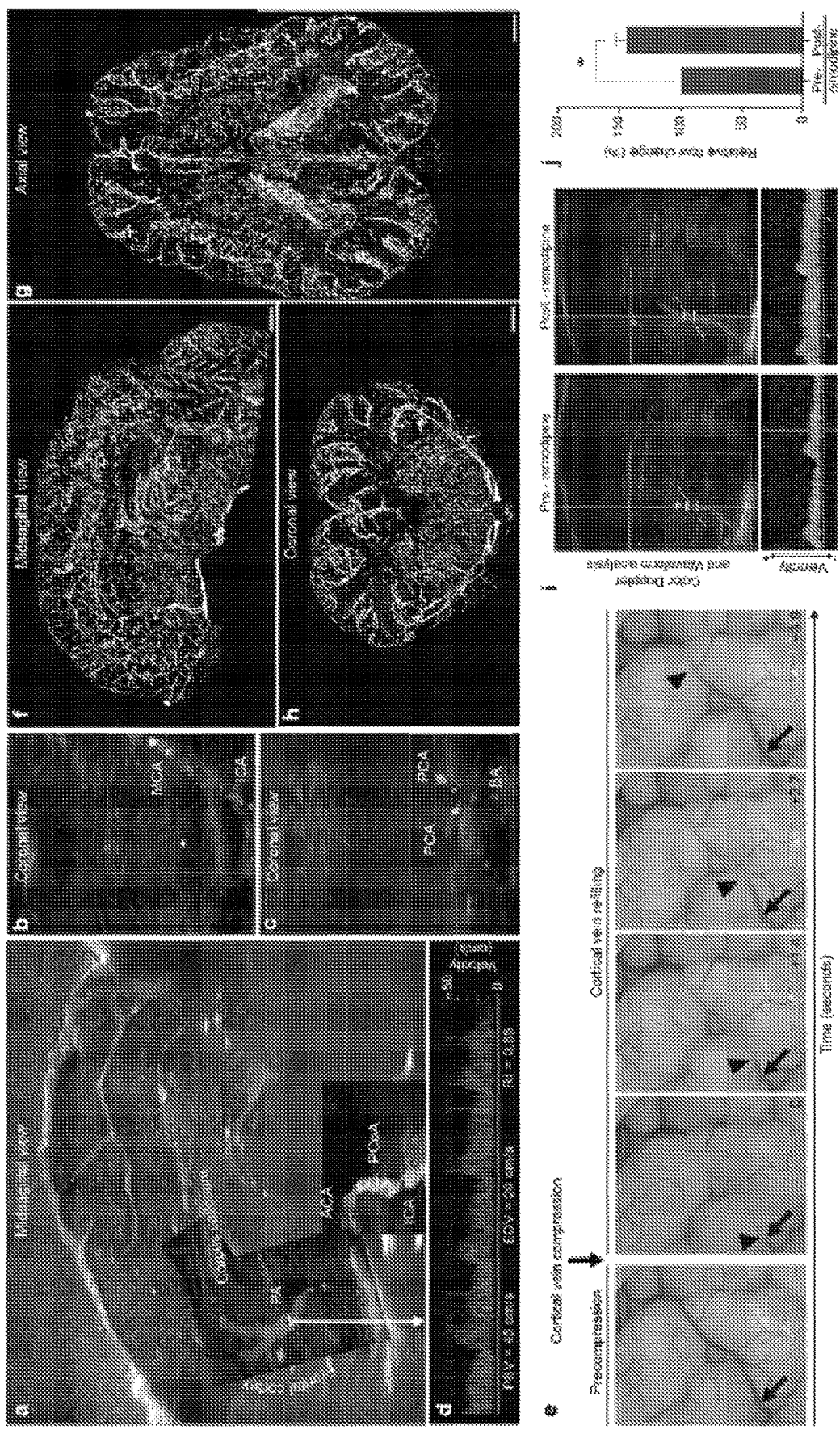
FIGS. 3A-3J are images and graphs showing perfusion of the ex vivo porcine brain and maintenance of vascular functionality with the system of the invention.

Example 2: Perfusion of Major Cerebral Arteries and Microvasculature Using the System of the Invention In order to investigate whether the system of the invention restores perfusion throughout the major cerebral arteries, including cerebral microvasculature, an ultrasound contrast agent was co-administered in the BPM perfusate, and real-time cerebral perfusion was measured via ultrasonography. Utilizing ultrasonography, brain structures such as the cerebral cortex, including frontal and occipital lobes, as well as subcortical structures such as the thalamus can be appreciated (FIG. 3A). Doppler measurement of BPM-perfused brains revealed robust perfusion flow through the major cerebral arteries (FIGS. 3A-3C). Specifically, flow was observed in the internal carotid artery (ICA), posterior communicating artery (PcoA), anterior cerebral artery (ACA), pericallosal artery (PC), basilar artery (BA), posterior cerebral artery (PCA), middle cerebral artery (MCA), as well as other cortical branches of these vessels (FIGS. 3A-3C). Power waveform analysis of the flow through the ACA demonstrated biphasic structure with peak systolic velocity (PSV) of 45 cm/s and end diastolic velocity (EDV) of 20 cm/s, yielding a resistance index (RI) of 0.55 (FIG. 3D). In comparison to control perfusate conditions, the perfusion dynamics remained in expected physiological range over the course of 6-hour experimentation under synthetic perfusion conditions, demonstrating that the major cerebral arteries in porcine brains subjected to synthetic perfusate are robustly patent, structurally intact, and capable of perfusion (FIGS. 4A-4E).

Figure 3K:
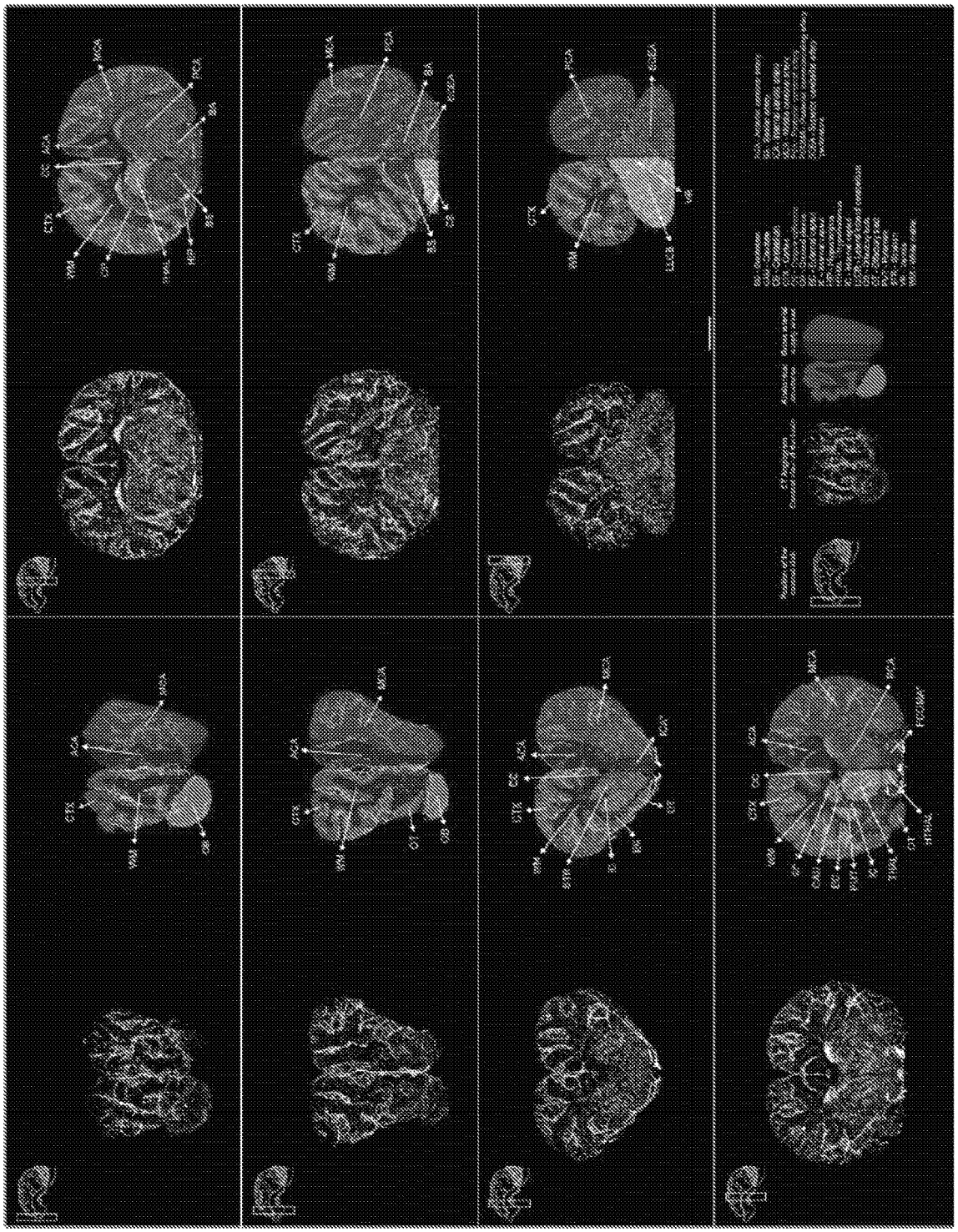
FIG. 3K is a series of coronal sections of three dimensional renderings of high-resolution computed tomography angiography. Each inlet box depicts a maximum intensity projection of a 1 cm coronal section at the plane indicated in the model (upper-left corner). High-resolution CTA demonstrates patency of major arterial vessels as well as precapillary arterioles (left). Corresponding gross anatomical structures as well as arterial supply areas were traced and mapped onto each CTA rendering (right). Legend provides abbreviations for anatomical structures and vascular vessels.
Figures 3L, 3M, 3N, 3O:
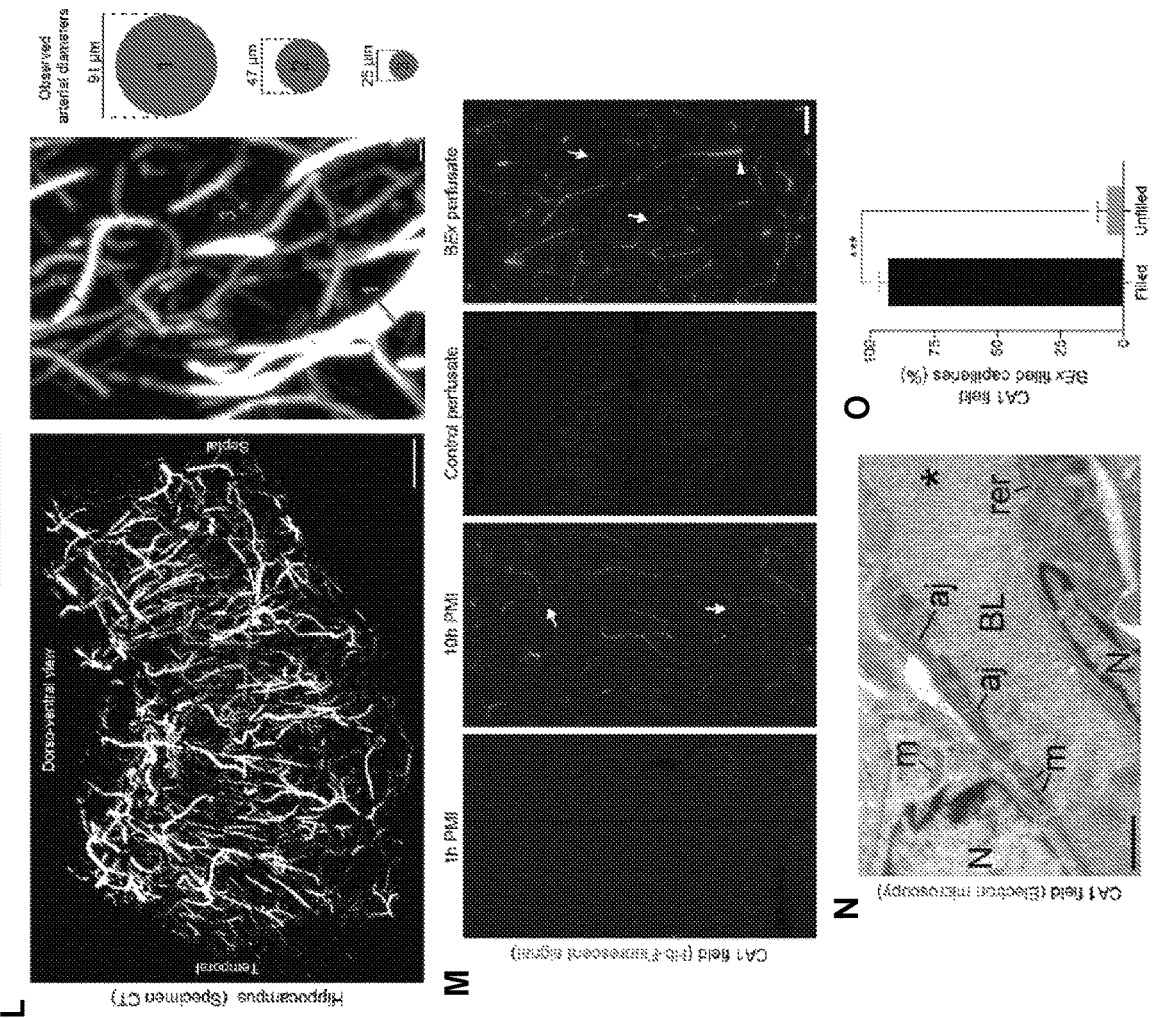
FIGS. 3L-3U are data demonstrating restoration of microcirculation within multiple brain regions.
Figures 3P, 3Q, 3R:
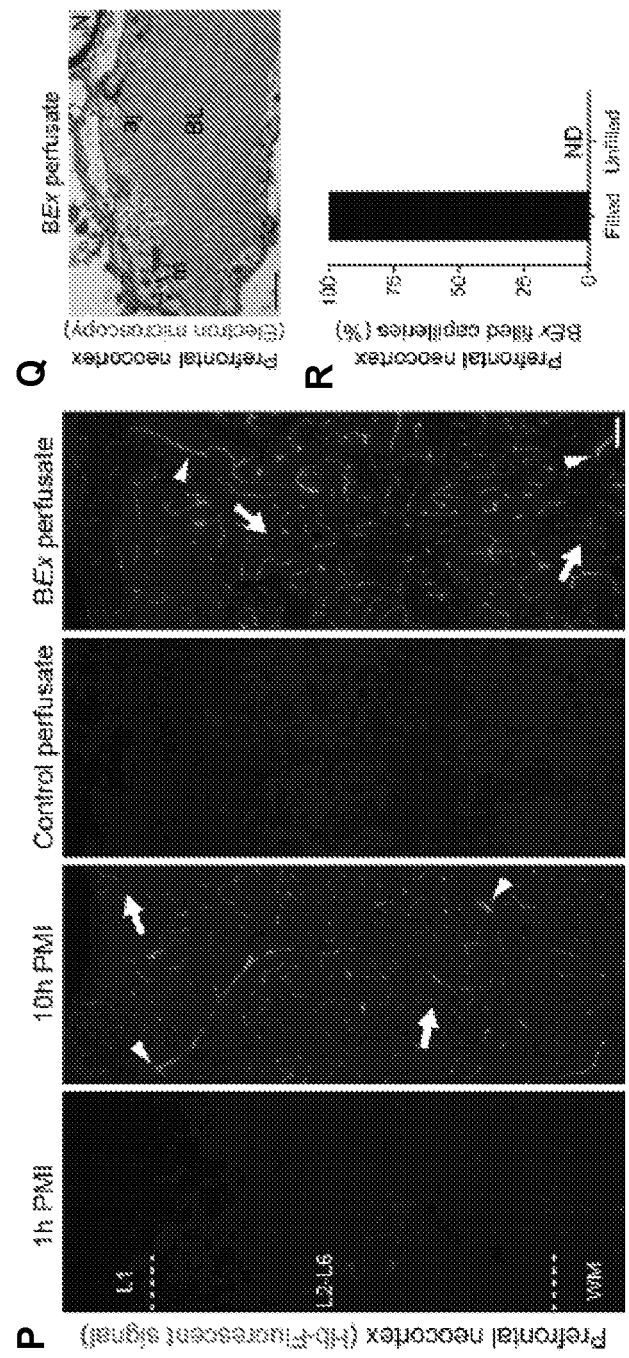
Figures 3S, 3T, 3U:
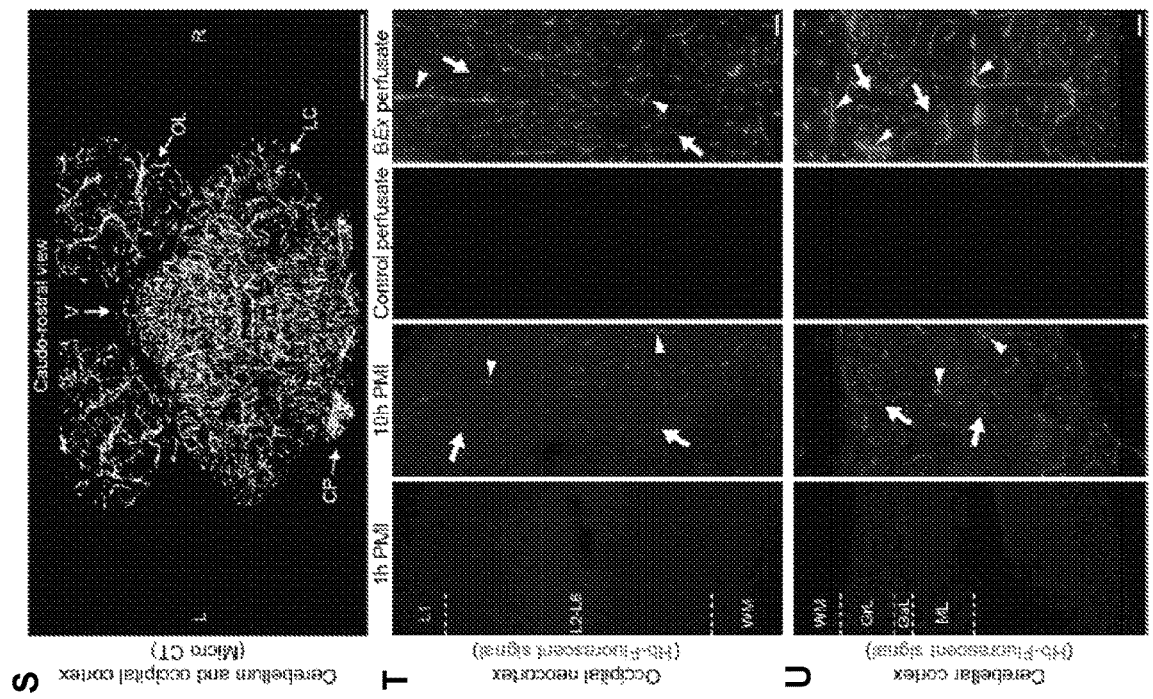
Figures 4A, 4B, 4C:
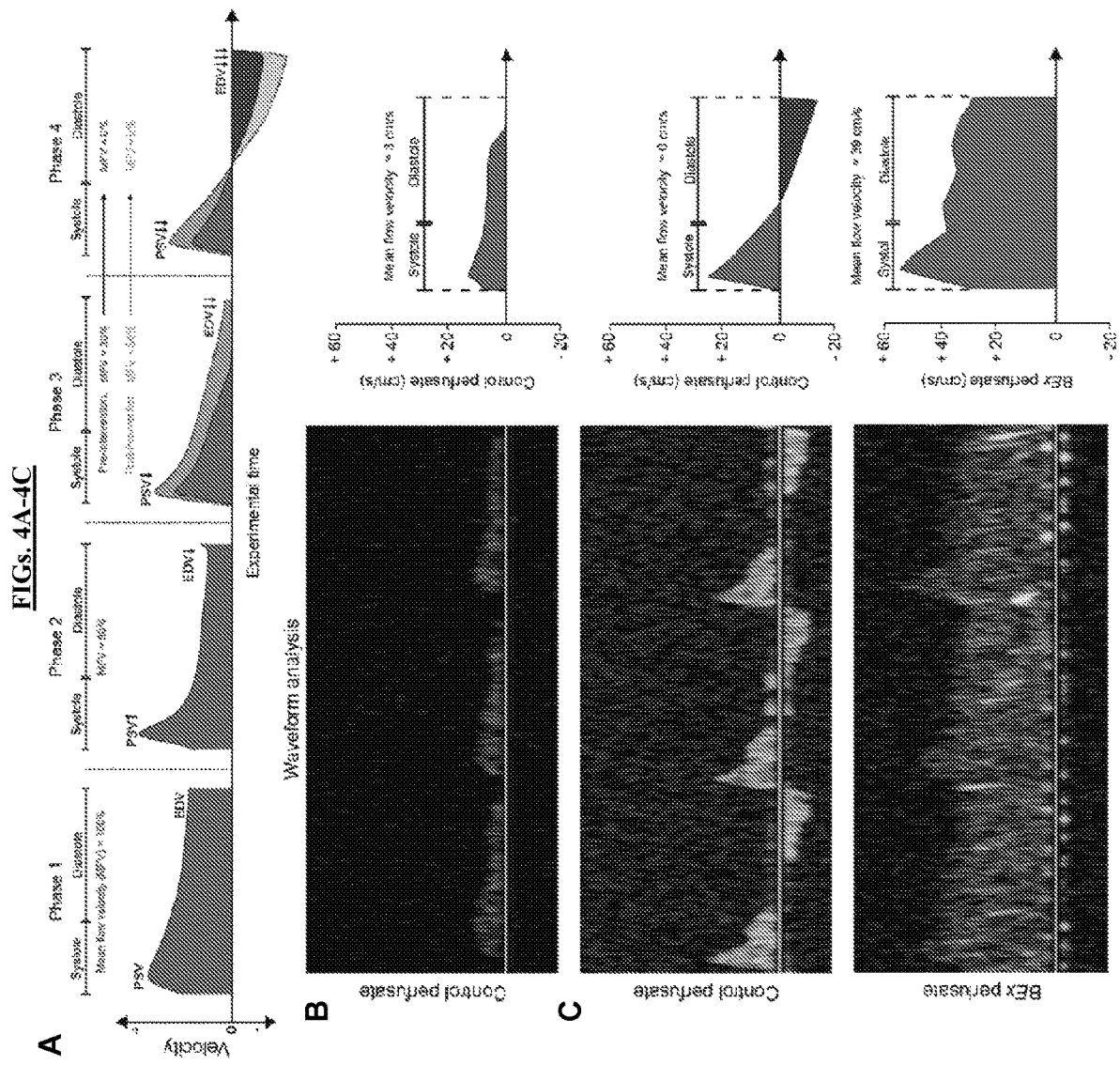
FIGS. 4A-4E depict data demonstrating perfusion dynamics with the BrainEx system utilizing both control perfusate as well as BrainEx perfusate.
Figures 4D, 4E:
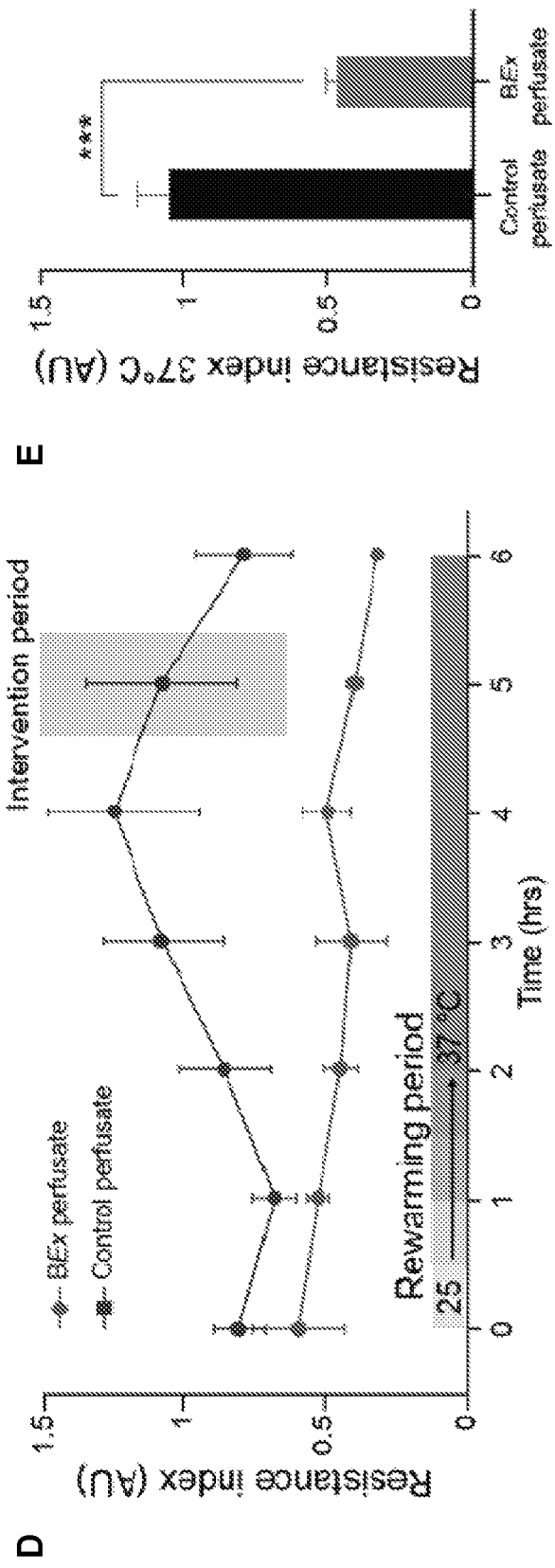

Upon gross anatomical inspection of cortical vessels, and extensive and fine vascular network can be readily appreciated, with small vessels carrying the synthetic perfusate (FIG. 3E). To test vessel refill, which necessitates capillary flow, compression and release of the central cortical vein demonstrates swift refilling, evidencing preserved capillary perfusion (FIG. 3E, arrows). Thus, the major brain arteries and microvasculature in porcine brains connected to the system are patent and perfused. To further confirm perfusion of microvasculature, computed tomography angiography (CTA) was employed utilizing bismuth-loaded nanoparticles as an intravascular contrast medium. Global cerebral CTA as well as high resolution scanning of the entire brain revealed the presence of contrast agent in both major cerebral vessels (FIG. 3K) and pre-capillary arterioles (FIGS. 3F-3G). High-resolution specimen scanning of the hippocampus further substantiated the patency and perfusion of pre-capillary arterioles (FIG. 3L). Moreover, since control perfusion conditions resulted in cessation of vascular flow due to marked tissue damage and edema, and 10-hour PMI tissue specimens were replete with residual blood clots, technical difficulties were experienced in performing perfusion-fixation of these control tissues. Therefore, immersion fixation was utilized to ensure that all four experimental groups were examined under equivalent conditions. In doing so, the high affinity that fluorescent secondary antibodies display towards hemoglobin were leveraged to examine the extent of microvascular reperfusion in BEx conditions as compared to controls. It was hypothesized that if the BEx system successfully reperfused cerebral microcirculation, the hemoglobin fluorescent signal within the microvessels would be comparable to the 10-hour PMI controls since they remained unflushed and retained sequestered whole blood within the cerebral vessels after the animal was sacrifice. This fluorescent pattern would be in contrast to the 1-hour PMI and control perfusate conditions given the vessels were cleared of blood components in preparation for the experimental procedure. Indeed, robust signal was found throughout the entire vascular tree (i.e., penetrating arterioles, pre-capillary arterioles, and capillaries) in the hippocampus and prefrontal neocortex of both BEx and 10-hour PMI brains. Importantly, negligible fluorescent signal was observed in the microvessels of control perfusate and 1-hour PMI controls, indicating that the cerebral flushing procedure successfully clears the vessels of whole blood, and precluding the possibility that the intravascular fluorescent signal observed in the BEx perfusate is a result of residual blood in the microvessels (FIGS. 3L-3U). Additionally, utilizing electron microscopy (EM), nearly all vessel lumens examined were found to be filled with electron-dense perfusate in both the hippocampus and prefrontal neocortex (FIGS. 3N, 3O, 3Q, 3R), thereby confirming that the perfusion system of the invention is capable of perfusing cerebral microcirculation.

Example 3: Preservation of Responsiveness of the Brain Vasculature

In order to investigate whether the neurovascular unit remained responsive to pharmacological intervention, 0.3 mg of nimodipine, a potent L-type voltage-gated calcium channel antagonist clinically prescribed to treat vasospasm, was administered into the perfusate of either saline- or BPM-perfused brains after a 5-hour LOP. Under BPM perfusion conditions, a robust increase in volume flow rate was observed post-intervention in comparison to saline conditions, indicating that the neurovascular unit retained responsiveness to pharmacological stimulation through perfusion with synthetic formulation (FIGS. 3I-3J). Overall, these data indicate that the brain vasculature remains responsive and structurally patent for at least 6 hours following a 4 hour PMI only under synthetic perfusion conditions.

Figure 5A:
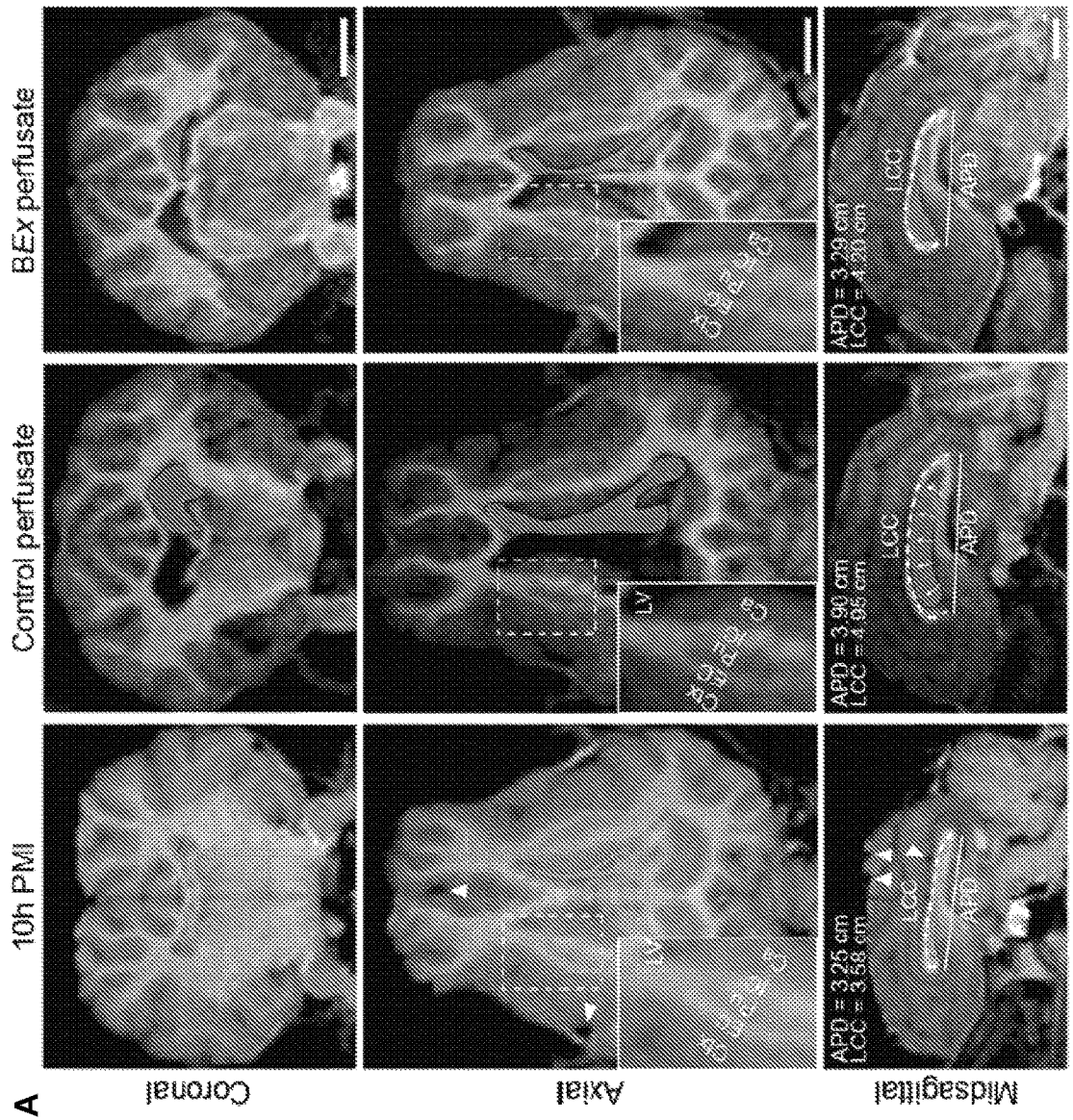
FIGS. 5A-5C are images and graphs showing T1-weighted MRI of porcine brains and tissue water content.
Figure 5B:
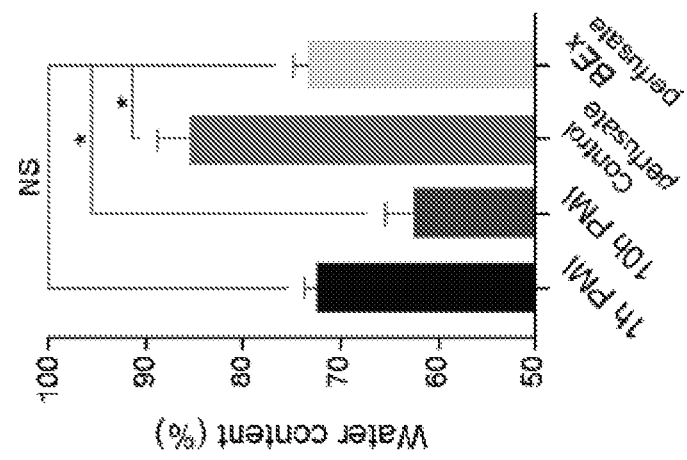
Figure 5C:
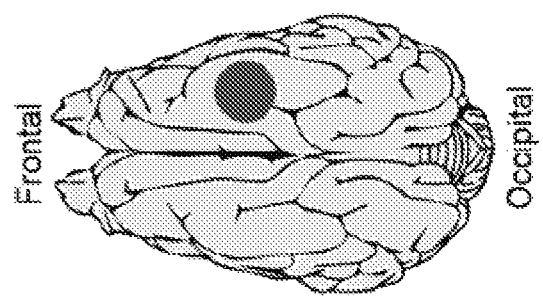

Example 4: Preservation of Neuroanatomical Structure and Prevention of Cerebral Edema The system of the invention was investigated to determine whether the system maintained the global anatomical integrity of the brain as well as prevented cerebral edema associated with prolonged ischemic injury. After a 6-hour LOP under non-, control-, or BPM-perfused conditions, the brain was examined under T1-weighted magnetic resonance imaging (MRI). Under BEx-perfused conditions, the neuroanatomical structure remained intact as evidenced by normal ventricular size (green trace), preserved contrast between gray and white matter (inset), and a clear distinction among anatomical landmarks with the absence of drop-out signals or tissue irregularities, which were comparable to in vivo porcine brains (FIG. 5A). The length of the corpus callosum (LCC) was measured, and anterior-posterior diameter (APD) as proxies of ventricular size, and observed differences across experimental conditions, further indicating that BEx perfusion maintained normal ventricular structure. As compared to BEx perfusion, the 10-hour PMI control exhibited a deterioration of gray-white matter contrast (inset), and collapse of the lateral ventricles, indicative of a decrease in water content. The LCC and APD were also reduced, supporting the observation of overall tissue contraction. In the axial and sagittal planes, we found dropout signals indicative of gas accumulation commonly observed in post-mortem brain scans (arrowheads) undergoing tissue decomposition. Moreover, in comparison to BEx perfusion, control-perfusate conditions maintained at normothermia resulted in pervasive tissue damage, a decrease in global signal intensity, and an increase in gray-white matter contrast (inset), indicating the presence of edema (FIG. 5A). An expansion of the lateral ventricles (green trace) was also found, which was demonstrated by an upward bowing of the corpus callosum, and an increase in LCC and APD. To further assess the extent of edema within each experimental condition, the wet-to-dry weight was measured of a stereotyped sample of the cerebrum (FIGS. 5B-5C). A significant decrease and increase in water content was observed in 10-hour PMI and control perfusate conditions, respectively, with no significant difference between 1-hour PMI and BEx perfusate brains (FIGS. 5B-5C).

Example 5: Cellular Metabolism and Electrical Activity

Figure 6:
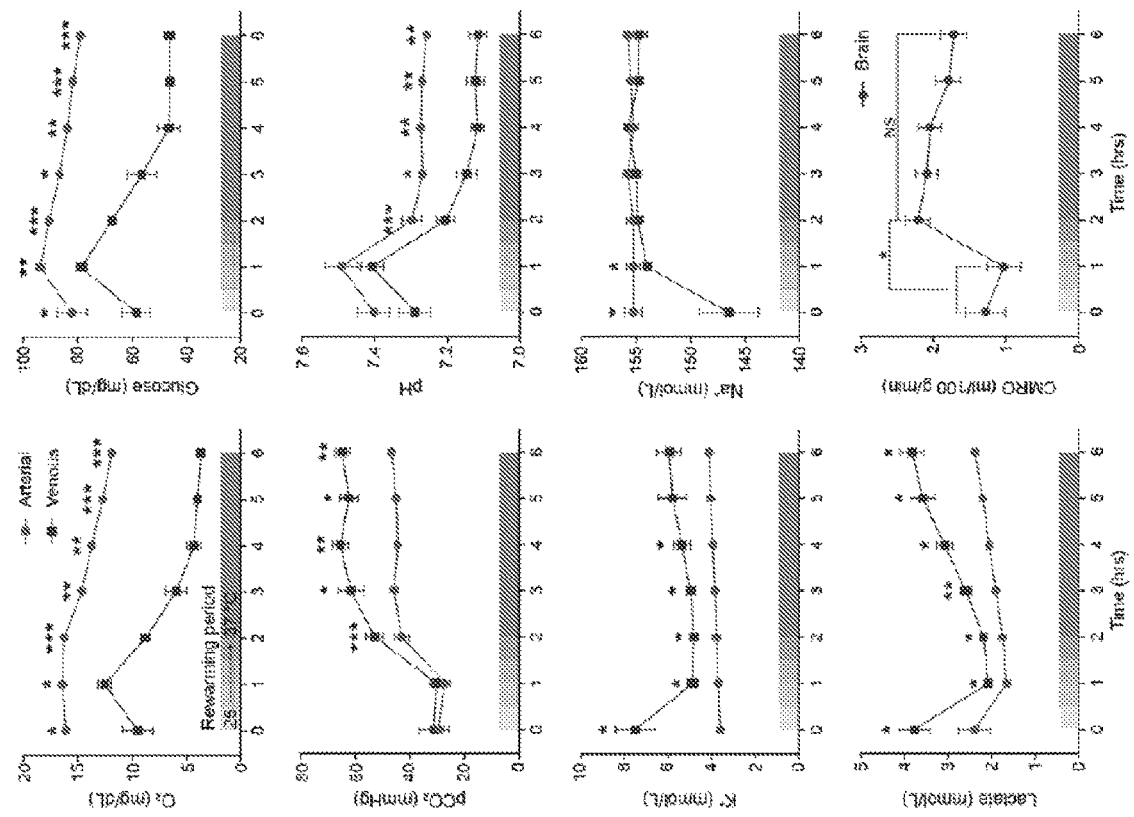
FIG. 6 depicts graphs illustrating arteriovenous gradients and cerebral rate of oxygen consumption from BEx-perfused brains. The data reveals reemergence of active metabolism as the brains reach normothermia.

The perfusion system of the invention was assessed for its ability to restore metabolic activity in the synthetic-perfused brains by comparing arterial and venous samples harvested from the common carotid and superior sagittal sinus, respectively. First, glucose, lactate, electrolyte, pH, as well as soluble gas concentrations were recorded using the i-STAT® clinical blood analyzer system. Venous samples from brains perfused with synthetic perfusate exhibited a consistently lower concentration of glucose and oxygen (i.e. $CIVIRO_2$~2 mL/min/100 g tissue) as experimentation proceeded in comparison to arterial samples, with a concurrent increase in $CO_2$, and a physiological drop in pH with a low, yet measurable efflux of lactate from the brain. These findings evidence a resuscitation of active cerebral metabolism. Moreover, venous concentrations of potassium normalized into physiological range after one hour of perfusion, suggesting that the system of the invention is capable of not only restoring electrolyte balance, but also inducing the resurgence of active $Na^+/K^+$ homeostasis (FIG. 6).

Figures 7A, 7B, 7C, 7D, 7E:
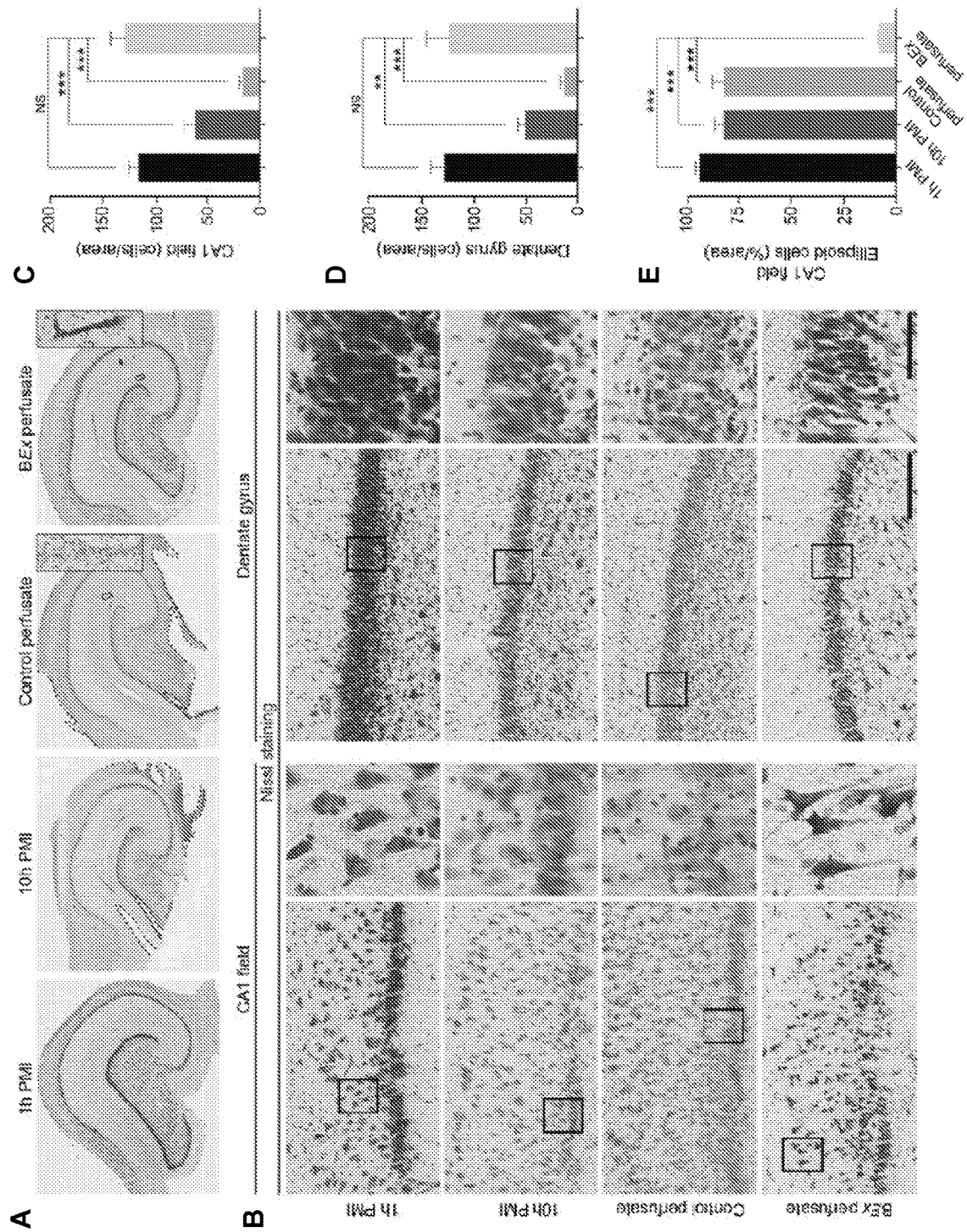
FIGS. 7A-7H report neuronal cell morphology, numbers, and activation of Caspase-3 in hippocampus of perfused and unperfused brains.
Figures 7F, 7G, 7H:
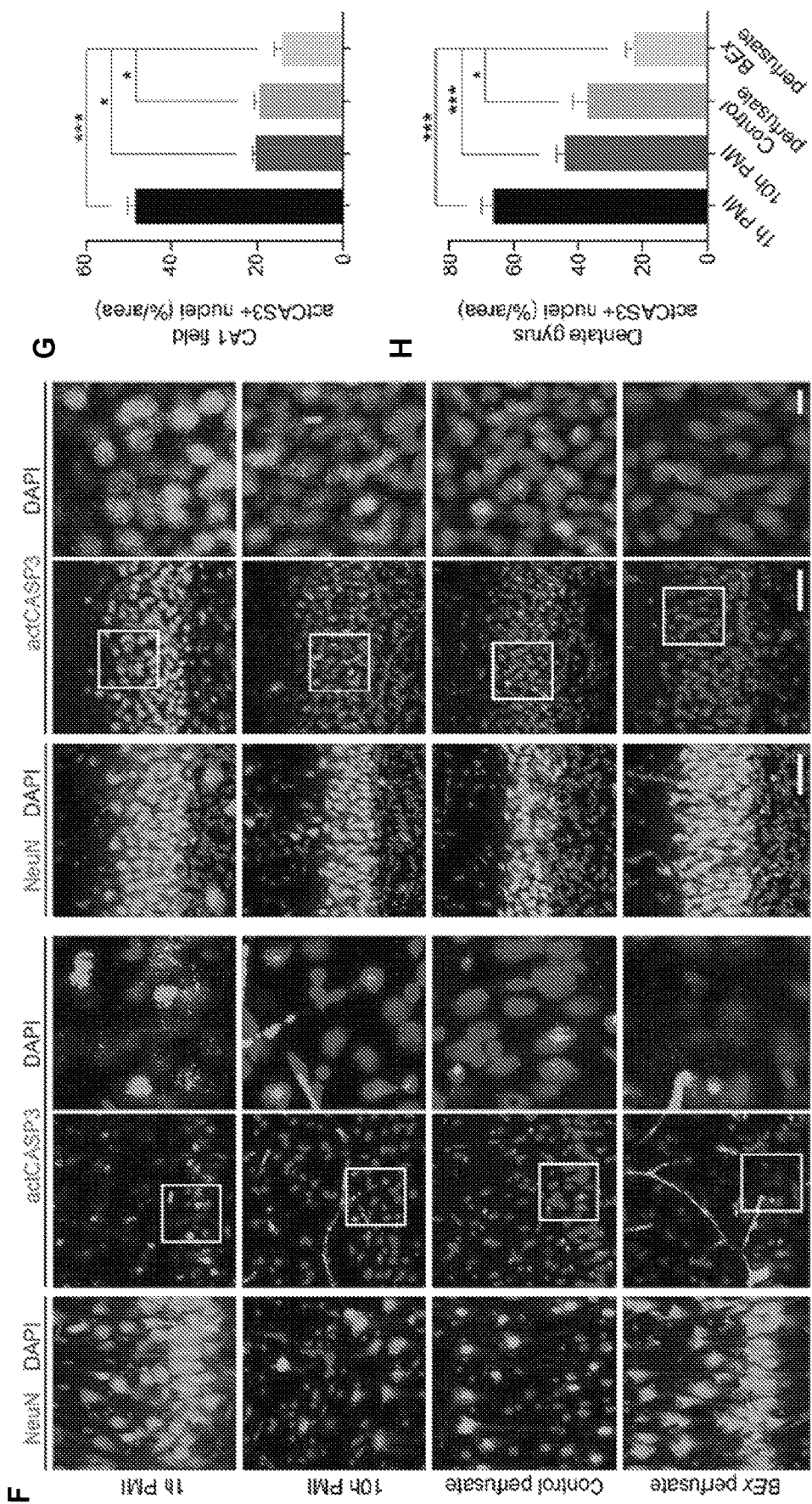
Figures 8A, 8B:
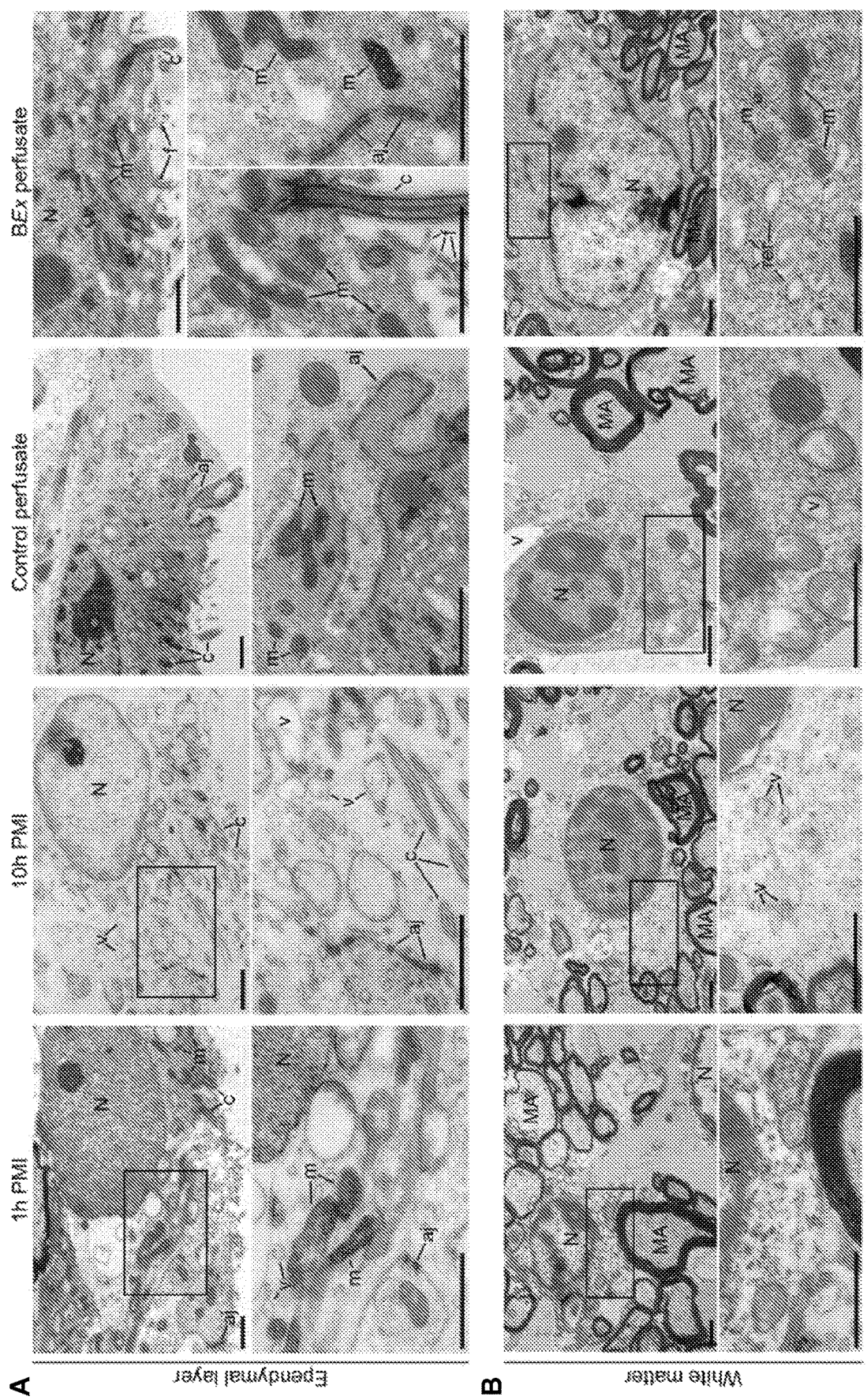
FIGS. 8A-8B are representative EM microphotographs of hippocampal ependymal cells. According to FIG. 8A, in 1-hour PMI controls, certain mitochondria display normal ultrastructure and electron-dense matrix (m), while others exhibit a more swollen morphology (yellow). Contrastingly, in 10-hour PMI conditions ependymal cells demonstrate lightened cytoplasm with numerous vacuoles (v) and swollen mitochondria (yellow). Although adherens junctions (aj) are preserved, the cell membrane is destroyed in several positions. Similarly, some moderately damaged, yet visibly intact, cells under control perfusate conditions make contact with entirely destroyed adjacent cells (pink), indicating a destruction of the continuum of the ependymal layer. However, ependymal cells from BEx-perfused brains, show ultrastructure characteristic of normal cells, such as continuity of the cell membrane that covers cilia (c) and produces filopodia (f), tight junctions between adjacent cells, and intact mitochondria with electron dense matrix. Boxed area (top) are enlarged in corresponding high-power image (below). According to FIG. 8B, in the hippocampal white matter of 1-hour PMI, 10-hour PMI, and control perfusate conditions, numerous cells contain segments of destroyed cytoplasm (pink), while oligodendrocytes have light cytoplasm with numerous vacuoles and swollen mitochondria (yellow); in 10-hour PMI samples, mitochondria may not be visible due to extensive destruction. In BEx perfusate conditions, oligodendrocytes demonstrate normal ultrastructure with numerous cisterns of rough endoplasmic reticulum (rer), and mitochondria have electron-dense matrix and many cristae. Overall myelinated axons (MA) exhibit similar morphology across all experimental groups. Boxed areas (top) are depicted in corresponding high-power images (below). N, cell nucleus. Scale: 1 μm.
Figures 9A, 9B:
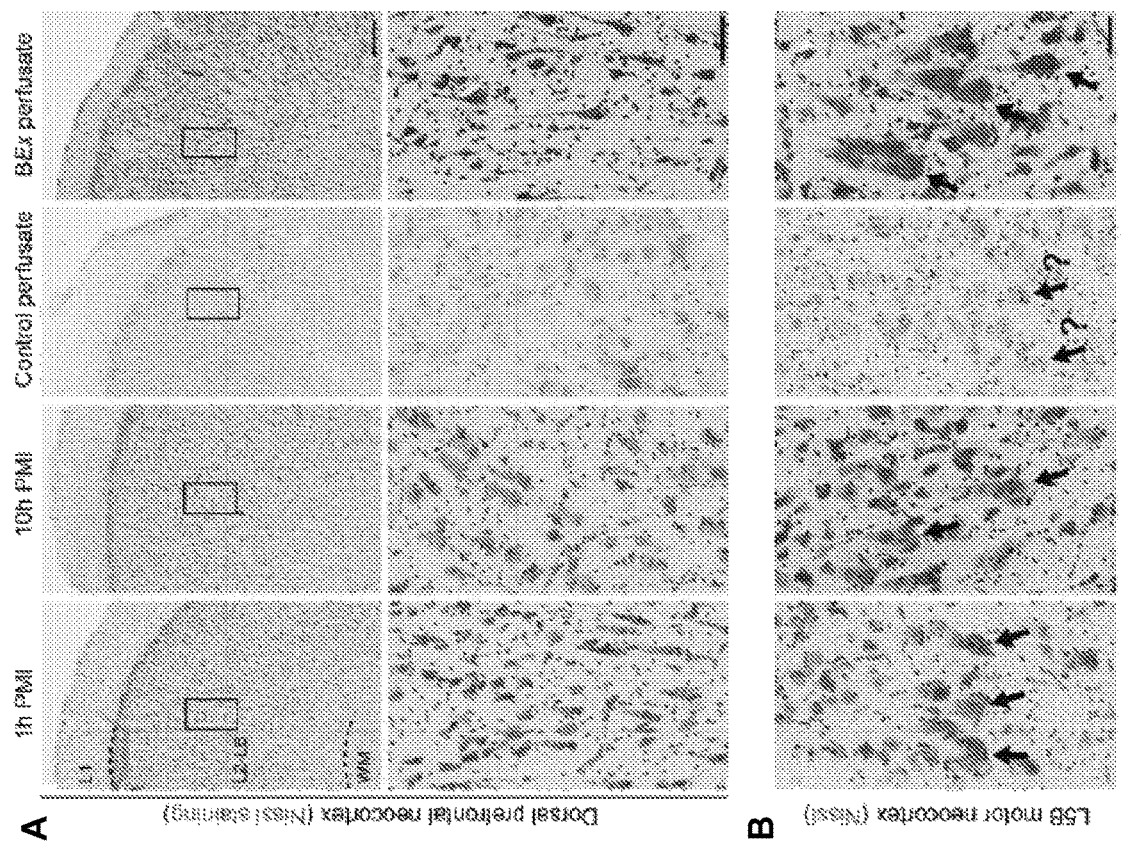
FIGS. 9A-9J are images and graphs showing neuronal cell morphology and numbers in the prefrontal cortex of perfused and non-perfused brains.
Figure 9C:
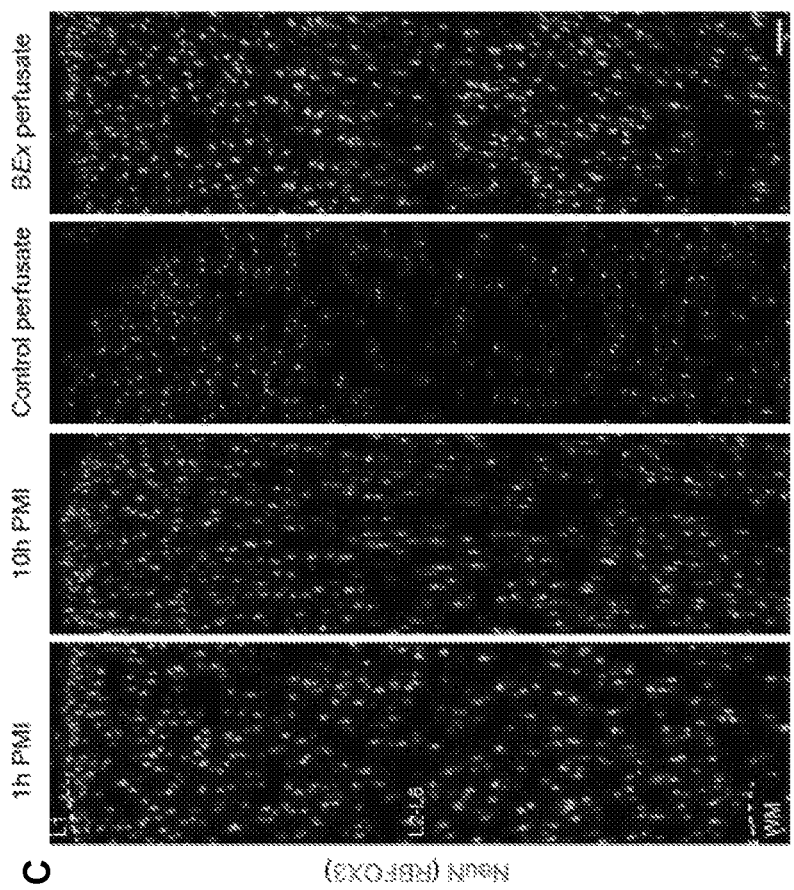
Figures 9D, 9E, 9F:
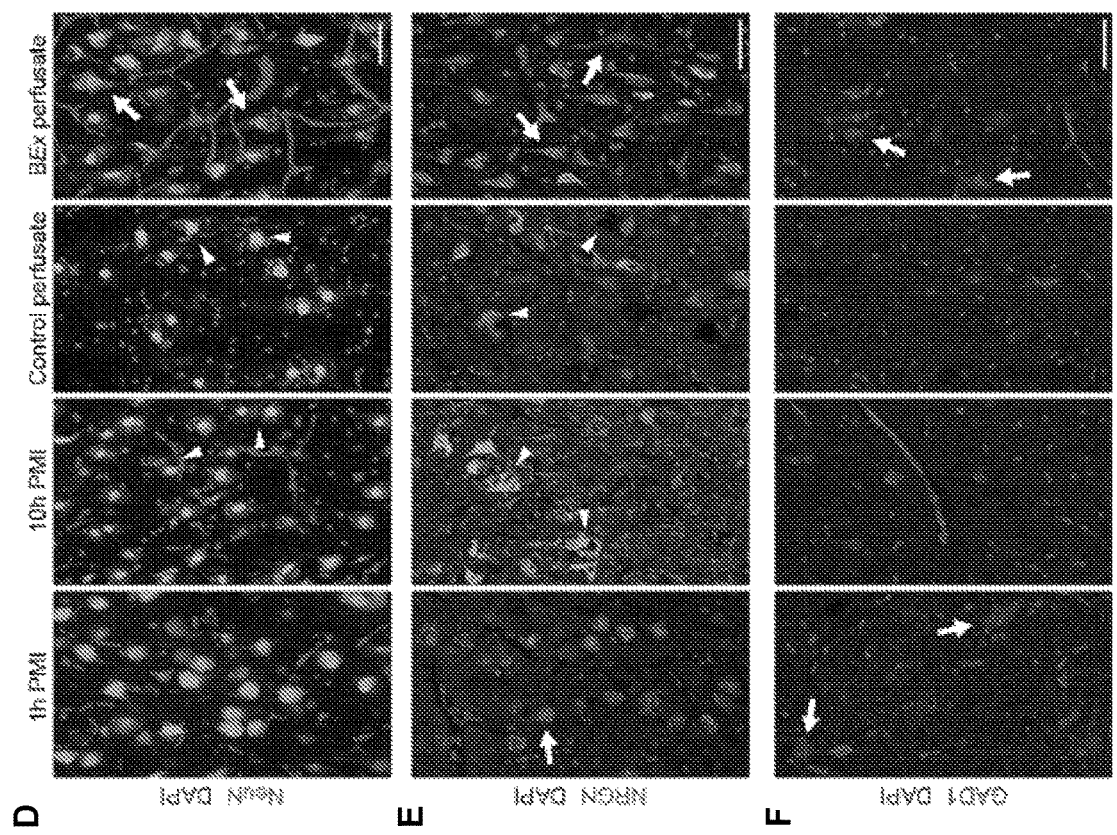
Figures 9G, 9H, 9I, 9J:
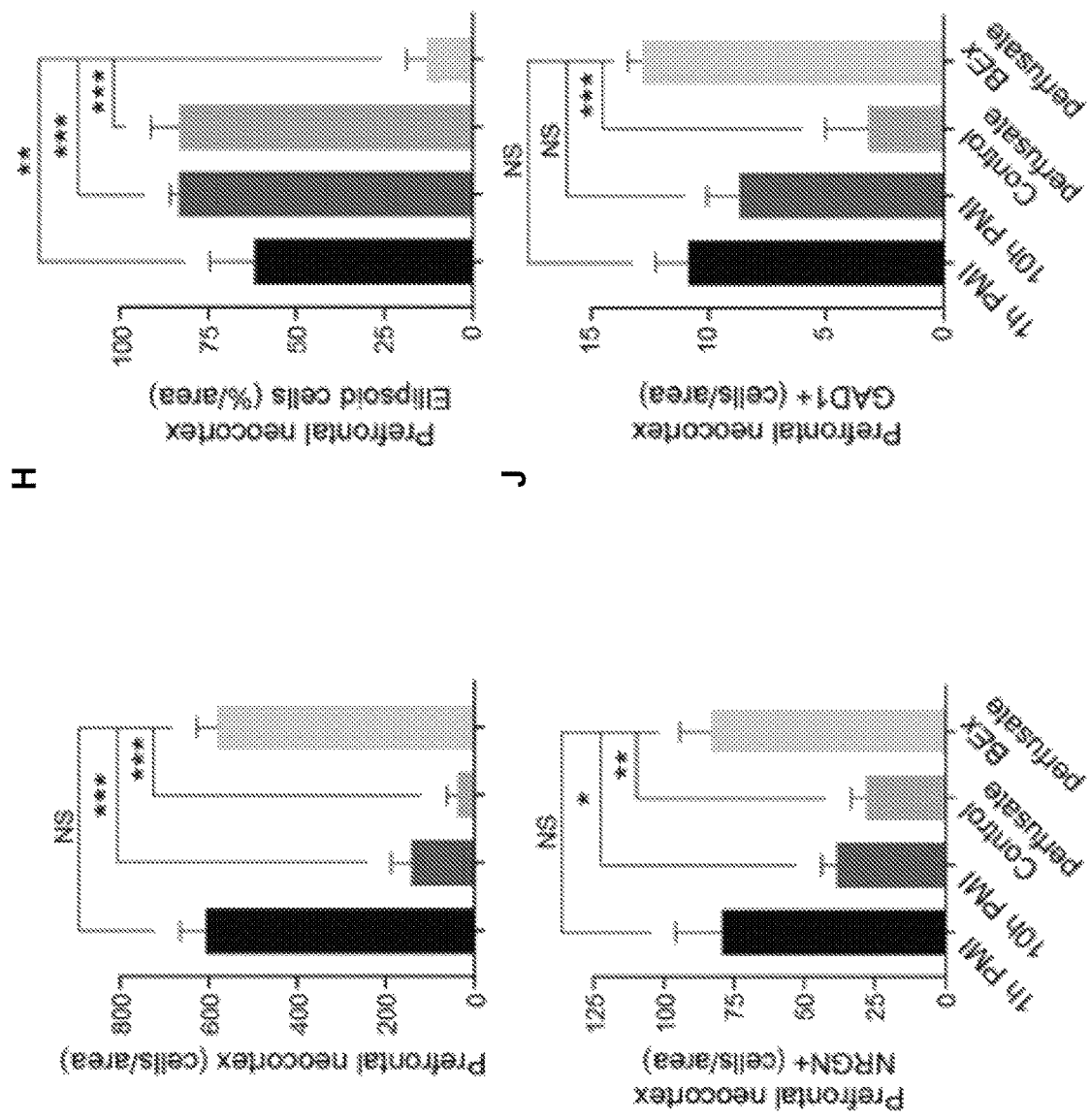
Figures 11A, 11B:
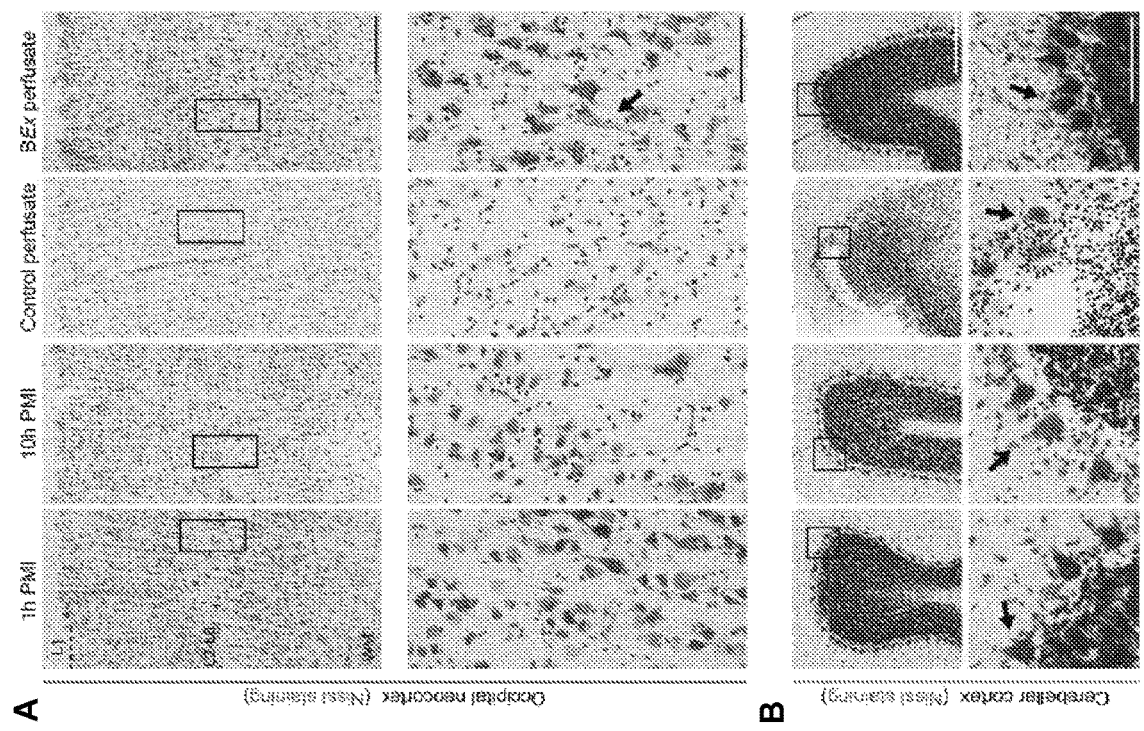
FIGS. 11A-11B demonstrate the cytoarchitectonics and neuronal cell morphology in the occipital neocortex and cerebellar cortex.

Example 6: Restoration and Preservation of Neural Cell Morphology and Viability, as Well as White Matter Integrity The system of the invention was investigated to determine whether the system preserves neural cell morphology and functional viability. Since pyramidal neurons in the prefrontal cortex are highly sensitive to hypoxia-ischemia, the morphology of this neuronal cell type was examined as an assessment of its cellular integrity. In comparison to Nissl staining from 1-hour PMI controls, brains that were subjected to 10-hour PMI conditions demonstrated diminished staining intensity and overall atrophy of neuronal structure and processes (FIG. 9A; 10-hour PMI). Brains that underwent saline perfusion exhibited even fainter staining of neuronal cell bodies, exhibiting substantial destruction of neuronal cell morphology (FIG. 9A). These findings are in contrast with BPM conditions, which demonstrated neuronal structure consistent with 1-hour PMI controls. Furthermore, a consistent pattern of neuronal cell morphology is observed throughout multiple, independent markers (FIGS. 9B-9J). These observations are not restricted to the prefrontal cortex, but also extend to other regions of the brain that are susceptible to ischemic injury such as the hippocampus, cerebellum, and occipital cortex (FIGS. 11A-11C). Indeed, under BPM-perfusion hippocampal cytoarchitectonic and ultrastructural integrity is maintained as compared to control conditions (FIG. 7A & FIGS. 8A-8B). Furthermore, under BPM-perfusion, CA1 neurons demonstrated classical pyramidal cell morphology with prominent neuronal processes (FIG. 7B; CA1), in contrast to structurally-preserved, yet visibly swollen CA1 neurons in 1-hour PMI controls, indicating resolution of cytotoxic edema following synthetic perfusion. A similar pattern of cytoarchitectural preservation was observed in the dentate region of the hippocampus (FIG. 7B; Dentate). Quantification of the number of neurons present in each respective hippocampal subregion evidences that BPM perfusion maintains neuronal cell numbers as compared to 1-hour PMI controls and in contrast with control perfusate and 10-hour PMI conditions (FIGS. 7C, 7D). Likewise, quantification of swollen, ellipsoid cells in the hippocampus demonstrates a significant decrease under synthetic perfusion conditions, as compared to control groups (FIG. 7E). An independent immunohistological staining for neuronal nuclear antigen (NeuN), a pan-neuronal marker evidenced a parallel pattern of cytoarchitectural morphology across conditions, as neurons maintained their structural integrity only under synthetic perfusion conditions (FIG. 7F; NeuN).

Figures 12A, 12B:
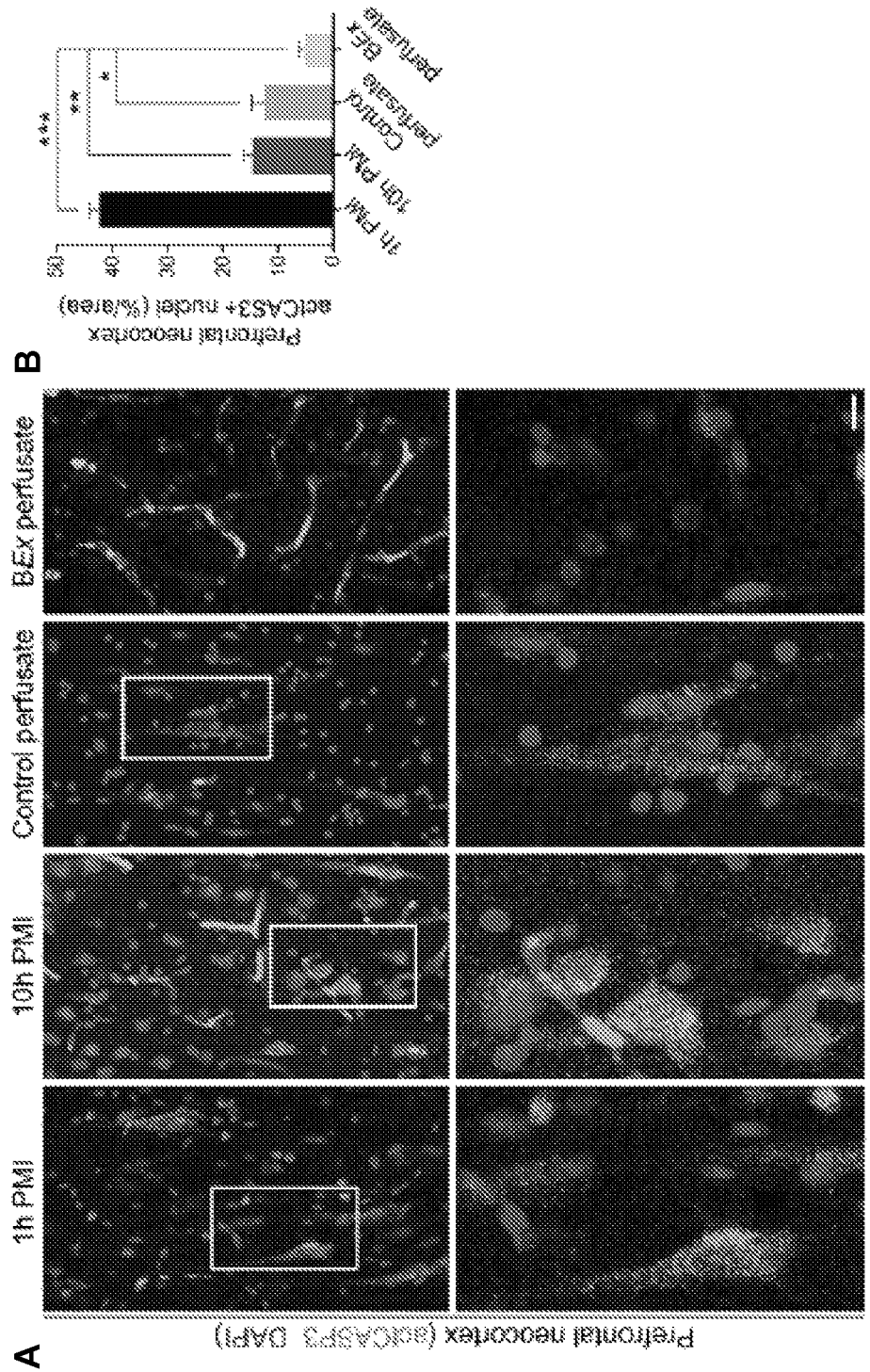
FIGS. 12A-12C depict the dynamics of caspase-3 activation in the perfused and unperfused brain.
Figure 12C:
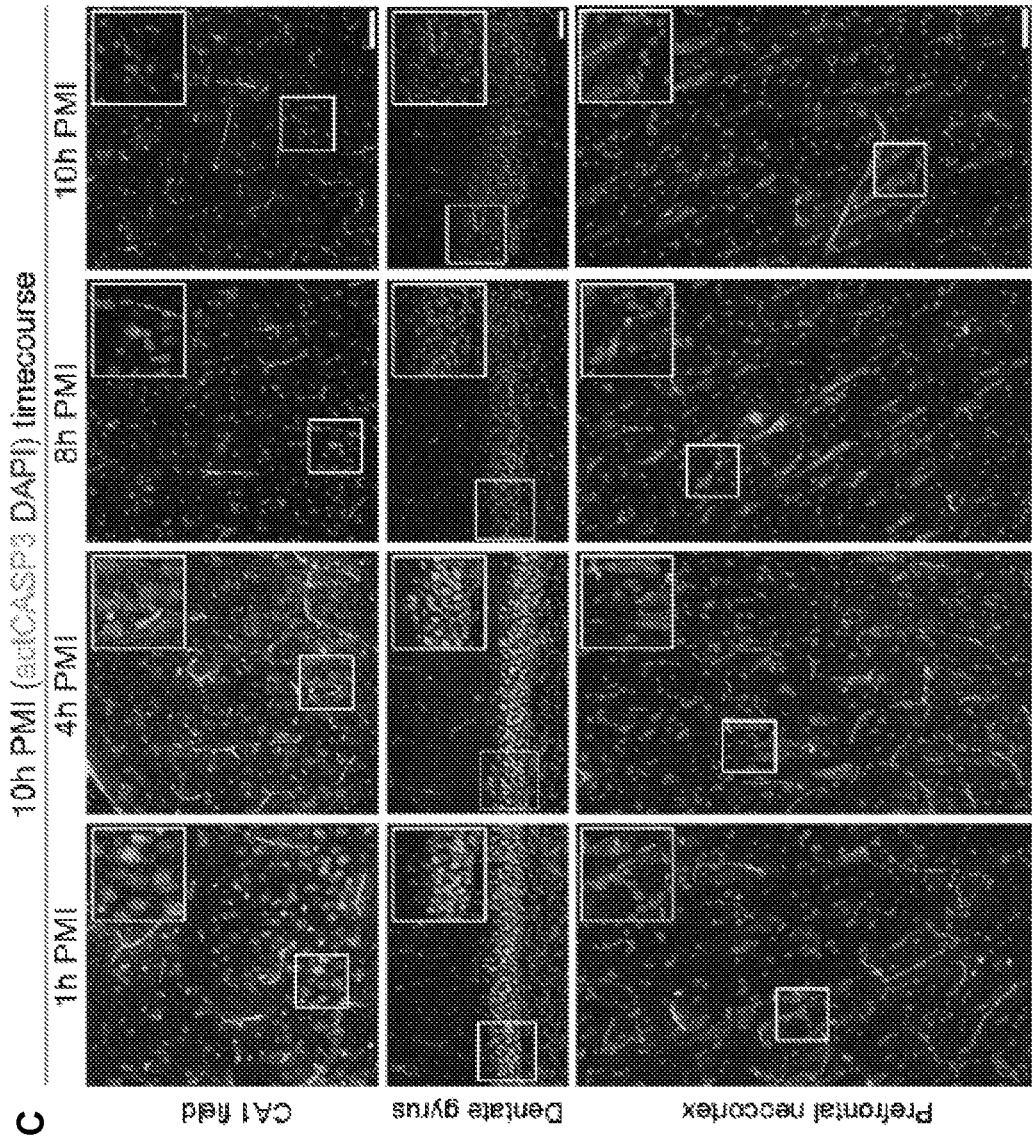

It was then determined whether the system of the invention reduces nuclear localization of the active form of cleaved Caspase-3, the apoptotic execution protein. Cellular localization of activated Caspase-3 (actCASP3) followed a region- and condition-specific pattern of staining (FIG. 7F; actCASP3). Quantification of the percentage of nuclei positive for actCASP3 demonstrated a statistically significant decrease only under the synthetic perfusion condition, indicating that the perfusate formulation reversed the induction of caspase-3-mediated apoptosis in the CA1 and Dentate (FIGS. 7G-7H). Similar to the hippocampus, nuclear localization of actCASP3 in the prefrontal cortex was significantly reduced only under synthetic perfusion conditions (FIGS. 12A-12B). Importantly, a time-course analysis was conducted on the 10-hour PMI brains to investigate whether the observed decrease in activated caspase-3 in this experimental group was due to a reduction in initial caspase-3 activation or due to the overall destruction of the cellular integrity and subsequent loss of caspase-3 signal. Since there is robust nuclear localization of activated caspase-3 following 1-hour PMI in the unperfused brain and a progressive decrease in signal intensity, the decrease activated caspase-3 in the 10-hour PMI condition as compared to 1-hour PMI controls appears to be due to a loss of cellular and protein integrity and not an amelioration of cellular viability, such as in the case with BPM-perfused brains (FIG. 12C).

Figure 10A:
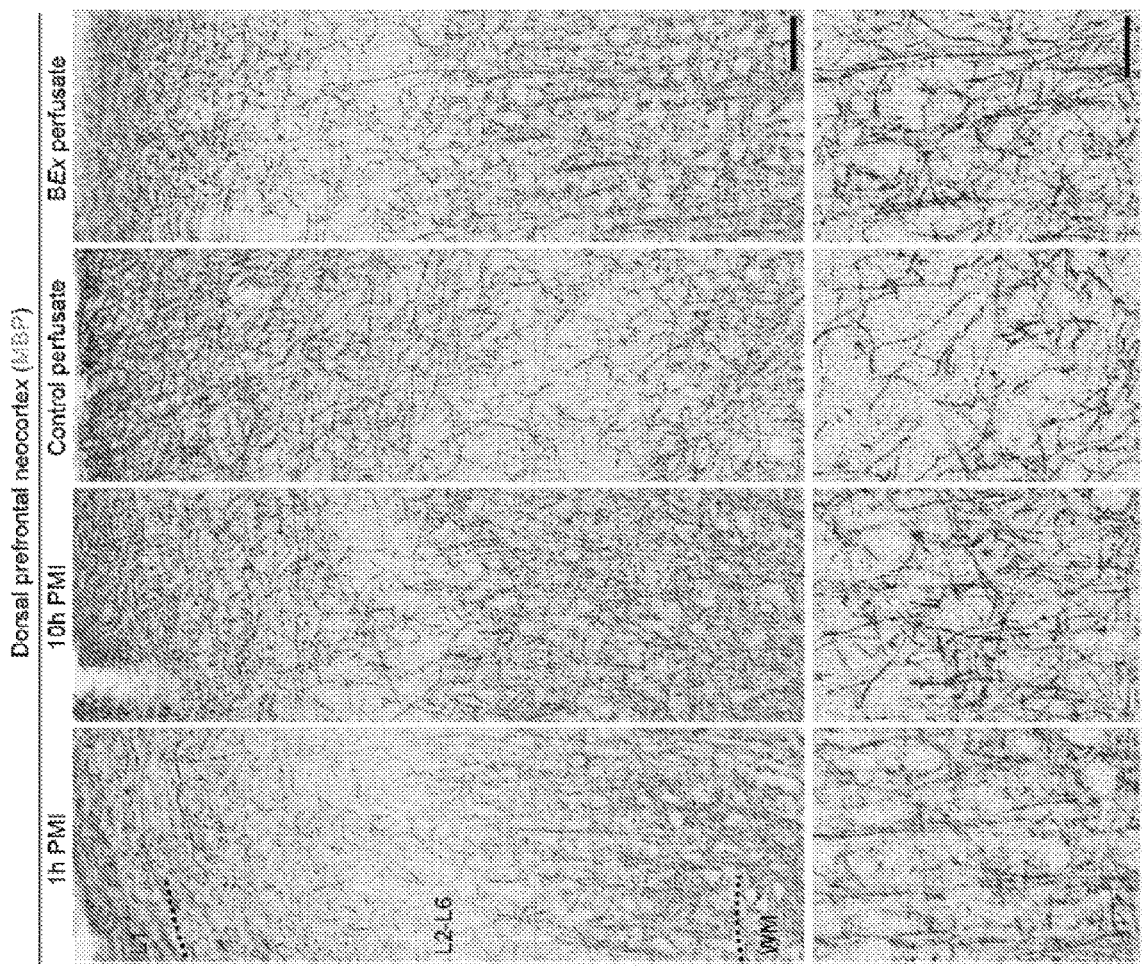
FIGS. 10A-10C are analyses that demonstrate the integrity of myelin under each experimental condition.
Figures 10B, 10C:
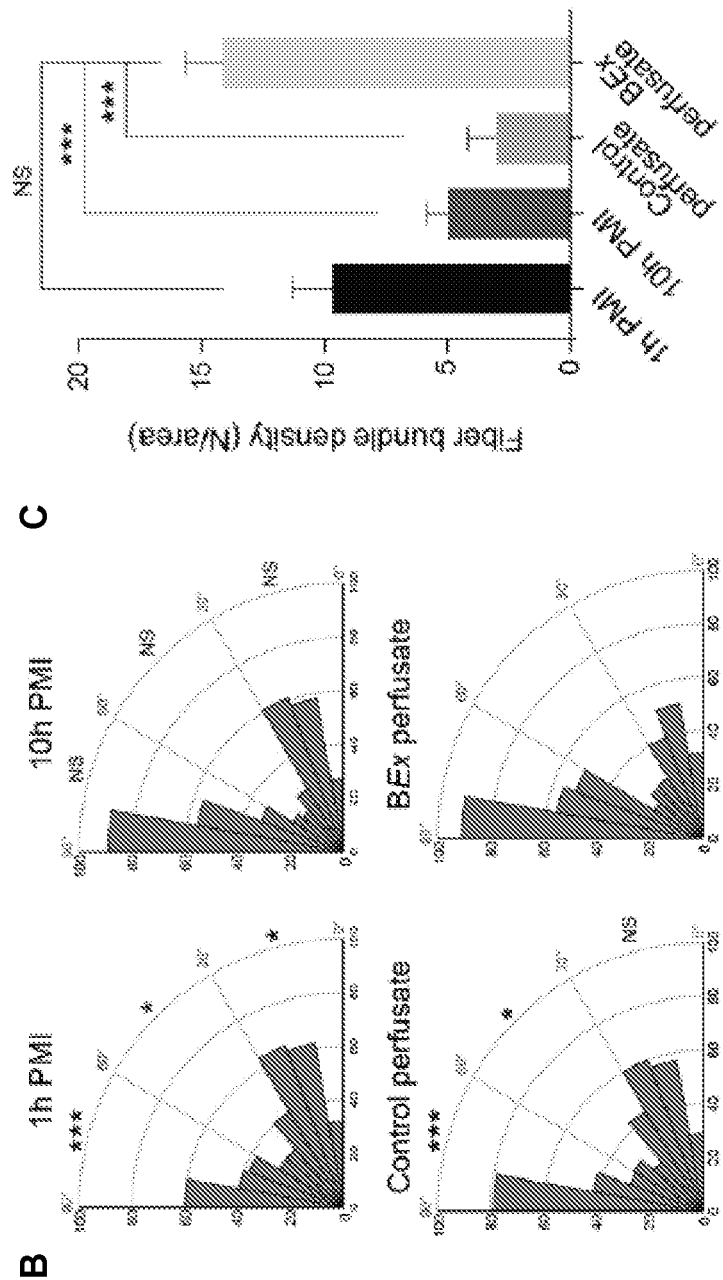

Furthermore, it was determined whether the system of the invention maintains white matter integrity. Immunohistological staining for myelin-basic protein, one of the major structural constituents of myelin evidenced the preservation of white matter integrity in BPM-perfused brains as compared to 1-hour PMI controls (FIGS. 10A-10C).

Therefore, taken together, these data demonstrate that perfusion with BPM in the system of the invention preserves neuronal morphology and neural cell ultrastructure across multiple brain regions, while also reducing the nuclear localization of activated caspase-3, and preserving white matter integrity.

Figures 13A, 13B, 13C, 13D, 13E, 13F:
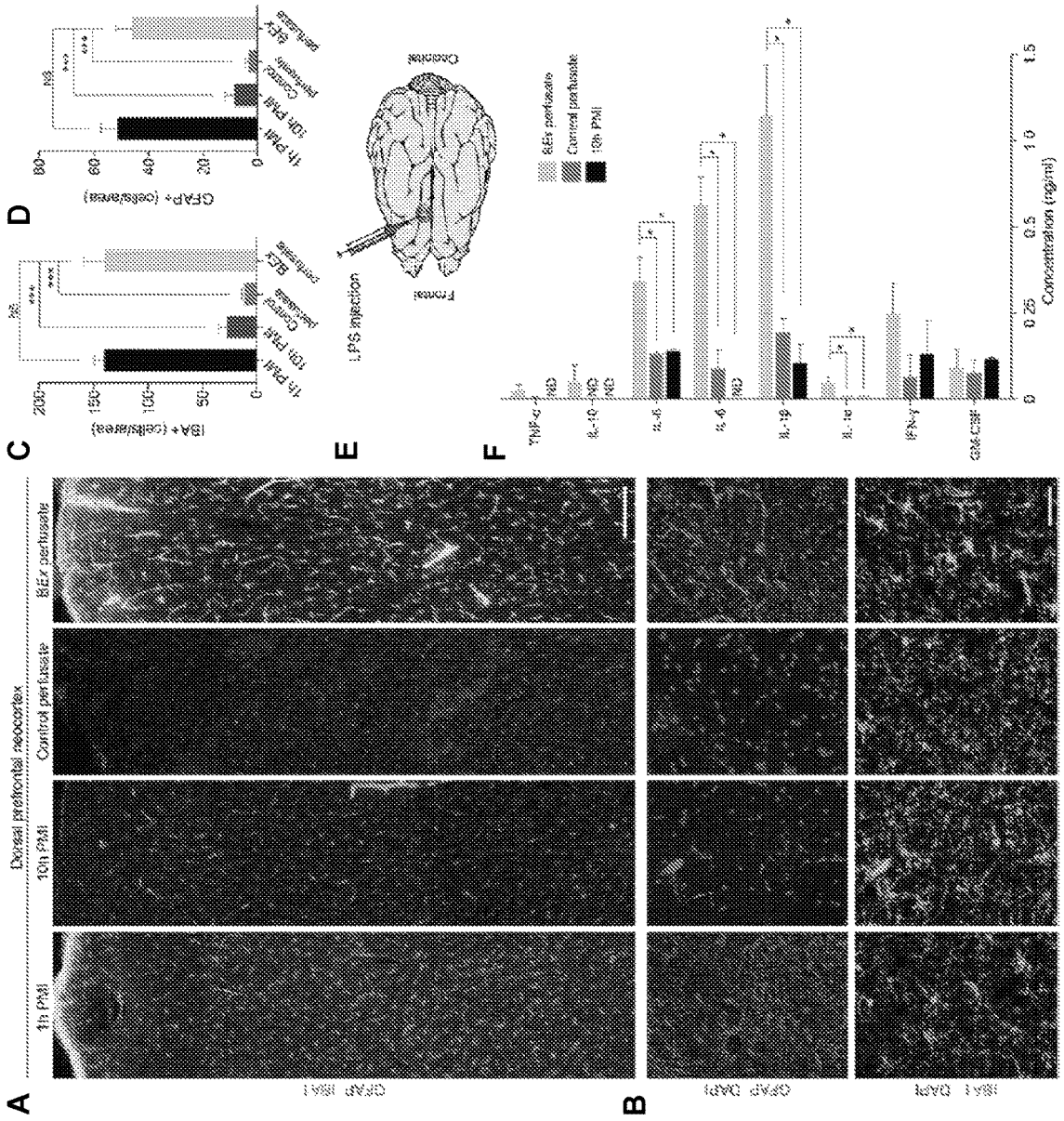
FIGS. 13A-13F show glial cell structure and functionality in the prefrontal cortex of unperfused and perfused brains.
Figures 14A, 14B:
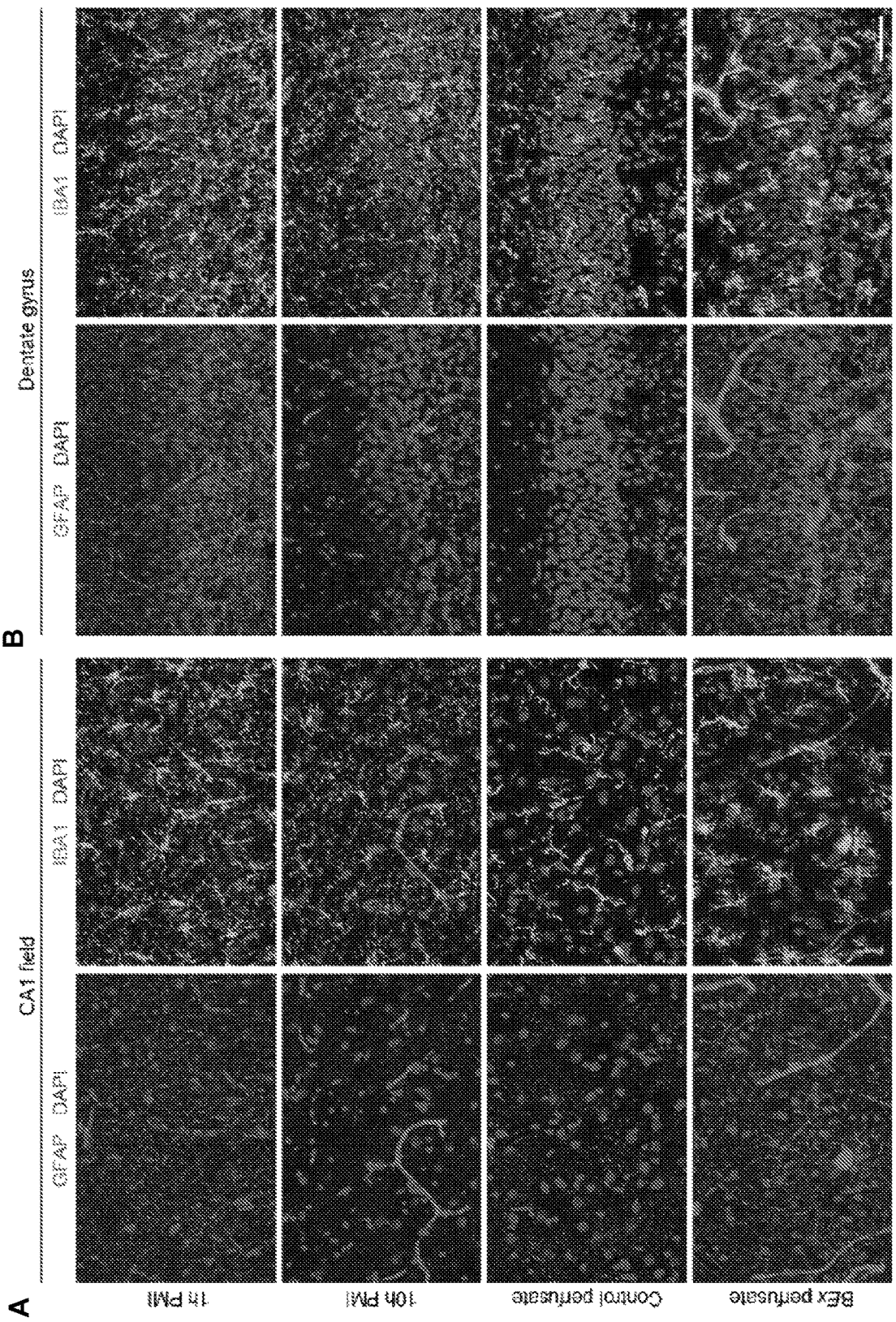
FIGS. 14A-14B are images of glial cell structure in the CA1 and Dentate of unperfused and perfused brains.

Example 7: Restoration and Preservation of Glial Structural and Functional Phenotypes Due to the increased cell viability and preserved pyramidal cell morphology observed under BPM-perfusion, it was determined whether glial cells maintained their structural and functional phenotypes utilizing the system of the invention. Immunohistological staining for GFAP and IBA-1, astrocytic and microglial markers, respectively, evidenced unappreciable staining in non-perfused brains (FIGS. 13A-13B); however, under synthetic-perfusion conditions, robust GFAP and IBA-1 staining was observed throughout the cortex and in the underlying white matter (FIGS. 13A-13B) with conserved glial cell numbers (FIGS. 13C-13D). GFAP and IBA-1 staining was similarly conserved in the CA1 and Dentate of the hippocampus as well (FIGS. 14A-14B).

To test whether glial cells were functionally viable, lipopolysaccharide (LPS; 2.5 µg), a potent toll-like receptor-4 agonist and immunogenic membrane component of gram-negative bacteria, was injected into the prefrontal cortex of un-, saline-, and BPM-perfused brains and allowed to incubate for the duration of the 6-hour perfusion protocol (FIG. 13E). The injected area of the tissue was then processed for multiplex analysis of chemokines and cytokines after completing the 6 h perfusion protocol. Under synthetic perfusion conditions, a significant increase in IL-1α, IL-1β, IL-6 and IL-8 was observed relative to other conditions (FIG. 13F), indicating that the system of the invention both maintains cellular inflammatory response as well as astroglial and microglial structure.

Example 8: Synaptic Structure and Neuronal Activity

Figures 15A, 15B, 15C, 15D, 15E, 15F:
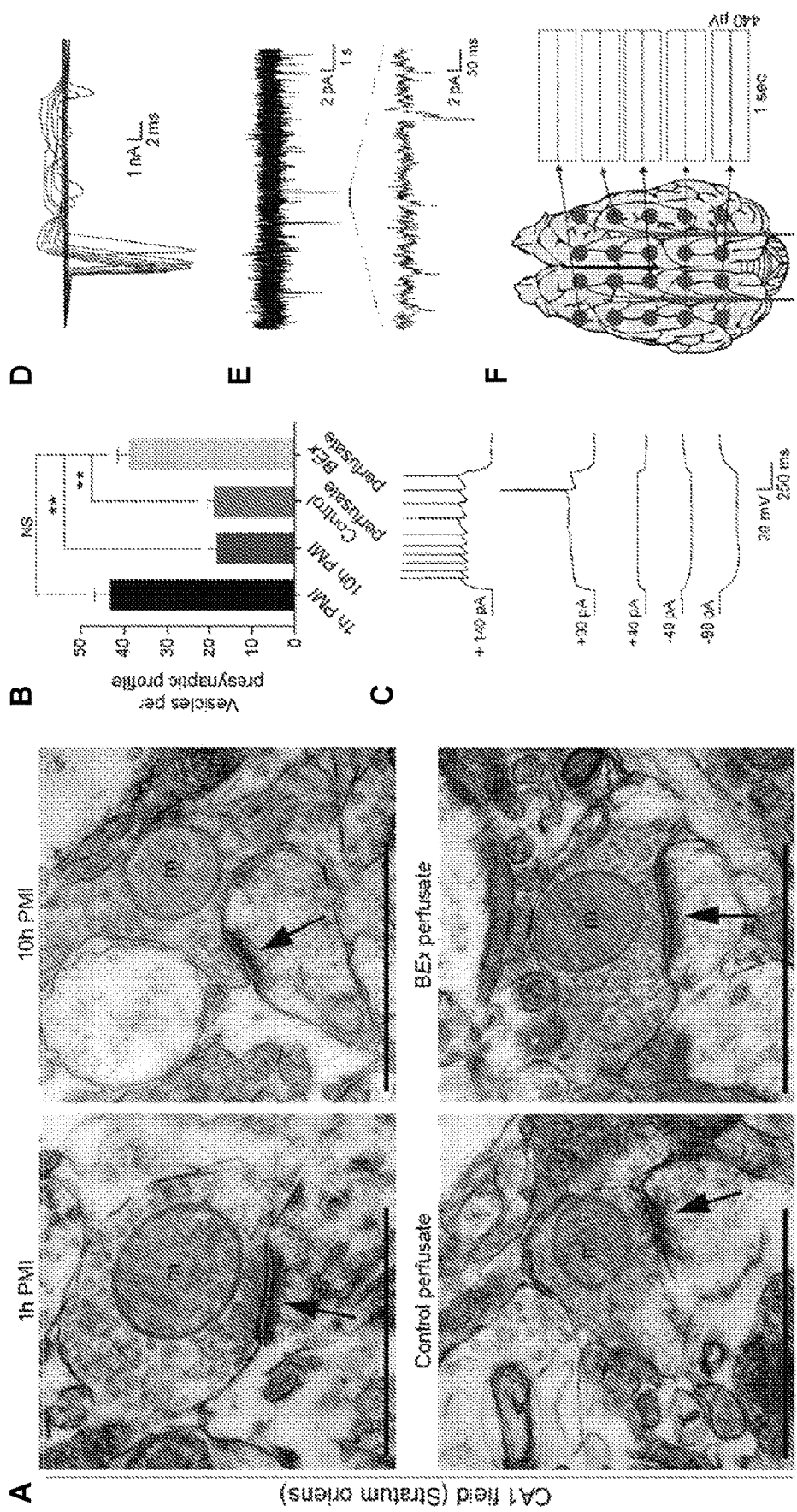
FIGS. 15A-15F are images and graphs showing the synaptic structure and electrical activity of a brain under perfused and unperfused conditions.

It was then determined whether CA1 synapses remained structurally intact in brains subjected to un-, saline-, or synthetic-perfusion conditions compared to 1-hour PMI controls. Employing electron microscopy (EM), the ultrastructure and subcellular composition of synapses were analyzed. EM analyses indicated a robust preservation of pre-synaptic vesicle number in synthetic perfusion conditions, as compared to 1-hour PMI, with substantial decreases in unperfused and saline perfused brains (FIGS. 15A-15B).

The whole-cell patch-clamp technique was applied on brain slices to assess the viability and functionality of individual neurons after a 6-hour LOP. The passive electrophysiological properties of hippocampal CA3 pyramidal neurons were first examined. Membrane capacitance ($Cm=125\pm43$ pF), input resistance ($Rin=195\pm63$ MΩ), membrane time constant ($\tau m=32.3\pm8.4$ ms), and membrane resting potential ($Vm=-71.2\pm7.0$ mV) were similar to previous reports in mice and rats. All the recorded neurons responded to supra-threshold depolarizing current stimuli with repetitive action potential firing (FIG. 15C) and expressed voltage-gated fast $Na^+$ currents and delayed-rectifier $K^+$ currents (FIG. 15D). The action potential parameters (spike threshold=$-48\pm0.6$ mV, spike amplitude=$80.3\pm6.1$ mV, spike duration=$1.58\pm0.24$ ms) were also similar to previous studies.

The functionality of the synaptic network was then investigated. Spontaneous excitatory postsynaptic currents (sEPSCs) were recorded at a holding potential of −70 mV from a CA3 pyramidal cell (FIG. 15E). Since spontaneous presynaptic action potentials or spontaneous presynaptic vesicular release can drive sEPSCs, these findings substantiate the viability of excitatory neurons projecting to the CA3 pyramidal neurons, and thus the integrity of this hippocampal synaptic network even after 4-hour LPP and 6-hour LOP.

Due to the preserved electrical integrity of the hippocampal network, electrocorticography recordings (ECoG) were employed to assess whether global cortical activity remained intact as well. Synthetic perfused brains exhibited an isoelectric ECoG (FIG. 15F), indicating that a 6-hour LOP following a 4-hour LPP was not sufficient to restore cortical network activity. This finding is consistent with previous studies demonstrating that the delay in the resurgence of spontaneous EEG activity is proportional to the length of global ischemia times.

Example 9: Perfusion System Summary

The system of the invention has been used to demonstrate that certain cellular functions of the large mammalian brain can be restored under ex vivo normothermic conditions in the postmortem brain. With the use of this methodology, anatomical and neural cell morphology have been preserved, while resuming spontaneous synaptic activity in the hippocampus, glial and vascular responsiveness, as well as active cerebral metabolism. These findings indicate that cellular deterioration in the brain after circulatory arrest follows a protracted process, instead of occurring at a singular, narrowly defined temporal window. Perhaps most importantly: with the appropriate intervention, the large mammalian brain retains a greater potential for metabolic and neurophysiologic resilience to anoxic insult than is currently appreciated. This discovery is the first report of restoring and maintaining cellular functions of a fully intact, ex vivo mammalian brain at normothermia following an extended postmortem interval (i.e. 4 hours). This was achieved by using a combination of cytoprotective agents and technical innovations that address and circumvent many obstacles associated with in vivo reperfusion or ex vivo perfusion with whole blood.

With its gyrated cortex, readily-accessible vasculature, and complex morphology, the porcine brain represented an ideal experimental model for studying cerebral responses to global anoxia as it more closely resembles the primate brain than the smaller, lissencephalic rodent brain. One of the most notable differences between pig and rodent brains is the difference in gray-to-white matter ratio, with the rodent brain comprising only 14% white matter, while pig and human approximate 30 and 50%, respectively. This particular distinction is integral given it influences not only neurovascular architecture and function, but also neural connectivity, metabolism, and physiology, which play critical roles in ischemic injury. Furthermore, it is well established that ischemia differentially affects gray and white matter, with many clinically inefficacious neuroprotectants narrowly focused on salvaging gray matter, while largely overlooking white matter pathophysiology. One of the strengths of the system of the invention is the ability to iteratively test various interventions in order to optimize the synthetic perfusate formulation, homeostatic set-points, and methodology for total brain protection. In doing so, a rational polytherapy approach was employed, addressing independent mechanisms that have been reported to damage both gray and white matter. Specifically, a synergistic formulation was developed that diminished cell injury and death by halting necrotic and apoptotic molecular programs, quenching oxidative stress, and preventing neurotoxic gliosis. The perfusate was also designed as an echogenic and acellular solution containing a hemoglobin-based gas exchange solution, in order to preclude the development of micro-thrombi, ensure proper delivery of these agents throughout the cerebral microvasculature, and allow ease of detecting perfusion status via ultrasonography. As evidenced by the vascular imaging studies reported in the preceding Experimental Examples, capillary refill, hemoglobin-positive capillaries, and low vascular resistance, the cerebral microvasculature remained structurally patent with biphasic waveform. In addition to retaining its structural integrity, the cerebral vasculature exhibited a significant response to dilatory stimulation with the calcium-channel blocker, nimodipine, indicating functional preservation of the cerebral vasculature. With the brain thoroughly perfused, it was observed that glial and neuronal cells were also structurally preserved with certain cellular functions restored. Though, at this time we cannot exclude the possible development of delayed cellular death previously reported to start 72-hours to weeks after ischemia, the invention has incorporated both anti-apoptotic and anti-necroptotic agents within its perfusate to halt the progression of these delayed mechanisms. In doing so, a significant decrease in activated caspase-3 within the hippocampus and prefrontal cortex in brains subjected to the system of the invention is observed, in comparison to control perfusate- or unperfused brains. Overall, these findings indicate that a combinatorial approach to addressing anoxic injury is successful in restoring cellular brain functions even hours post-mortem.

What is claimed is:

1. A perfusion device for the normothermic, *ex vivo* preservation of a mammalian brain, the device comprising:
   a perfusion loop comprising a filtration loop having at least one hemodiafiltration unit adapted and configured to remove metabolic toxins from and add nutrients to a perfusate; and
   a controller programmed to regulate at least a perfusate temperature within the perfusion loop to maintain normothermic conditions; and
   a brain enclosure unit adapted and configured to receive and house a mammalian brain; and
   a heat exchange unit adapted and configured to regulate the temperature of the brain enclosure unit and the perfusion loop;
      wherein the perfusion loop is adapted and configured to oxygenate/carboxygenate the perfusate and circulate the perfusate through the brain contained within the brain enclosure unit; and
      wherein, the perfusate comprises:
   a culture medium comprising glucose, one or more amino acids, one or more water soluble salts and one more vitamins;
   one or more artificial oxygen carrier compounds; and
   one or more compounds selected from the group consisting of anti-cytotoxic compounds, antioxidants, anti-necrotic compounds, antiexcitotoxic compounds, anti-inflammatory compounds, antiepileptic compounds, anti-apoptotic compounds, antibiotics, cell death inhibitors, neuroprotectants and oxidative/nitrosative stress inhibitors.

2. The device of claim 1, wherein the perfusion loop further comprises at least one pulse generator programmed to generate a pressure pulse within the perfusate within the perfusion loop.

3. The device of claim 2, wherein the mammalian brain is a brain from a source selected from the group consisting of murine, canine, ovine, porcine, bovine and primate sources.

4. The device of claim 3, wherein the mammalian brain is a human brain.

5. The device of claim 3, wherein the mammalian brain is maintained ex cranio.

6. The device of claim 2, wherein the device perfuses the brain with the perfusate through the pulse generator at a rate of about 40 to about 180 beats per minute.

7. The device of claim 1, wherein the perfusion loop further comprises a venous loop, and an arterial loop along with the filtration loop, wherein:
   the venous loop comprises at least one perfusion pump;
   the filtration loop comprises at least one perfusion pump;
   the arterial loop comprises at least one gas exchange source and at least one gas mixer adapted and configured to supply oxygen and carbon dioxide to the perfusate;
   wherein the brain enclosure unit, the venous loop, the filtration loop and the arterial loop are in fluidic communication such that the perfusate can be carried from the brain enclosure unit, through the venous loop, through the filtration loop, through the arterial loop and back to the brain enclosure unit.

8. The device of claim 7, wherein one or more components selected from the group consisting of the venous loop, the filtration loop and the arterial loop further comprise a reservoir containing excess perfusate.

9. The device of claim 7, wherein one or more components selected from the group consisting of the brain enclosure unit, the venous loop, the filtration loop and the arterial loop further comprise one or more elements selected from the group consisting of:
   one or more valves adapted and configured to regulate the flow of the perfusate;
   one or more filters adapted and configured to filter the perfusate; and
   one or more sensors for measuring one or more properties of the perfusate selected from the group consisting of pH, dissolved oxygen concentration, dissolved carbon dioxide concentration, dissolved metabolite concentration, temperature, pressure, and flow rate.

10. The device of claim 9, wherein the one or more sensors measure the concentration of at least one dissolved metabolite selected from the group consisting of nitric oxide, lactate, bicarbonate, oxygen, carbon dioxide, total hemoglobin, methemoglobin, oxyhemoglobin, carboxyhemoglobin, sodium, potassium, chloride, calcium, glucose, urea, ammonia, and creatinine.

11. The device of claim 9, wherein the device comprises one or more sensors for measuring one or more properties of the perfusate selected from the group consisting of pressure and flow rate.

12. The device of claim 7, wherein one or more components selected from the group consisting of the brain enclosure unit, the venous loop, the filtration loop and the arterial loop comprise one or more heat exchange units comprising:
   one or more heat exchangers;
   one or more temperature regulation units;
   one or more temperature regulating pumps;
   a thermoregulation fluid; and
   one or more pipes configured and adapted to transport the thermoregulation fluid, wherein the one or more pipes are in fluidic communication with the one or more heat exchangers, the one or more temperature regulation units and the one or more temperature regulating pumps.

13. The device of claim 12, wherein the one or more components selected from the group consisting of the brain enclosure unit, the venous loop, the filtration loop and the arterial loop comprise one or more sensors adapted and configured to measure the temperature within the perfusion device.

14. The device of claim 13, wherein the one or more sensors adapted and configured to measure the temperature within the perfusion device, the one or more temperature regulation units and the one or more temperature regulating pumps are in electronic communication with a computer programmed to regulate the temperature of the thermoregulation fluid and the specified flow rate of the one or more temperature regulating pumps to maintain a specified temperature within the perfusion device.

15. The device of claim 1, wherein the hemodiafiltration unit is adapted and configured to remove one or more metabolic toxins from the perfusate selected from the group consisting of water, lactate, dissolved gases, ammonia, atrial natriuretic peptide, β2-microglobulin, β-endorphin, cholecystokinin, Clara cell protein, creatinine complement factor D, cystatin C, degranulation inhibitor protein, delta sleep-inducing peptide, endothelin, glutamate, hyaluronic acid, IL-1α, IL-6, κ-Ig light chain, λ-Ig light chain, neuropeptide Y, retinol-binding protein, tumor necrosis factor-α, uric acid, urea, IFN-γ, IL-1β, IL-18, and glutamate.

16. The device of claim 1, wherein the hemodiafiltration unit is adapted and configured to supply one or more nutrients to the perfusate, selected from the group consisting of Glycine, L-Alanyl-Glutamine, L-Arginine hydrochloride, L-Cystine, L-Histidine hydrochloride-H2O, L-Isoleucine, L-Leucine, L-Lysine hydrochloride, L-Methionine, L-Phenylalanine, L-Serine, L-Threonine, L-Tryptophan, L-Tyrosine, L-Valine, Vitamins, Choline chloride, D-Calcium pantothenate, Folic Acid, Niacinamide, Pyridoxine hydrochloride, Riboflavin, Thiamine hydrochloride, i-Inositol, Inorganic Salts, Calcium Chloride ($CaCl_2$)-$2H_2O$), Ferric Nitrate ($Fe(NO_3)_3$ $9H_2O$), Magnesium Sulfate ($MgSO_4$-$7H_2O$), Potassium Chloride (KCl), Sodium Bicarbonate ($NaHCO_3$), Sodium Chloride (NaCl), Sodium Phosphate monobasic ($NaH_2PO_4$-$2H_2O$), D-Glucose, Phenol Red, Sodium Pyruvate, free fatty acids, and cholesterol.

17. The device of claim 1, wherein the device is mounted on a movable housing.

18. The device of claim 1, wherein the device perfuses the brain with the perfusate at a cardiac pulsatile pressure of about 20 mmHg to about 140 mmHg.

19. The device of claim 1, further comprising a computer in electronic communication with one or more elements of the device.

20. A method for preparing an intact mammalian brain under normothermic, ex vivo conditions, the method comprising:
    isolating and cannulating the bilateral common carotid arteries;
    flushing the brain with a heparinized saline solution through the arteries to remove blood;
    optionally storing the brain on ice for a period of time;
    isolating the bilateral external carotid arteries, internal carotid arteries, occipital arteries, ophthalmic, vertebral, basilar, along with other smaller branches serving the brain;
    ligating all arteries except for the internal carotid artery to prevent vascular shunting and to selectively perfuse the brain;
    surgically removing the excess tissue from the skull while rendering the arteries undamaged;
    surgically removing the cranium from the brain to render the brain ex cranio for experimental manipulation;
    connecting the free-end arteries to the perfusion device of claim 1.

21. The method of claim 20, further comprising administering to the brain a composition comprising one or more vasoactive compounds.

22. The method of claim 21, wherein the one more vasoactive compounds are selected from the group consisting of nimodipine, irsadipine, nifedipine, nitrendipine, amlodipine, flunarizine, bepidril, fluspirilene, fendiline, carbon dioxide, nitric oxide, nicorandil, isosorbide dinitrate, isosorbide mononitrate, sumatriptan, zolmitriptan, naratriptan, rizatriptan, alotriptan, eletriptan, frovatriptan, α1-adrenergic receptor ligands, α1-adrenergic receptor agonists, α1-adrenergic receptor antagonists, α2-adrenergic receptor ligands, α2-adrenergic receptor agonists, α2-adrenergic receptor antagonists, β-adrenergic receptor ligands, β-adrenergic receptor agonists, β-adrenergic receptor antagonists, sitaxentan, ambrisentan, atrasentan, BQ-123, zibotentan, bosentan, macitentan, tezosentan, magnesium sulfate, papaverine, nafronyl, and hexobendine.

23. The method of claim 20, wherein the method further comprises circulating a perfusate through the brain of the invention.

* * * * *

UNITED STATES PATENT AND TRADEMARK OFFICE
CERTIFICATE OF CORRECTION

PATENT NO. : 11,998,001 B2
APPLICATION NO. : 16/967925
DATED : June 4, 2024
INVENTOR(S) : Stefano Daniele et al.

Page 1 of 1

It is certified that error appears in the above-identified patent and that said Letters Patent is hereby corrected as shown below:

In the Specification

On Column 1, Lines 18-23, please replace the existing paragraph with the following paragraph:
-- STATEMENT REGARDING FEDERALLY SPONSORED RESEARCH OR DEVELOPMENT
This invention was made with government support under MH105972 awarded by National Institutes of Health. The government has certain rights in the invention. --

Signed and Sealed this
Eleventh Day of March, 2025

Coke Morgan Stewart
*Acting Director of the United States Patent and Trademark Office*